US011657539B2

(12) United States Patent
Nakagami et al.

(10) Patent No.: US 11,657,539 B2
(45) Date of Patent: May 23, 2023

(54) INFORMATION PROCESSING APPARATUS AND INFORMATION PROCESSING METHOD

(71) Applicant: Sony Corporation, Tokyo (JP)

(72) Inventors: Ohji Nakagami, Tokyo (JP); Koji Yano, Tokyo (JP); Satoru Kuma, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 16/754,746

(22) PCT Filed: Oct. 3, 2018

(86) PCT No.: PCT/JP2018/036966
§ 371 (c)(1),
(2) Date: Apr. 9, 2020

(87) PCT Pub. No.: WO2019/078000
PCT Pub. Date: Apr. 25, 2019

(65) Prior Publication Data
US 2020/0320744 A1    Oct. 8, 2020

(30) Foreign Application Priority Data
Oct. 16, 2017 (JP) .............................. JP2017-200585

(51) Int. Cl.
*G06T 9/00*       (2006.01)
*G06T 3/40*       (2006.01)
(Continued)

(52) U.S. Cl.
CPC .............. *G06T 9/00* (2013.01); *G06T 3/4092* (2013.01); *G06T 17/10* (2013.01); *H04L 65/70* (2022.05); *H04L 65/75* (2022.05)

(58) Field of Classification Search
CPC ......... G06T 9/00; G06T 3/4092; G06T 17/10; G06T 9/001; G06T 3/0037; G06T 19/00;
(Continued)

(56) References Cited

U.S. PATENT DOCUMENTS 7,224,729 B1    5/2007    Jang et al.
2006/0227023 A1   10/2006    Ahn et al.
(Continued)

FOREIGN PATENT DOCUMENTS

CA       2517842 A1    5/2003
JP    2006136021 A    5/2006
(Continued)

OTHER PUBLICATIONS

OMFA: Point Cloud video Track, ISO/IEC JTC1/SC29/WG11 MPEG2017/m41206.*
(Continued)

*Primary Examiner* — Zhitong Chen
(74) *Attorney, Agent, or Firm* — Xsensus LLP

(57) ABSTRACT

3D data representing a three-dimensional structure is divided into a plurality of pieces and encoded, an obtained plurality of divided bitstreams is multiplexed, and one bitstream including a separator indicating a position of a joint between the divided bitstreams is generated. Furthermore, a separator indicating a position of a joint between divided bitstreams obtained by dividing 3D data representing a three-dimensional structure into a plurality of pieces and encoding the plurality of divided pieces of the 3D data, which is included in a bitstream obtained by multiplexing a plurality of the divided bitstreams, is analyzed, and the bitstream is divided into every divided bitstream on the basis of information included in the analyzed separator, and decoded. Applications of the technology include being implemented in, for example, an information processing
(Continued)

apparatus, an image processing apparatus, electronic equipment, an information processing method, a program, or the like.

19 Claims, 42 Drawing Sheets

(51) Int. Cl.
*G06T 17/10* (2006.01)
*H04L 65/70* (2022.01)
*H04L 65/75* (2022.01)

(58) Field of Classification Search
CPC ... H04L 65/601; H04L 65/607; H04N 19/107; H04N 19/172; H04N 19/30; H04N 19/46; H04N 13/161; H04N 13/178; H04N 13/194; H04N 19/40
See application file for complete search history.

(56) References Cited

U.S. PATENT DOCUMENTS

| | | | |
|---|---|---|---|
| 2016/0086353 A1* | 3/2016 | Lukac | G06T 9/00 345/419 |
| 2016/0353146 A1* | 12/2016 | Weaver | H04N 21/2662 |
| 2017/0094262 A1* | 3/2017 | Peterson | H04N 13/344 |

FOREIGN PATENT DOCUMENTS

| | | |
|---|---|---|
| JP | 2008-537830 A | 9/2008 |
| JP | 2011-259325 A | 12/2011 |
| JP | WO2016035181 A1 | 6/2017 |
| WO | 2011/001857 A1 | 1/2011 |
| WO | 2017/104115 A1 | 6/2017 |

OTHER PUBLICATIONS

Huang, Y., Peng, J., Kuo, C.C.J. and Gopi, M., 2008. A generic scheme for progressive point cloud coding. IEEE Transactions on Visualization and Computer Graphics, 14(2), pp. 440-453.*
International Search Report and Written Opinion dated Nov. 20, 2018 for PCT/JP2018/036966 filed on Oct. 3, 2018, 9 pages including English Translation of the International Search Report.
Golla, T., and Klein, R., "Real-time point cloud compression," 2015 IEEE/RSJ International Conference on Intelligent Robots and Systems (IROS), Hamburg, Germany, 2015, pp. 5087-5092.
Esmaei L Faramarzi (Samsung) et al: OMAF:Point cloud video track 11 , 119. MPEG Meeting; Jul. 17, 2017-Jul. 21, 2017; Torino; (Motion Picture Expert Group or ISO/IEC JTC1/SC29/WG11), No. m41206 Jul. 11, 2017 (Jul. 11, 2017), XP030069549.

* cited by examiner

FIG. 1
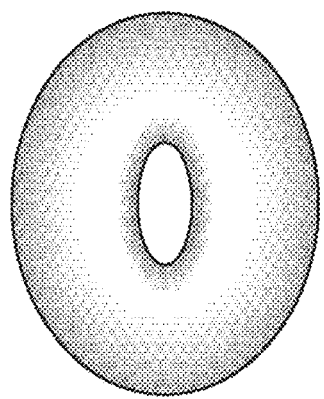
A
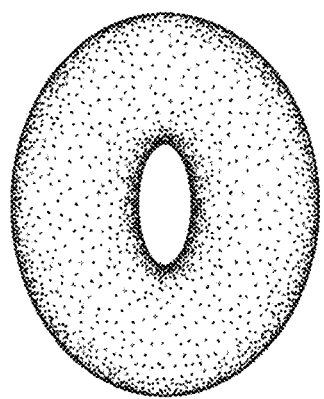
B

FIG. 4

| CONTENTS TO BE WRITTEN IN SEPARATOR |
|---|
| BIT PATTERN UNIQUE IN BITSTREAM (START CODE) |
| CORRESPONDENCE BETWEEN ORIGINAL POINT CLOUD AND DIVIDED BITSTREAM (POSITION INFORMATION) |
| INFORMATION REGARDING DIVIDED BITSTREAM |
| ATTRIBUTE INFORMATION |
| TIME INFORMATION (POC) |
| BITSTREAM SIZE |
| USED CODEC |
| PICTURE DECODING METHOD (Intra/Inter) |
| REFERENCE DESTINATION ID OF ANOTHER DIVIDED BITSTREAM |
| SEQUENCE LEVEL INFORMATION |
| RESOLUTION INFORMATION |
| COLOR SAMPLING (4:4:4, 4:2:2, 4:2:0) |
| BIT WIDTH OF SAMPLE (8/10/12 bit) |

FIG. 5

| | PERSPECTIVE OF DIVISION | POSITION TO INSERT SEPARATOR | DIVISION EXAMPLE | PECULIAR EFFECTS |
|---|---|---|---|---|
| 1 | DIVISION OF SPATIAL REGION | BETWEEN PROCESSING UNITS OBTAINED BY DIVIDING REGION IN THREE-DIMENSIONAL SPACE, OR BETWEEN PROCESSING UNITS OBTAINED BY DIVIDING REGION IN TWO-DIMENSIONAL SPACE | A_a\|A_b\|A_c G_a\|G_b\|G_c · A: Attribute INFORMATION (COLOR INFORMATION) · G: Geometry INFORMATION · _x: SUB-BITSTREAM CORRESPONDING TO REGION x · \|: SEPARATOR | PARTIAL DECODING ALLOWED |
| 2 | DIVISION OF ATTRIBUTE INFORMATION | BETWEEN Geometry AND Attribute, OR BETWEEN ATTRIBUTES HAVING DIFFERENT COLORS, NORMAL LINES, ETC. IN Attribute | G\|A G\|C\|N\|α · C: Color, N: Normal (NORMAL LINE INFORMATION), α (TRANSPARENCY) | PARALLEL DECODING OF ATTRIBUTE INFORMATION ALLOWED |
| 3 | DIVISION BETWEEN SPATIAL RESOLUTIONS | BETWEEN SPATIAL RESOLUTIONS FOR Octree: LoD0, LoD1, ... GENERAL REPRESENTATION: Layer0, Layer1, ... | (G_L0\|G_L1) \| (A_L0\|A_L1) \| · Lx: SUB-BITSTREAM CORRESPONDING TO LoD x OR Layer x | SCALABLE DECODING ALLOWED |
| 4 | COMBINATION OF REGION DIVISION AND RESOLUTION DIVISION | BOTH OF 1 AND 3 | (G0_a\|A0_a) \| (G0_b\|A0_b) \| (G1_a\|A1_a) \| \| (G2_a\|A2_a) REGION #_b CAN BE OMITTED DEPENDING ON APPLICATION | ONLY REGION OF INTEREST OF HIGH RESOLUTION DATA CAN BE DECODED EARLIER |
| 5 | DIVISION IN TIME DIRECTION | INSERT SEPARATOR BETWEEN FRAMES | Frame0 \| Frame1 \| ... · Frame x: x-TH FRAM | VIDEO DECODING |
| 6 | Mesh Texture DATA | BETWEEN Vertex POSITION AND Connection OF Face, OR BRAKE IN Texture WHEN DIVISION INTO EVERY REGION (PART) IS MADE | V\|F\|T · V: Vertex INFORMATION (VERTEX INFORMATION) · F: Face INFORMATION (CONNECTION INFORMATION) · T: Texture INFORMATION (COLOR INFORMATION) T_a\|T_b\|T_c · _x: SUB-BITSTREAM CORRESPONDING TO REGION x IN Texture map | COMPATIBLE WITH Mesh Texture |

FIG. 38
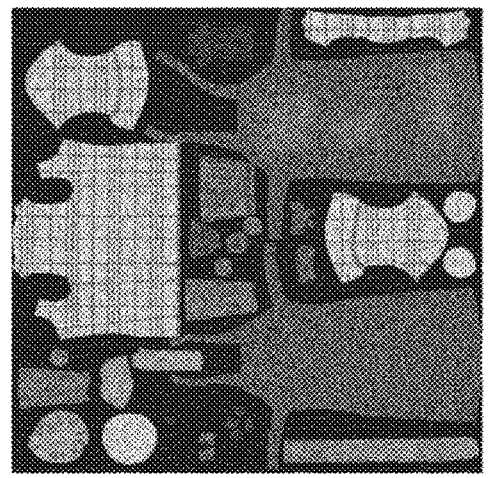
B
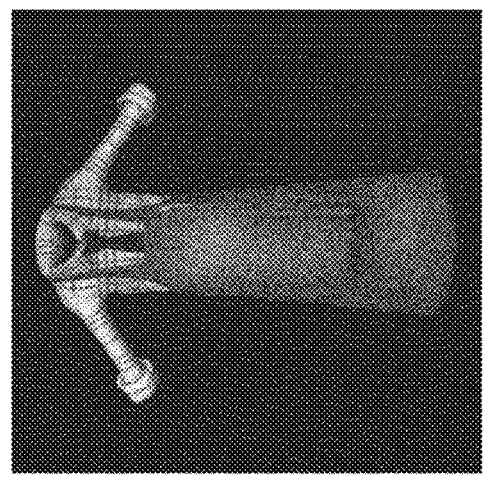
A

INFORMATION PROCESSING APPARATUS AND INFORMATION PROCESSING METHOD

CROSS-REFERENCE TO RELATED APPLICATIONS

The present application is based on PCT filing PCT/JP2018/036966, filed Oct. 3, 2018, which claims priority to JP 2017-200585, filed Oct. 16, 2017, the entire contents of each are incorporated herein by reference.

TECHNICAL FIELD

The present disclosure relates to information processing apparatus and method, and more particularly, to information processing apparatus and method capable of suppressing an increase in load for encoding and decoding 3D data.

BACKGROUND ART

Conventionally, a method of encoding and decoding point cloud data representing a three-dimensional structure by point cloud position information or attribute information or the like, utilizing an existing codec for a two-dimensional image has been studied (see, for example, Non-Patent Document 1).

CITATION LIST

Non-Patent Document

Non-Patent Document 1: Samsung Research America, "OMAF: Point cloud video track", INTERNATIONAL ORGANISATION FOR STANDARDISATION ORGANISATION INTERNATIONALE DE NORMALISATION ISO/IEC JTC1/SC29/WG11 CODING OF MOVING PICTURES AND AUDIO, ISO/IEC JTC1/SC29/WG11 MPEG2017/m41206, July 2017, Torino, Italy

SUMMARY OF THE INVENTION

Problems to be Solved by the Invention

However, in general, 3D data such as point cloud data has a large data amount compared with 2D data representing a two-dimensional structure such as image data. For this reason, encoding and decoding of point cloud data is highly likely to increase in load compared with the case of 2D data. Therefore, it has been difficult to implement point cloud data encoding and decoding using codecs for two-dimensional images of existing standards such as joint photographic experts group (JPEG) and high efficiency video coding (HEVC).

The present disclosure has been made in view of such circumstances, and is intended to allow suppressing an increase in load for encoding and decoding 3D data.

Solutions to Problems

An information processing apparatus according to an aspect of the present technology is an information processing apparatus including an encoding unit that divides 3D data representing a three-dimensional structure into a plurality of pieces to encode the plurality of divided pieces of the 3D data, multiplexes an obtained plurality of divided bitstreams, and generates one bitstream including a separator indicating a position of a joint between the divided bitstreams.

An information processing method according to an aspect of the present technology is an information processing method including: dividing 3D data representing a three-dimensional structure into a plurality of pieces to encode the plurality of divided pieces of the 3D data; multiplexing an obtained plurality of divided bitstreams; and generating one bitstream including a separator indicating a position of a joint between the divided bitstreams.

An information processing apparatus according to another aspect of the present technology is an information processing apparatus including: an analysis unit that analyzes a separator indicating a position of a joint between divided bitstreams obtained by dividing 3D data representing a three-dimensional structure into a plurality of pieces and encoding the plurality of divided pieces of the 3D data, the separator being included in a bitstream obtained by multiplexing a plurality of the divided bitstreams; and a decoding unit that divides the bitstream into every divided bitstream on the basis of information included in the separator analyzed by the analysis unit, to decode the every divided bitstream.

An information processing method according to another aspect of the present technology is an information processing method including: analyzing a separator indicating a position of a joint between divided bitstreams obtained by dividing 3D data representing a three-dimensional structure into a plurality of pieces and encoding the plurality of divided pieces of the 3D data, the separator being included in a bitstream obtained by multiplexing a plurality of the divided bitstreams; and dividing the bitstream into every divided bitstream on the basis of information included in the analyzed separator to decode the every divided bitstream.

In the information processing apparatus and method according to an aspect of the present technology, 3D data representing a three-dimensional structure is divided into a plurality of pieces and encoded, an obtained plurality of divided bitstreams is multiplexed, and one bitstream including a separator indicating a position of a joint between the divided bitstreams is generated.

In the information processing apparatus and method according to another aspect of the present technology, a separator indicating a position of a joint between divided bitstreams obtained by dividing 3D data representing a three-dimensional structure into a plurality of pieces and encoding the plurality of divided pieces of the 3D data, which is included in a bitstream obtained by multiplexing a plurality of the divided bitstreams, is analyzed, and the bitstream is divided into every divided bitstream on the basis of information included in the analyzed separator and decoded.

EFFECTS OF THE INVENTION

According to the present disclosure, information can be processed. In particular, an increase in load for encoding and decoding 3D data can be suppressed.

BRIEF DESCRIPTION OF DRAWINGS

FIG. 1 is a diagram for explaining an example of a point cloud.

FIG. 4 is a diagram illustrating an example of contents written in a separator.

FIG. 5 is a diagram illustrating an example of ways of dividing.

FIG. 38 is a diagram for explaining an example of the division of texture data.

MODE FOR CARRYING OUT THE INVENTION

Modes for carrying out the present disclosure (hereinafter, referred to as embodiments) will be described below. Note that the description will be given in the following order.
1. 3D Data Encoding and Decoding
2. First Embodiment (Division of Spatial Region)
3. Second Embodiment (Division of Attribute Information)
4. Third Embodiment (Division of Resolution)
5. Fourth Embodiment (Division in Time Direction)
6. Fifth Embodiment (Division of Mesh Data)
7. Others 1. 3D Data Encoding and Decoding <Point Cloud>

Conventionally, there are data such as a point cloud representing a three-dimensional structure by point cloud position information or attribute information or the like, and a mesh that is constituted by vertices, edges, and faces, and defines a three-dimensional shape using a polygonal representation.

For example, in the case of the point cloud, a steric structure as illustrated in A of FIG. 1 is represented as a collection (point cloud) of a large number of points (pieces of point data) as illustrated in B of FIG. 1. That is, data of the point cloud (also referred to as point cloud data) is constituted by position information and attribute information (for example, color or the like) on each point in this point cloud. Accordingly, the data structure is relatively simple, and an arbitrary steric structure can be represented with sufficient accuracy by using a sufficiently large number of points.

<Point Cloud Encoding and Decoding>

However, since the data amount of such point cloud and mesh and other data is relatively large, compression of the data amount by encoding or the like is required. For example, a method of encoding and decoding the point cloud data utilizing an existing codec for a two-dimensional image has been studied in Non-Patent Document 1.

Figure 2:
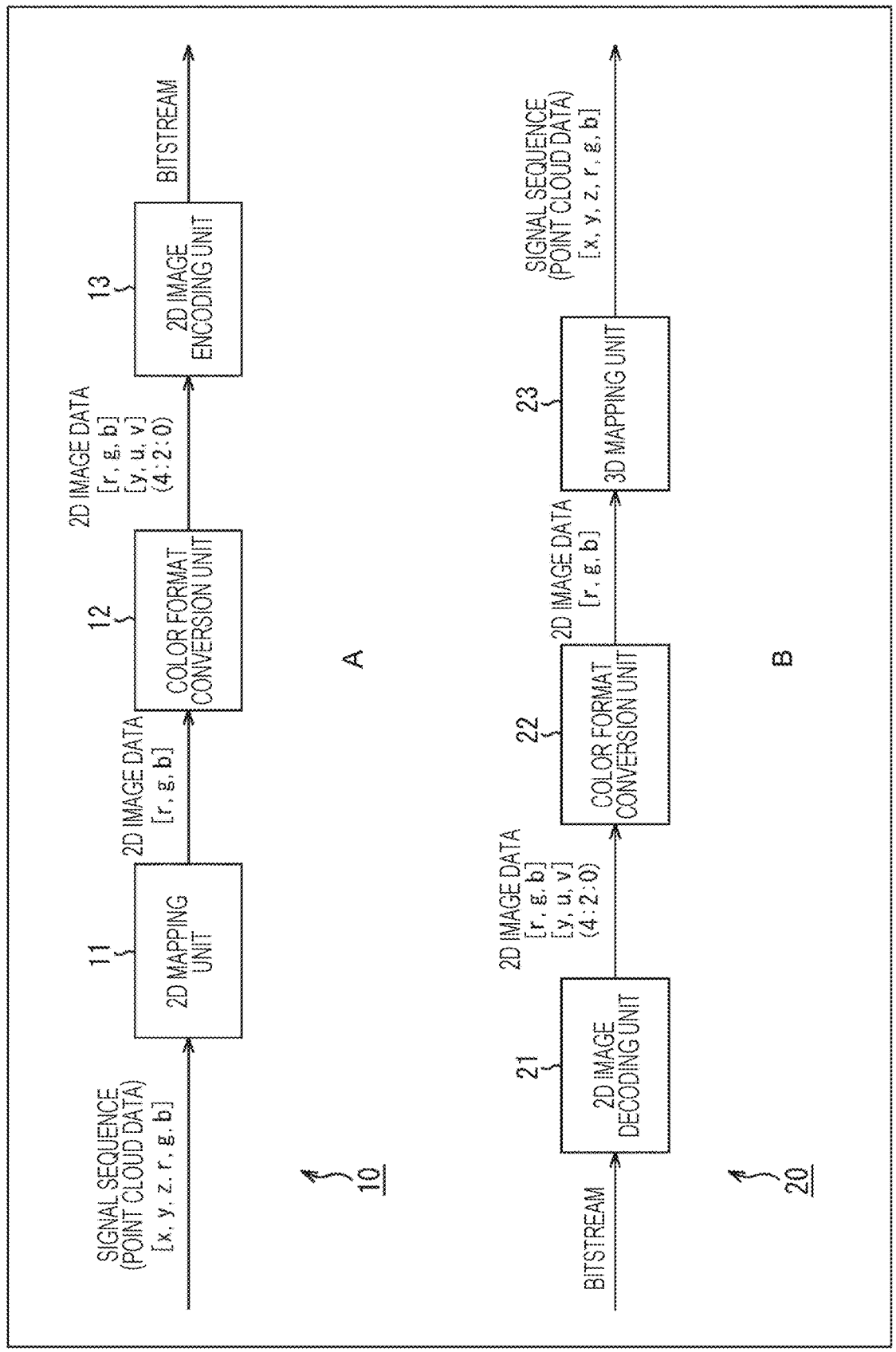
FIG. 2 is a diagram for explaining an example of conventional encoding and decoding.

For example, in the case of an encoding apparatus 10 illustrated in A of FIG. 2, a signal sequence of point cloud data, which is 3D data representing a three-dimensional structure, is input. The point cloud data is a collection of points indicated by coordinates (x, y, z) and color information (r, g, b), for example. A 2D mapping unit 11 maps each point of this point cloud data on a two-dimensional space, and generates 2D image data, which is 2D data representing a two-dimensional structure. In the 2D image data, color information (r, g, b) is indicated for each pixel.

A color format conversion unit 12 converts the color format of the 2D image data from the RGB format to the YUV format with a color sampling type of 4:2:0. That is, in the 2D image data after format conversion, color information (y, u, v) is indicated for each pixel.

A 2D image encoding unit 13 encodes this converted 2D image data with an encoding technique of an existing standard such as joint photographic experts group (JPEG) or high efficiency video coding (HEVC), and generates a bitstream.

For example, in the case of a decoding apparatus 20 illustrated in B of FIG. 2, this generated bitstream is input. A 2D image decoding unit 21 decodes this input bitstream by a decoding technique corresponding to the encoding technique of the 2D image encoding unit 13, that is, by a decoding technique of an existing standard such as JPEG or HEVC, and generates 2D image data. In this 2D image data, color information (y, u, v) is indicated for each pixel.

A color format reverse conversion unit 22 converts the color format of this generated 2D image data from the YUV format to the RGB format. That is, in the 2D image data after format conversion, color information (r, g, b) is indicated for each pixel.

A 3D mapping unit 23 maps each pixel of this 2D image data on a three-dimensional space, and generates a signal sequence of point cloud data. That is, in this point cloud data, coordinates (x, y, z) and color information (r, g, b) are indicated for each point.

As described above, by mapping each point of the point cloud two-dimensionally, encoding and decoding using an existing codec for a two-dimensional image becomes theoretically possible. By utilizing an existing codec for a two-dimensional image, development is facilitated and an increase in cost can be suppressed.

However, in general, 3D data has a large amount of data compared with 2D data due to an increase in dimensions. For this reason, encoding and decoding of 3D data is highly likely to increase in load compared with the case of 2D data, and in practice, it has been difficult to implement encoding and decoding using an existing codec for a two-dimensional image.

For example, when point cloud data made up of 100 M (mega) points is mapped on a two-dimensional space, the number of pixels in this case is 10 times or more that of a 4K image (approximately 8 M (mega) pixels).

If the data amount to be processed increases in this manner, there is a possibility that constraints of the codec standard will be violated. For example, there is a possibility that the image frame (image size) exceeds the upper limit of the image frame setting of the standard. If constraints of the standard are violated as described above, encoding and decoding cannot be performed and a bitstream has not been allowed to be generated.

Furthermore, even if encoding and decoding are allowed to be performed by ignoring constraints of the standard, the load increases as the data amount to be processed increases, and thus it has been difficult to perform encoding and decoding with a realistic processing amount.

In addition, even if a codec for 3D data is developed without using an existing codec for a two-dimensional image, and encoding and decoding are performed using the developed codec, the load still increases as the data amount to be processed increases.

That is, in order to implement encoding and decoding of 3D data, it has been required to suppress an increase in load for encoding and decoding.

<Bitstream Including Separator>

In view of this, in encoding, 3D data representing a three-dimensional structure is divided into a plurality of pieces and encoded, an obtained plurality of divided bitstreams is multiplexed, and one bitstream including a separator indicating a position of a joint between the multiplexed divided bitstreams is generated.

For example, an information processing apparatus includes an encoding unit that divides 3D data representing a three-dimensional structure into a plurality of pieces to encode the plurality of divided pieces of the 3D data, multiplexes an obtained plurality of divided bitstreams, and generates one bitstream including a separator indicating a position of a joint between the divided bitstreams.

By encoding 3D data by dividing the 3D data into a plurality of pieces in this manner, it is possible to suppress an increase in load for encoding and to suppress the processing amount to a realistic level. Accordingly, encoding using an existing codec for a two-dimensional image can be implemented. This can further facilitate the development of an apparatus and a system that encode 3D data.

Furthermore, by using a separator, the position of a joint between divided bitstreams can be more easily grasped at the time of decoding. That is, the division of the bitstream into every divided bitstream can be more easily implemented. Accordingly, decoding using an existing codec for a two-dimensional image can be more easily implemented.

In addition, in decoding, a separator indicating a position of a joint between divided bitstreams obtained by dividing 3D data representing a three-dimensional structure into a plurality of pieces and encoding the plurality of divided pieces of the 3D data, which is included in a bitstream obtained by multiplexing a plurality of the divided bitstreams, is analyzed, and the bitstream is divided into every divided bitstream on the basis of information included in the analyzed separator, and decoded.

For example, an information processing apparatus includes: an analysis unit that analyzes a separator indicating a position of a joint between divided bitstreams obtained by dividing 3D data representing a three-dimensional structure into a plurality of pieces and encoding the plurality of divided pieces of the 3D data, the separator being included in a bitstream obtained by multiplexing a plurality of the divided bitstreams; and a decoding unit that divides the bitstream into every divided bitstream on the basis of information included in the separator analyzed by the analysis unit, to decode the every divided bitstream.

By decoding 3D data by dividing the bitstream of the 3D data into a plurality of pieces in this manner, it is possible to suppress an increase in load for decoding and to suppress the processing amount to a realistic level. Accordingly, decoding using an existing codec for a two-dimensional image can be implemented. This can further facilitate the development of an apparatus and a system that decode a bitstream of 3D data.

Furthermore, by analyzing the separator, the position of a joint between the divided bitstreams can be more easily grasped from information in the analyzed separator at the time of decoding. That is, the division of the bitstream into every divided bitstream can be more easily implemented. Accordingly, decoding using an existing codec for a two-dimensional image can be more easily implemented.

In addition, as described above, by adopting a configuration that allows to divide the bitstream into a plurality of divided bitstreams, the bitstream can be divided into an arbitrary data size by controlling the data size of the divided bitstream. Accordingly, for example, it becomes also possible to divide the bitstream with a data size according to a maximum transmission unit (MTU) size. By divide the bitstream in this manner, network transmission and rate control can be performed more easily.

Besides, as described above, since the 3D data is divided when encoded and the obtained bitstream is divided when decoded, partial decoding for decoding a part of the bitstream can be easily implemented. In addition, since a parameter can be controlled for each divided bitstream, scalable decoding can be implemented for a desired parameter. For example, by changing the resolution for each divided bitstream (dividing the bitstream for each resolution), the resolution of the decoding result can be controlled depending on which divided bitstream is to be decoded. That is, scalable decoding with respect to resolution can be implemented.

Note that the separator may include information on the divided bitstream corresponding to this particular separator. By configuring in this manner, information included in the divided bitstream, the processing method for each divided bitstream, and the like can be easily grasped at the time of decoding. Accordingly, since it is possible to grasp which divided bitstream is supposed to be decoded, by the information included in this separator, an appropriate divided bitstream can be easily selected and decoded in the partial decoding and scalable decoding described above. That is, the above-described partial decoding and scalable decoding can be implemented more easily.

Furthermore, data obtained by decoding each divided bitstream can be correctly synthesized with more ease by the information included in the separator. Accordingly, constraints on the transmission order or decoding order of each divided bitstream are suppressed, and transmission and decoding can be performed in a more free order. For example, the parallelization of these processes can be implemented more easily.

<Separator>

This separator may include any information, and especially may have a unique bit pattern, for example. By providing a unique bit pattern, the detection of the separator included in the bitstream is further facilitated at the time of decoding.

Furthermore, the position of a joint between the divided bitstreams may be indicated by the position of the separator itself. That is, at the time of encoding, the separator may be arranged at a joint between the respective divided bitstreams by connecting respective ones of the plurality of divided bitstreams in series such that the separator is sandwiched. By configuring in this manner, a position where the bitstream is divided can be grasped more easily at the time of decoding.

In different terms, at the time of decoding, the bitstream may be divided at a position indicated by the separator. More specifically, for example, the separator may indicate a position where the bitstream is divided, by the position of the separator itself such that, at the time of decoding, the separator included in the bitstream is detected, and the bitstream is divided at the position of the detected separator. By configuring in this manner, the position of a joint between the divided bitstreams, that is, a position where the bitstream is divided, can be grasped more easily only by detecting the separator. That is, the bitstream can be divided into every divided bitstream and decoded more easily.

Note that, as described earlier, this separator may have a unique bit pattern. By configuring as mentioned above, the detection of the separator at the time of decoding can be further facilitated.

<Separator Arrangement>

Figure 3:
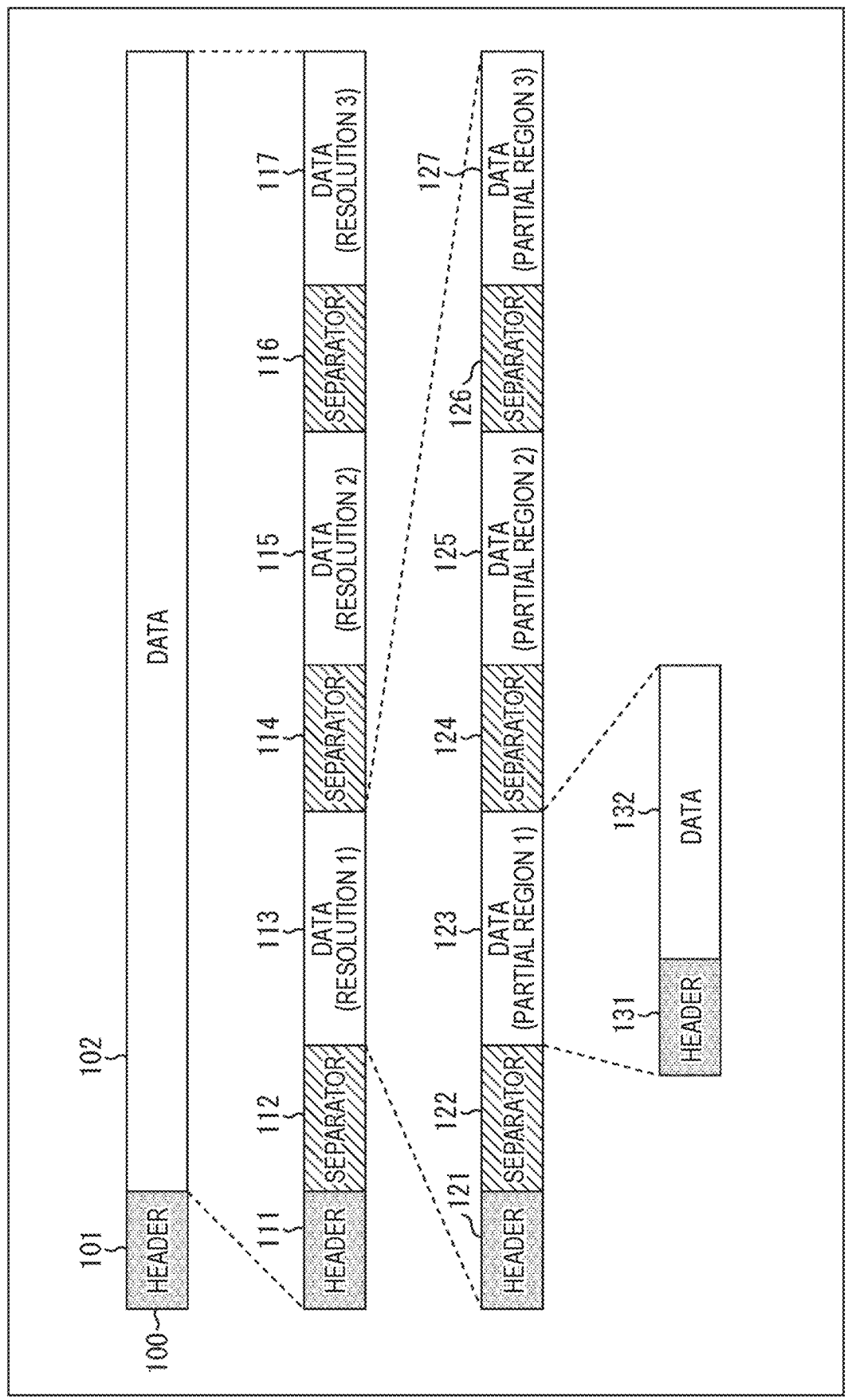
FIG. 3 is a diagram illustrating a main configuration example of a bitstream.

FIG. 3 is a diagram illustrating a main configuration example of a bitstream having the above-described separator. For example, as illustrated in the uppermost line of FIG. 3, a bitstream 100 is constituted by a header 101 and data 102 corresponding to this header 101.

This data 102 is divided and encoded for each resolution, for example. That is, as illustrated in the second line from the top of FIG. 3, the data 102 is constituted by a header 111, a separator 112, data (resolution 1) 113, a separator 114, data (resolution 2) 115, a separator 116, and data (resolution 3) 117 connected in series to each other.

The separator 112 corresponds to the data (resolution 1) 113 and is connected in front (on the left side in the figure) of the data (resolution 1) 113. That is, the header 111 and the data (resolution 1) 113 are connected in series so as to sandwich the separator 112. The separator 114 corresponds to the data (resolution 2) 115 and is arranged between (at a joint between) the data (resolution 1) 113 and the data (resolution 2) 115. That is, the data (resolution 1) 113 and the data (resolution 2) 115 are connected in series so as to sandwich the separator 114. The separator 116 corresponds to the data (resolution 3) 117 and is arranged between (at a joint between) the data (resolution 2) 115 and the data (resolution 3) 117. That is, the data (resolution 2) 115 and the data (resolution 3) 117 are connected in series so as to sandwich the separator 116.

That is, the data 102 (bitstream) is divided into the data (resolution 1) 113, the data (resolution 2) 115, and the data (resolution 3) 117 (that is, three divided bitstreams) for each resolution, and the separators are arranged (embedded) between the respective pieces of the data.

Accordingly, by detecting these separators in the data 102 at the time of decoding and dividing the data 102 at the positions of the separators, the bitstream can be more easily divided into every divided stream.

Note that, although FIG. 3 illustrates an example in which the data 102 is divided on the basis of the resolution, the data 102 may be divided on the basis of an arbitrary parameter. Furthermore, the number of divisions is arbitrary and may be other than the three divisions illustrated in FIG. 3.

In addition, the structure of such divisions can be hierarchized. For example, as illustrated in the third line from the top of FIG. 3, the data (resolution 1) 113 is constituted by a header 121, a separator 122, data (partial region 1) 123, a separator 124, data (partial region 2) 125, a separator 126, and data (partial region 3) 127 connected in series to each other.

The separator 122 corresponds to the data (partial region 1) 123 and is connected in front (on the left side in the figure) of the data (partial region 1) 123. That is, the header 121 and the data (partial region 1) 123 are connected in series so as to sandwich the separator 122. The separator 124 corresponds to the data (partial region 2) 125 and is arranged between (at a joint between) the data (partial region 1) 123 and the data (partial region 2) 125. That is, the data (partial region 1) 123 and the data (partial region 2) 125 are connected in series so as to sandwich the separator 124. The separator 126 corresponds to the data (partial region 3) 127 and is arranged between (at a joint between) the data (partial region 2) 125 and the data (partial region 3) 127. That is, the data (partial region 2) 125 and the data (partial region 3) 127 are connected in series so as to sandwich the separator 126.

That is, the data (resolution 1) 113 (bitstream) is divided into the data (partial region 1) 123, the data (partial region 2) 125, and the data (partial region 3) 127 (that is, three divided bitstreams) for each partial region, and the separators are arranged (embedded) between the respective pieces of the data.

Accordingly, also in the data (resolution 1) 113, by detecting these separators at the time of decoding and dividing the data (resolution 1) 113 at the positions of the separators, the bitstream can be more easily divided into every divided stream. That is, the bitstream can be divided in a plurality of hierarchies. That is, the bitstream can be divided on the basis of more diverse parameters. Furthermore, the bitstream can be more easily divided into arbitrary data sizes.

Note that, although FIG. 3 illustrates an example in which the data (resolution 1) 113 is divided on the basis of the partial region, the data (resolution 1) 113 may be divided on the basis of an arbitrary parameter. In addition, the number of divisions is arbitrary and may be other than the three divisions illustrated in FIG. 3, such as four divisions or more and two divisions or less. Moreover, in the above, an example in which separators are arranged in each hierarchy of a two-tier hierarchical structure has been described; however, the number of hierarchies of separators embedded in the bitstream is arbitrary, and is not limited to the example in FIG. 3. That is, each piece of the data in the second line (the data (partial region 1) 123, the data (partial region 2) 125, and the data (partial region 3) 127) may be further divided.

Note that, as illustrated in the fourth line from the top of FIG. 3, the undivided data (partial region 1) 123 is constituted by a header 131 and data 132. That is, there is no separator. The data (partial region 2) 125 and the data (partial region 3) 127 also have configurations similar to the configuration of the data (partial region 1) 123 when the data is not divided.

<Information Written in Separator>

Arbitrary information may be held in this separator. For example, as illustrated in the second line from the top of a table illustrated in FIG. 4, a bit pattern (for example, a start code) that is unique in the bitstream may be included in the separator. Note that, of course, the bit length of this unique bit pattern is arbitrary.

Furthermore, for example, information regarding the divided bitstream corresponding to the separator may be included in this particular separator. This information regarding the divided bitstream is arbitrary. For example, various types of information described in the table illustrated in FIG. 4 may be written in the separator as this information regarding the divided bitstream.

For example, this information regarding the divided bitstream may include position information indicating the position of a part of the three-dimensional structure of the 3D data corresponding to the divided bitstream. For example, this position information may include information indicating the start position of a part of the three-dimensional structure of the 3D data corresponding to the divided bitstream. Furthermore, for example, this position information may further include information indicating the range of a part of the three-dimensional structure of the 3D data corresponding to the divided bitstream. That is, for example, as the information regarding the divided bitstream, position information indicating the correspondence between the original point cloud and the divided bitstream may be included in the separator.

In addition, for example, this information regarding the divided bitstream may include information regarding the contents of this particular divided bitstream. That is, for example, as illustrated in the fifth line from the top of FIG. 4, attribute information on the divided bitstream to which the separator corresponds may be included in this particular separator. In addition, for example, this information regarding the divided bitstream may include information regarding the type of information included in this particular divided bitstream.

Besides, for example, this information regarding the divided bitstream may include information regarding the time of a frame corresponding to this particular divided bitstream (for example, picture order count (POC)). That is, for example, as illustrated in the sixth line from the top of FIG. 4, information regarding the time of a frame corresponding to the divided bitstream to which the separator corresponds may be included in this particular separator.

Furthermore, for example, as illustrated in the seventh line from the top of FIG. 4, this information regarding the divided bitstream may include information regarding the data size (bitstream size) of this particular divided bitstream.

In addition, for example, as illustrated in the eighth line from the top of FIG. 4, this information regarding the divided bitstream may include information regarding the encoding method used for encoding to generate this particular divided bitstream. Likewise, for example, this information regarding the divided bitstream may include information regarding the decoding method for this particular divided bitstream.

Additionally, for example, as illustrated in the ninth line from the top of FIG. 4, this information regarding the divided bitstream may include information regarding the prediction method applied in encoding to generate this particular divided bitstream. Likewise, for example, this information regarding the divided bitstream may include information regarding the prediction method applied in decoding of this particular divided bitstream.

Furthermore, for example, as illustrated in the tenth line from the top of FIG. 4, this information regarding the divided bitstream may include information indicating a reference destination of prediction in encoding to generate this particular divided bitstream. Likewise, for example, this information regarding the divided bitstream may include information indicating a reference destination of prediction performed in decoding of this particular divided bitstream.

In addition, for example, as illustrated in the eleventh line from the top of FIG. 4, this information regarding the divided bitstream may include sequence level information.

Furthermore, for example, as illustrated in the twelfth line from the top of FIG. 4, this information regarding the divided bitstream may include information regarding a resolution corresponding to this particular divided bitstream. Likewise, for example, this information regarding the divided bitstream may include information indicating a reference destination of prediction performed in decoding of this particular divided bitstream.

In addition, for example, as illustrated in the thirteenth line from the top of FIG. 4, this information regarding the divided bitstream may include information indicating the type of color sampling of data obtained by decoding this particular divided bitstream (for example, 4:4:4, 4:2:2, or 4:2:0). Likewise, for example, this information regarding the divided bitstream may include information indicating the type of color sampling of data obtained by decoding this particular divided bitstream.

Additionally, for example, as illustrated in the lowermost line in FIG. 4, this information regarding the divided bitstream may include information indicating the bit width of data obtained by decoding this particular divided bitstream.

<Ways of Dividing>

How the bitstream is divided is arbitrary. For example, as indicated in the column of "perspective of division" in the uppermost row (excluding the item name row) of a table illustrated in FIG. 5 (a row with "1" in the leftmost column), the 3D data may be divided and encoded such that the spatial region is divided.

In that case, as indicated in the column of "position to insert separator", the region may be divided in a two-dimensional space, or the region may be divided in a three-dimensional space. The divided bitstream is generated by encoding data of each divided region. That is, the separator is arranged between divided bitstreams (also referred to as sub-bitstreams) corresponding to respective divided regions.

For example, as indicated in the column of "division example", in the case of division into three regions (a, b, c), the separators (|) are arranged for geometry data (G), which is position information on points, between respective ones of a divided bitstream (G_a) obtained by encoding the geometry data of the region a, a divided bitstream (G_b) obtained by encoding the geometry data of the region b, and a divided bitstream (G_c) obtained by encoding the geometry data of the region c (G_a|G_b|G_c). Similarly, for attribute data (A), which is attribute information on points, the separators (|) are arranged between respective ones of a divided bitstream (A_a) obtained by encoding the attribute data of the region a, and a divided bitstream obtained by encoding the attribute data of the region b (A_b), and a divided bitstream (A_c) obtained by encoding the attribute data of the region c (A_a|A_b|A_c).

By configuring the bitstream in this manner, only a part of the region of the divided bitstream can be decoded. That is, partial decoding can be implemented.

Furthermore, for example, as indicated in the column of "perspective of division" in the second row from the top (excluding the item name row) of the table illustrated in FIG. 5 (a row with "2" in the leftmost column), the 3D data may be divided and encoded such that the position information and the attribute information (that is, the geometry data and the attribute data) are divided. In addition, the attribute data may be further divided and encoded for each attribute such as color information, normal line information, and transparency.

In that case, the geometry data and the attribute data are divided as indicated in the column of "position to insert separator". Moreover, the attribute data may be divided for each attribute such as color, normal line, and transparency. The divided bitstream is generated by encoding data for each divided attribute. That is, the separator is arranged between the divided bitstreams corresponding to the divided respective attributes (for each type of information).

For example, as indicated in the column of "division example", when the geometry data and the attribute data are divided, the separator (|) is arranged between a divided bitstream (G) obtained by encoding the geometry data and a divided bitstream (A) obtained by encoding the attribute data (G|A). Furthermore, when the attribute data is further divided for each attribute such as color information, normal line information, and transparency, the separators (|) are arranged between respective ones of a divided bitstream (G) obtained by encoding the geometry data, a divided bitstream (C) obtained by encoding color information in the attribute data, a divided bitstream (N) obtained by encoding normal line information in the attribute data, and a divided bitstream ($\alpha$) obtained by encoding transparency in the attribute data (G|C|N|$\alpha$).

By configuring the bitstream in this manner, the attribute information can be decoded in parallel.

For example, as indicated in the column of "perspective of division" in the third row from the top (excluding the item name row) of the table illustrated in FIG. 5 (a row with "3" in the leftmost column), the 3D data may be divided and encoded such that the spatial resolution (hierarchy) is divided.

In that case, as indicated in the column of "position to insert separator", dividing and encoding is performed for each hierarchy. For example, in the case of an octree, division for each level (LOD) of the octree such as LOD0, LOD1, . . . may be adopted, or in the case of a general representation, division for each layer such as Layer0, Layer1, . . . may be adopted. Note that the 3D data may be hierarchized in advance, or the single-hierarchy 3D data may be hierarchized and then divided and encoded for each layer.

The divided bitstream is generated by encoding data for each divided hierarchy. That is, the separator is arranged between divided bitstreams (also referred to as sub-bitstreams) corresponding to respective divided hierarchies.

For example, as indicated in the column of "division example", in the case of division into two hierarchies (L0, L1), the separators (|) are arranged each between a divided bitstream (G_L0) obtained by encoding the geometry data of the hierarchy L0, and a divided bitstream (G_L1) obtained by encoding the geometry data of the hierarchy L1, between a divided bitstream (A_L0) obtained by encoding the attribute data of the hierarchy L0, and a divided bitstream (A_L1) obtained by encoding the attribute data of the hierarchy L1, and between the geometry data and the attribute data ((G_L0|G_L1)|(A_L0|A_L1)|).

By configuring the bitstream in this manner, only a part of the region of the divided bitstream can be decoded. That is, scalable decoding can be implemented.

Note that the above-described respective division examples can be combined as appropriate. For example, as indicated in the column of "perspective of division" in the fourth row from the top (excluding the item name row) of the table illustrated in FIG. 5 (a row with "4" in the leftmost column), the division of spatial region and the division of spatial resolution may be used in combination.

In that case, as indicated in the column of "position to insert separator", the separators are arranged both for each region and each hierarchy.

For example, as indicated in the column of "division example", it is assumed that the geometry data and the attribute data are divided into two regions (a, b) and three hierarchies (0, 1, 2), respectively. In that case, the separator (|) is arranged between a divided bitstream (G0_a) obtained by encoding the geometry data of the hierarchy L0 and the region a, and a divided bitstream (A0_a) obtained by encoding the attribute data of the hierarchy L0 and the region a (G)_a|A0_a). Similarly, the separator (|) is also arranged between a divided bitstream (G0_b) obtained by encoding the geometry data of the hierarchy L0 and the region b, and a divided bitstream (A0_b) obtained by encoding the attribute data of the hierarchy L0 and the region b (G0_b|A0_b). Furthermore, similarly, the separator (|) is also arranged between a divided bitstream (G1_a) obtained by encoding the geometry data of the hierarchy L1 and the region a, and a divided bitstream (A1_a) obtained by encoding the attribute data of the hierarchy L1 and the region a (G1_a|A1_a). Moreover, similarly, the separator (|) is also arranged between a divided bitstream (G2_a) obtained by encoding the geometry data of the hierarchy L2 and the region a, and a divided bitstream (A2_a) obtained by encoding the attribute data of the hierarchy L2 and the region a (G2_a|A2_a).

Besides, the separator is also arranged between the divided bitstreams of the region a and the divided bitstreams of the region b ((G0_a|A0_a)|(G0_b|A0_b)). Similarly, the separators are also arranged between the divided bitstreams of the hierarchy L0, the divided bitstreams of the hierarchy L1, and the divided bitstreams of the hierarchy L2 ((G0_a|A0_a)|(G0_b|A0_b)|(G1_a|A1_a)||(G2_a|A2_a)).

With such a configuration, partial decoding and scalable decoding can be implemented. Accordingly, decoding can be performed more freely. For example, it is also possible to decode only a region of interest of high resolution data earlier.

Furthermore, for example, as indicated in the column of "perspective of division" in the fifth row from the top (excluding the item name row) of the table illustrated in FIG. 5 (a row with "5" in the leftmost column), the 3D data may be divided and encoded so as to be divided in the time direction. For example, the 3D data may be divided and encoded for each one frame.

In that case, as indicated in the column of "position to insert separator", the divided bitstream is generated for each frame. Then, the separator is arranged between the divided bitstreams corresponding to respective frames.

For example, as indicated in the column of "division example", the separators (|) are arranged between the divided bitstreams corresponding to respective frames (Frame0|Frame1| . . . ).

By configuring the bitstream in this manner, for example, point cloud data of a moving image also can be decoded.

Note that such encoding and decoding can be applied to 3D data other than the point cloud data. For example, as indicated in the column of "perspective of division" in the lowermost row of the table illustrated in FIG. 5 (a row with "6" in the leftmost column), mesh data may be divided and encoded.

In that case, as indicated in the column of "position to insert separator", the divided bitstream is generated for each type of information. For example, the mesh data is divided into vertex data (Vertex), connection data (Face), and texture data (Texture), and encoded. Then, the separators are arranged between the divided bitstreams of these pieces of data.

For example, as indicated in the column of "division example", the separators (|) are arranged between respective ones of a divided bitstream (V) corresponding to the vertex data, a divided bitstream (F) corresponding to the connection data, and a divided bitstream (T) corresponding to the texture data (V|F|T). Furthermore, the texture data (T) may be further divided and encoded for each part (component) arranged in the two-dimensional space. In that case, the separators (|) are additionally arranged between respective components of the texture data (T) (T_a|T_b|T_c).

By configuring the bitstream in this manner, the mesh data can also be decoded.

2. First Embodiment

<2-1. Division of 2D Spatial Region>

Next, each variation described with reference to the table in FIG. 5 will be described in more detail. First, among cases where "division of spatial region" indicated in the uppermost row (excluding the item name row) of the table illustrated in FIG. 5 (a row with "1" in the leftmost column) is performed, the case of "division of region in 2D space" will be described.

<Encoding Apparatus>

Figure 6:
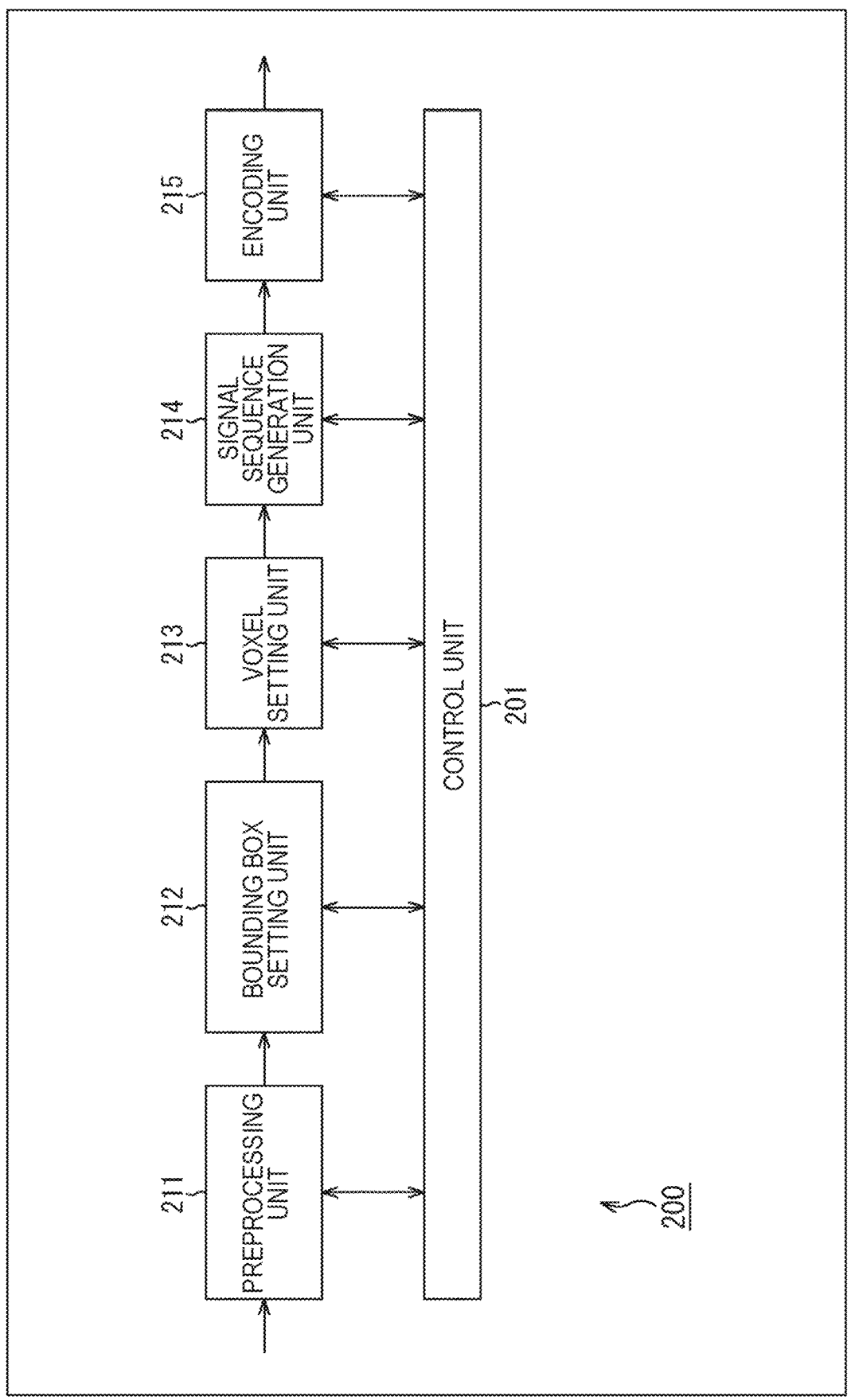
FIG. 6 is a block diagram illustrating a main configuration example of an encoding apparatus.

FIG. 6 is a block diagram illustrating a main configuration example of an encoding apparatus, which is an embodiment of the information processing apparatus to which the present technology is applied. The encoding apparatus 200 illustrated in FIG. 6 encodes data of a point cloud input as an encoding target, using a voxel, and outputs an obtained coded data and the like. At that time, the encoding apparatus 200 performs this encoding by a method to which the present technology is applied as described below.

As illustrated in FIG. 6, the encoding apparatus 200 includes a control unit 201, a preprocessing unit 211, a bounding box setting unit 212, a voxel setting unit 213, a signal sequence generation unit 214, and an encoding unit 215.

The control unit 201 performs a process relating to control of each processing unit in the encoding apparatus 200. For example, the control unit 201 controls the execution or skipping (omission) of a process by each processing unit. For example, the control unit 201 performs such control on the basis of predetermined control information. By performing control in this manner, the control unit 201 can suppress the execution of an unnecessary process, and can suppress an increase in load.

The control unit 201 may have any configuration; for example, the control unit 201 may include a central processing unit (CPU), a read only memory (ROM), a random access memory (RAM), and the like such that the CPU performs a process by loading a program or data stored in the ROM or the like into the RAM and executing the loaded program or data.

The preprocessing unit 211 is controlled by the control unit 201, and conducts a predetermined process as a preprocess on point cloud data (encoding target) input to the encoding apparatus 200 to supply data after the process to the bounding box setting unit 212. Note that the point cloud as an encoding target may be a moving image or a still image.

For example, the control unit 201 causes the preprocessing unit 211 to execute a preprocess when the execution of the preprocess is permitted (not prohibited), in accordance with control information that permits or prohibits the execution of the preprocess. Furthermore, for example, the control unit 201 causes the preprocessing unit 211 to execute a preprocess on an encoding target for which the execution of the preprocess is permitted (not prohibited), in accordance with control information indicating a range of the encoding target for which the execution of the preprocess is to be permitted or prohibited. Moreover, for example, the control unit 201 causes the preprocessing unit 211 to execute a process that is permitted (not prohibited) to be executed, in accordance with control information that designates processing content that is permitted or prohibited to be executed. By performing control in this manner, the execution of an unnecessary preprocess can be suppressed, and an increase in load can be suppressed.

Note that the content of the preprocess is arbitrary. For example, as a preprocess, the preprocessing unit 211 may conduct a process of reducing noise, or may perform a process of altering the resolution (the number of points). Furthermore, for example, the arrangement of each point may be updated such that the density of the point cloud is equalized or a desired bias is given. Moreover, for example, non-point cloud data such as image information having depth information may be input to the encoding apparatus 200 such that the preprocessing unit 211 converts the input data into data of a point cloud as a preprocess.

The preprocessing unit 211 may have any configuration; for example, the preprocessing unit 211 may include a CPU, a ROM, a RAM, and the like such that the CPU performs a preprocess by loading a program or data stored in the ROM or the like into the RAM and executing the loaded program or data.

The bounding box setting unit 212 is controlled by the control unit 201, and performs a process relating to the setting of a bounding box for normalizing position information on the encoding target.

For example, the control unit 201 causes the bounding box setting unit 212 to set a bounding box when the setting of the bounding box is permitted (not prohibited), in accordance with control information that permits or prohibits the setting of the bounding box. Furthermore, for example, the control unit 201 causes the bounding box setting unit 212 to set a bounding box on an encoding target for which the setting of the bounding box is permitted (not prohibited), in accordance with control information indicating a range of the encoding target for which the setting of the bounding box is to be permitted or prohibited. Moreover, for example, the control unit 201 causes the bounding box setting unit 212 to set a bounding box using a parameter that is permitted (not prohibited) to be used, in accordance with control information regarding permission or prohibition of the parameter used for setting the bounding box. By performing setting in this manner, the setting of an unnecessary bounding box and the use of an unnecessary parameter can be suppressed, and an increase in load can be suppressed.

For example, the bounding box setting unit 212 sets a bounding box for each object of the encoding target. For example, as illustrated in A of FIG. 7, when an object 231 and an object 232 are represented by data of a point cloud, the bounding box setting unit 212 sets a bounding box 241 and a bounding box 242 such that the bounding box 241 and the bounding box 242 contain the object 231 and the object 232, respectively, as illustrated in B of FIG. 7. Returning to FIG. 6, once the bounding box is set, the bounding box setting unit 212 supplies information regarding the set bounding box to the voxel setting unit 213.

Note that the bounding box setting unit 212 may have any configuration; for example, the bounding box setting unit 212 may include a CPU, a ROM, a RAM, and the like such that the CPU performs a process relating to the setting of the bounding box by loading a program or data stored in the ROM or the like into the RAM and executing the loaded program or data.

The voxel setting unit 213 is controlled by the control unit 201, and performs a process relating to the setting of a voxel for quantizing position information on the encoding target.

For example, the control unit 201 causes the voxel setting unit 213 to set a voxel when the setting of the voxel is permitted (not prohibited), in accordance with control information that permits or prohibits the setting of the voxel. Furthermore, for example, the control unit 201 causes the voxel setting unit 213 to set a voxel on an encoding target for which the setting of the voxel is permitted (not prohibited), in accordance with control information indicating a range of the encoding target for which the setting of the voxel is to be permitted or prohibited. Moreover, for example, the control unit 201 causes the voxel setting unit 213 to set a voxel using a parameter that is permitted (not prohibited) to be used, in accordance with control information regarding permission or prohibition of the parameter used for setting the voxel. By performing setting in this manner, the setting of an unnecessary voxel and the use of an unnecessary parameter can be suppressed, and an increase in load can be suppressed.

For example, the voxel setting unit 213 sets a voxel in the bounding box set by the bounding box setting unit 212. For example, the voxel setting unit 213 sets a voxel 251 by dividing the bounding box 241 as illustrated in C of FIG. 7. That is, the voxel setting unit 213 quantizes the point cloud data in the bounding box with voxels (that is, voxelization). Note that, when there is a plurality of bounding boxes, the voxel setting unit 213 voxelizes the point cloud data for each bounding box. That is, in the case of the example in B of FIG. 7, the voxel setting unit 213 performs a similar process also on the bounding box 242. Returning to FIG. 6, once the voxels are set as described above, the voxel setting unit 213 supplies the voxelized point cloud data (also referred to as voxel data) (information regarding the data structure for quantizing the position information), attribute information, and the like to the signal sequence generation unit 214.

Note that the voxel setting unit 213 may have any configuration; for example, the voxel setting unit 213 may include a CPU, a ROM, a RAM, and the like such that the CPU performs a process relating to the setting of the voxel by loading a program or data stored in the ROM or the like into the RAM and executing the loaded program or data.

The signal sequence generation unit 214 is controlled by the control unit 201, and performs a process relating to the generation of the signal sequence.

For example, the control unit 201 causes the signal sequence generation unit 214 to generate a signal sequence when the generation of the signal sequence is permitted (not prohibited), in accordance with control information that permits or prohibits the generation of the signal sequence. Furthermore, for example, the control unit 201 causes the signal sequence generation unit 214 to generate a signal sequence for an encoding target for which the generation of the signal sequence is permitted (not prohibited), in accordance with control information indicating a range of the encoding target for which the generation of the signal sequence is to be permitted or prohibited. By performing control in this manner, the generation of an unnecessary signal sequence can be suppressed, and an increase in load can be suppressed.

Figure 7:
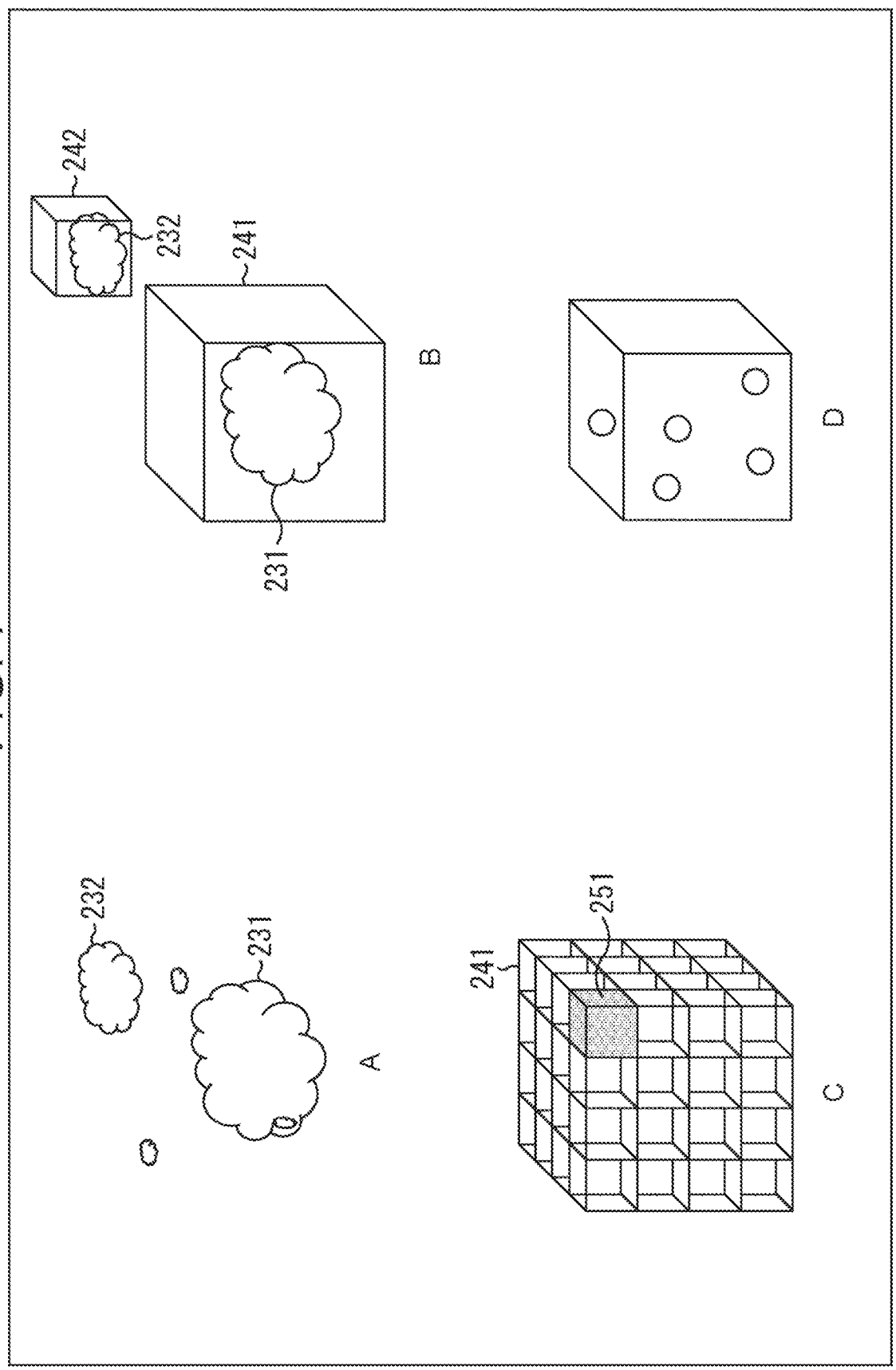
FIG. 7 is a diagram for explaining an example of an outline of encoding.

The signal sequence generation unit 214, for example, encodes voxel data obtained by quantizing the point cloud data (for example, voxel data generated by the voxel setting unit 213 as illustrated in C of FIG. 7), by an arbitrary method such as octree or KDtree to generate a signal sequence. For example, the signal sequence generation unit 214 generates correlation information by encoding voxel data for each block, which is a partial region of a space represented by the voxel data. The signal sequence generation unit 214 transforms the generated correlation information and other information into a signal sequence, and supplies the transformed signal sequence to the encoding unit 215.

Note that the signal sequence generation unit 214 may have any configuration; for example, the signal sequence generation unit 214 may include a CPU, a ROM, a RAM, and the like such that the CPU performs a process relating to the generation of the signal sequence by loading a program or data stored in the ROM or the like into the RAM and executing the loaded program or data.

The encoding unit 215 is controlled by the control unit 201, and performs a process relating to the encoding of the supplied signal sequence.

For example, the control unit 201 causes the encoding unit 215 to encode a signal sequence when the encoding of the signal sequence is permitted (not prohibited), in accordance with control information that permits or prohibits the encoding of the signal sequence. Furthermore, for example, the control unit 201 causes the encoding unit 215 to encode a signal sequence for an encoding target for which the encoding of the signal sequence is permitted (not prohibited), in accordance with control information indicating a range of the encoding target for which the encoding of the signal sequence is to be permitted or prohibited. By performing control in this manner, the encoding of an unnecessary signal sequence can be suppressed, and an increase in load can be suppressed.

For example, the encoding unit 215 encodes the supplied signal sequence to generate coded data (bitstream). At that time, the encoding unit 215 divides 3D data representing a three-dimensional structure into a plurality of pieces to encode the plurality of divided pieces of the 3D data, multiplexes an obtained plurality of divided bitstreams, and generates one bitstream including a separator indicating a position of a joint between the divided bitstreams.

The encoding unit 215 outputs coded data (bitstream) obtained by such encoding to the outside of the encoding apparatus 200. This data (coded data and control information) output from the encoding apparatus 200 may be decoded by, for example, a processing unit (not illustrated) at a subsequent stage to restore the data of a point cloud, or may be sent by a communication unit (not illustrated) to be transmitted to another apparatus such as a decoding apparatus via a predetermined transmission path, or may be recorded in a recording medium (not illustrated).

Note that the encoding unit 215 may have any configuration; for example, the encoding unit 215 may include a CPU, a ROM, a RAM, and the like such that the CPU performs a process relating to encoding by loading a program or data stored in the ROM or the like into the RAM and executing the loaded program or data.

<Encoding Unit>

Figure 8:
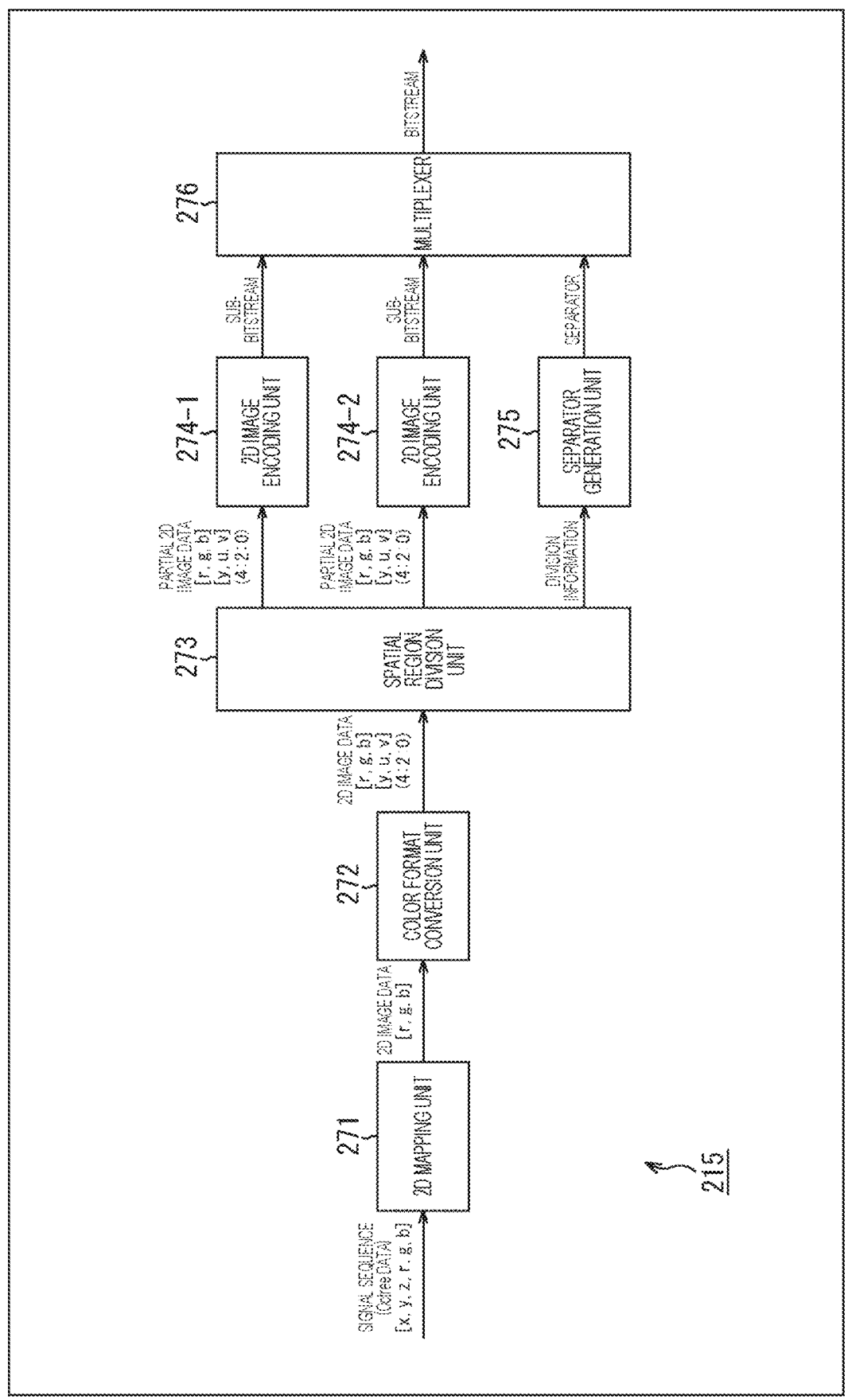
FIG. 8 is a block diagram illustrating a main configuration example of an encoding unit.

FIG. 8 is a block diagram illustrating a main configuration example of an encoding unit 215 (FIG. 6). In this case, the encoding unit 215 generates a plurality of divided bitstreams by converting the 3D data into 2D data representing a two-dimensional structure, and dividing and encoding the converted 2D data on the basis of the two-dimensional structure. As illustrated in FIG. 8, the encoding unit 215 includes a 2D mapping unit 271, a color format conversion unit 272, a spatial region division unit 273, a 2D image encoding unit 274-1, a 2D image encoding unit 274-2, a separator generation unit 275, and a multiplexer 276.

The 2D mapping unit 271 performs a process relating to the mapping of 3D data on a two-dimensional space. The 2D mapping unit 271 is supplied with a signal sequence (for example, octree data) from the signal sequence generation unit 214. This signal sequence is obtained by converting point cloud data, and is 3D data representing a three-dimensional structure substantially equivalent to the point cloud data. Accordingly, also in this signal sequence, each point of the point cloud is indicated by coordinates (x, y, z) and color information (r, g, b).

The 2D mapping unit 271 maps the supplied signal sequence of the 3D data on a two-dimensional space, and generates 2D image data, which is 2D data representing a two-dimensional structure. In the 2D image data, color information (r, g, b) is indicated for each pixel. The 2D mapping unit 271 supplies the generated 2D image data to the color format conversion unit 272.

Note that the 2D mapping unit 271 may have any configuration; for example, the 2D mapping unit 271 may include a CPU, a ROM, a RAM, and the like such that the CPU performs a process relating to mapping by loading a program or data stored in the ROM or the like into the RAM and executing the loaded program or data.

The color format conversion unit 272 converts the color format of the 2D image data supplied from the 2D mapping unit 271 from the RGB format to the YUV format with a color sampling type of 4:2:0. That is, in the 2D image data after format conversion, color information (y, u, v) is indicated for each pixel. Note that the type of color sampling of the 2D image data after format conversion is arbitrary and may be other than 4:2:0. The color format conversion unit 272 supplies the 2D image data obtained by converting the color format to the spatial region division unit 273.

Note that the color format conversion unit 272 may have any configuration; for example, the color format conversion unit 272 may include a CPU, a ROM, a RAM, and the like such that the CPU performs a process relating to the conversion of color format by loading a program or data stored in the ROM or the like into the RAM and executing the loaded program or data.

The spatial region division unit 273 performs a process relating to data division. For example, the spatial region division unit 273 divides the 2D image data after color format conversion supplied from the color format conversion unit 272 such that the two-dimensional structure of the 2D image data is divided into a plurality of partial regions. For example, in the case of FIG. 8, the spatial region division unit 273 divides the supplied 2D image data into two to generate two pieces of partial 2D image data.

The spatial region division unit 273 supplies the respective pieces of the generated partial 2D image data to the 2D image encoding units 274-1 and 274-2. Note that, in the following, the 2D image encoding units 274-1 and 274-2 will be referred to as 2D image encoding units 274 when it is not necessary to distinguish the 2D image encoding units 274-1 and 274-2 from each other for explanation.

Furthermore, the spatial region division unit 273 supplies, to the separator generation unit 275, information regarding the division of the 2D image data, such as how the 2D image data was divided and what information is included in each piece of the partial 2D image data, as division information, for example.

Note that the spatial region division unit 273 may have any configuration; for example, the spatial region division unit 273 may include a CPU, a ROM, a RAM, and the like such that the CPU performs a process relating to the division of data by loading a program or data stored in the ROM or the like into the RAM and executing the loaded program or data.

The 2D image encoding unit 274 performs a process relating to the encoding of 2D image data. For example, the 2D image encoding unit 274 encodes the partial 2D image data supplied from the spatial region division unit 273 to generate a sub-bitstream, which is a divided bitstream. The 2D image encoding unit 274 supplies the generated sub-bitstream to the multiplexer 276.

Note that the 2D image encoding unit 274 may have any configuration; for example, the 2D image encoding unit 274 may include a CPU, a ROM, a RAM, and the like such that the CPU performs a process relating to the encoding of the 2D image data by loading a program or data stored in the ROM or the like into the RAM and executing the loaded program or data.

The separator generation unit 275 performs a process relating to the generation of the separator. For example, the separator generation unit 275 generates a separator having a unique bit pattern. Furthermore, for example, the separator generation unit 275 puts information included in the division information supplied from the spatial region division unit 273 in the separator. The separator generation unit 275 supplies the generated separator to the multiplexer 276.

Note that the separator generation unit 275 may have any configuration; for example, the separator generation unit 275 may include a CPU, a ROM, a RAM, and the like such that the CPU performs a process relating to the generation of the separator by loading a program or data stored in the ROM or the like into the RAM and executing the loaded program or data.

The multiplexer 276 performs a process relating to data multiplexing. For example, the multiplexer 276 multiplexes respective sub-bitstreams supplied from the respective 2D image encoding units 274 and the separators supplied from the separator generation unit 275 to generate one bitstream. At that time, as described with reference to FIG. 3, the multiplexer 276 connects the respective sub-bitstreams in series, and arranges the separator at the position of a joint between the sub-bitstreams. In different terms, the multiplexer 276 connects the respective sub-bitstreams in series such that the separator is sandwiched between the respective sub-bitstreams.

The multiplexer 276 outputs the generated bitstream to the outside of the encoding unit 215 (that is, the outside of the encoding apparatus 200).

Note that the multiplexer 276 may have any configuration; for example, the multiplexer 276 may include a CPU, a ROM, a RAM, and the like such that the CPU performs a process relating to multiplexing by loading a program or data stored in the ROM or the like into the RAM and executing the loaded program or data.

As described above, in this case, the spatial region division unit 273 divides the 2D image data obtained by mapping the 3D data on the two-dimensional space, into a plurality of pieces. Accordingly, the 2D image encoding unit 274 is only required to encode the partial 2D image data that has been divided. Since the data amount of the partial 2D image data is reduced as compared with the 2D image data before division, an increase in load for encoding of the 3D data can be suppressed, and the processing amount can be suppressed to a realistic level.

Note that, this number of divisions (the number of pieces of the partial 2D image data after division) is arbitrary. This number of divisions may be variable. That is, the spatial region division unit 273 can divide the 2D image data into an arbitrary number of pieces of the partial 2D image data. In different terms, the spatial region division unit 273 can control the data amount per one piece of the partial 2D image data by dividing the 2D image data. That is, for example, the image size (resolution) of the partial 2D image data can be restricted to a maximum size or less stipulated in an existing standard for 2D image encoding. Since it is possible to satisfy the constraints of the standard in this manner, the 2D image encoding unit 274 can perform encoding with an encoding technique compliant with existing 2D image encoding standards, for example, JPEG, HEVC, and the like. Accordingly, the encoding unit 215 can be easily developed as compared with a case where a new encoding unit for 3D data is developed from scratch.

Note that the number of the 2D image encoding units 274 is arbitrary. The number of the 2D image encoding units 274 may be single or three or more. Furthermore, this number may be variable or fixed. The number of the 2D image encoding units 274 may be larger or smaller than the number of pieces of the partial 2D image data supplied from the spatial region division unit 273. When the number of the 2D image encoding units 274 is smaller than the number of pieces of the partial 2D image data, a plurality of pieces of the partial 2D image data may be allowed to be encoded by one 2D image encoding unit 274 using, for example, a time division technique or the like.

Note that, as described above with reference to FIG. 3 and other drawings, the separator generation unit 275 generates a separator, and the multiplexer 276 arranges the separator, which is the generated separator, at the position of a joint between the sub-bitstreams connected in series. Accordingly, the position of a joint between the sub-bitstreams (divided bitstreams) can be easily specified by detecting the separator at the time of decoding. Consequently, the division into every sub-bitstream (divided bitstream) can be easily made. Note that, since the separator includes a unique bit pattern as described earlier, the separator can be easily detected.

Furthermore, for the separator, the separator generation unit 275 puts information regarding the division of the 2D image data, which is included in the division information, in the separator, such as how the 2D image data was divided and what information is included in the partial 2D image data, for example. By configuring in this manner, information included in the divided bitstream, the processing method for each divided bitstream, and the like can be easily grasped at the time of decoding.

For example, the separator generation unit 275 writes position information indicating the position of a part of the three-dimensional structure of the 3D data corresponding to the sub-bitstream (divided bitstream), in a separator corresponding to that sub-bitstream. For example, as this position information, the separator generation unit 275 writes information indicating the start position of a part of the three-dimensional structure of the 3D data corresponding to the sub-bitstream, in a separator corresponding to that sub-bitstream. Furthermore, for example, as this position information, the separator generation unit 275 also can further write information indicating the range of a part of the three-dimensional structure of the 3D data corresponding to the sub-bitstream, in a separator corresponding to that sub-bitstream. Accordingly, at the time of decoding, the position of each sub-bitstream in the three-dimensional structure of the 3D data can be easily specified on the basis of these pieces of information, such that each sub-bitstream can be easily synthesized with the correct configuration (that is, can be synthesized so as to have a configuration before division).

<Flow of Encoding Process>

An example of the flow of an encoding process executed by the encoding apparatus 200 having the configuration as described above will be described with reference to a flowchart in FIG. 9.

When the encoding process is started, the preprocessing unit 211 performs a preprocess on input data in step S101.

In step S102, the bounding box setting unit 212 sets a bounding box on the preprocessed data.

In step S103, the voxel setting unit 213 sets a voxel on the bounding box set in step S102.

In step S104, the signal sequence generation unit 214 generates a signal sequence on the basis of the data structure.

In step S105, the encoding unit 215 encodes the signal sequence generated by the process in step S104.

In step S106, the encoding unit 215 outputs a bitstream obtained by the above encoding to the outside of the encoding apparatus 200. This bitstream is transmitted to, for example, a decoding side (a decoding apparatus or the like) or recorded in a recording medium.

Once the process in step S106 ends, the encoding process ends. For example, when the encoding target is a moving image, this series of processes is performed for each frame.

<Flow of Signal Sequence Encoding Process>

Next, an example of the flow of a signal sequence encoding process executed in step S105 in FIG. 9 will be described with reference to a flowchart in FIG. 10.

When the signal sequence encoding process is started, in step S121, the 2D mapping unit 271 maps a signal sequence on a two-dimensional space to generate 2D image data.

In step S122, the color format conversion unit 272 converts the color format of the 2D image data from the RGB format to the YUV format of 4:2:0.

In step S123, the spatial region division unit 273 divides the 2D image data so as to split the region in the two-dimensional space, and generates a plurality of pieces of partial 2D image data.

In step S124, the 2D image encoding unit 274 encodes the 2D image data for each partial region. That is, the 2D image encoding unit 274 encodes each piece of partial 2D image data divided in step S123, and generates a sub-bitstream.

In step S125, the separator generation unit 275 generates a separator corresponding to each sub-bitstream on the basis of the division information.

In step S126, the multiplexer 276 multiplexes the respective sub-bitstreams generated in step S124 and the separators generated in step S125 to generate one bitstream.

Figure 9:
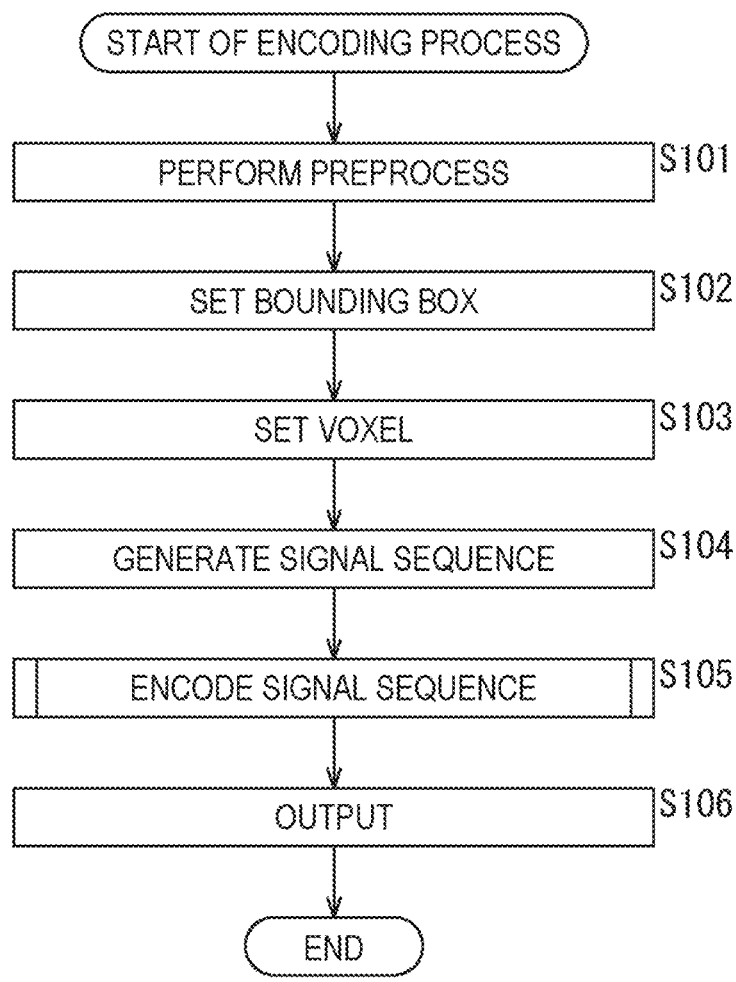
FIG. 9 is a flowchart for explaining an example of the flow of an encoding process.
Figure 10:
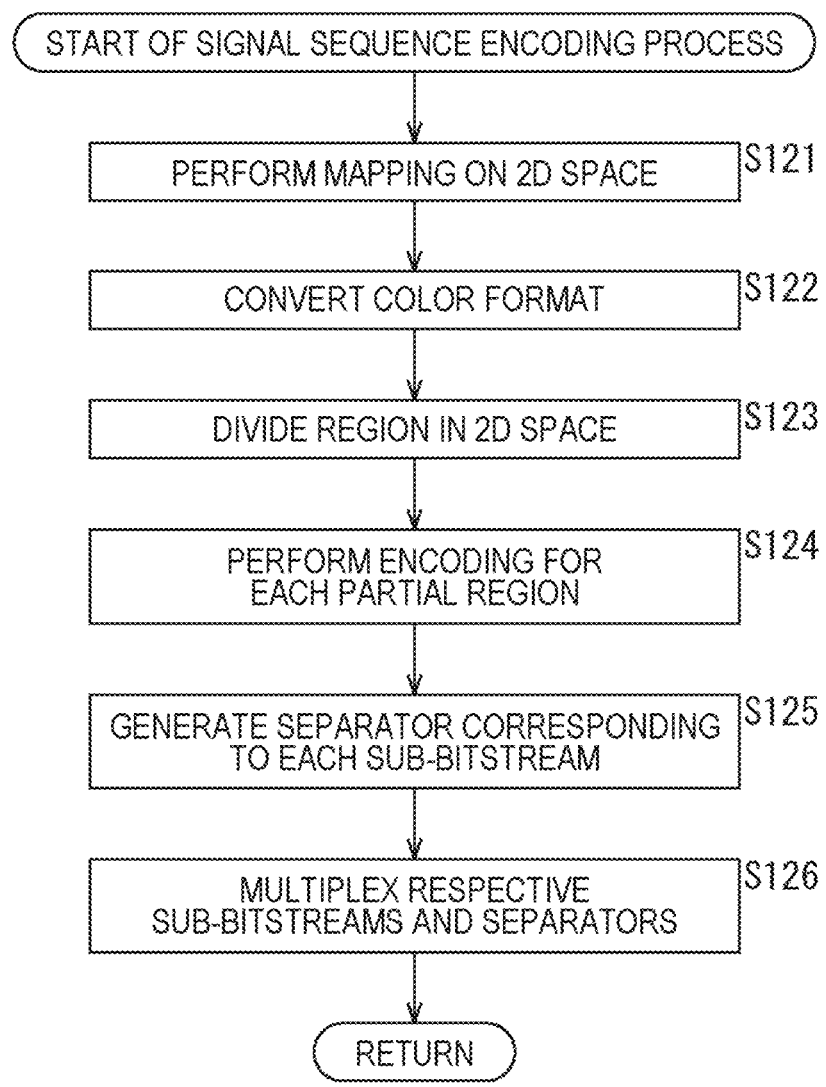
FIG. 10 is a flowchart for explaining an example of the flow of a signal sequence encoding process.

Once the process in step S126 ends, the signal sequence encoding process ends, and the process returns to FIG. 9.

By executing each process as described above, the 3D data can be divided into a plurality of pieces and encoded, such that an increase in load for encoding and decoding the 3D data can be suppressed.

<Decoding Apparatus>

Figure 11:
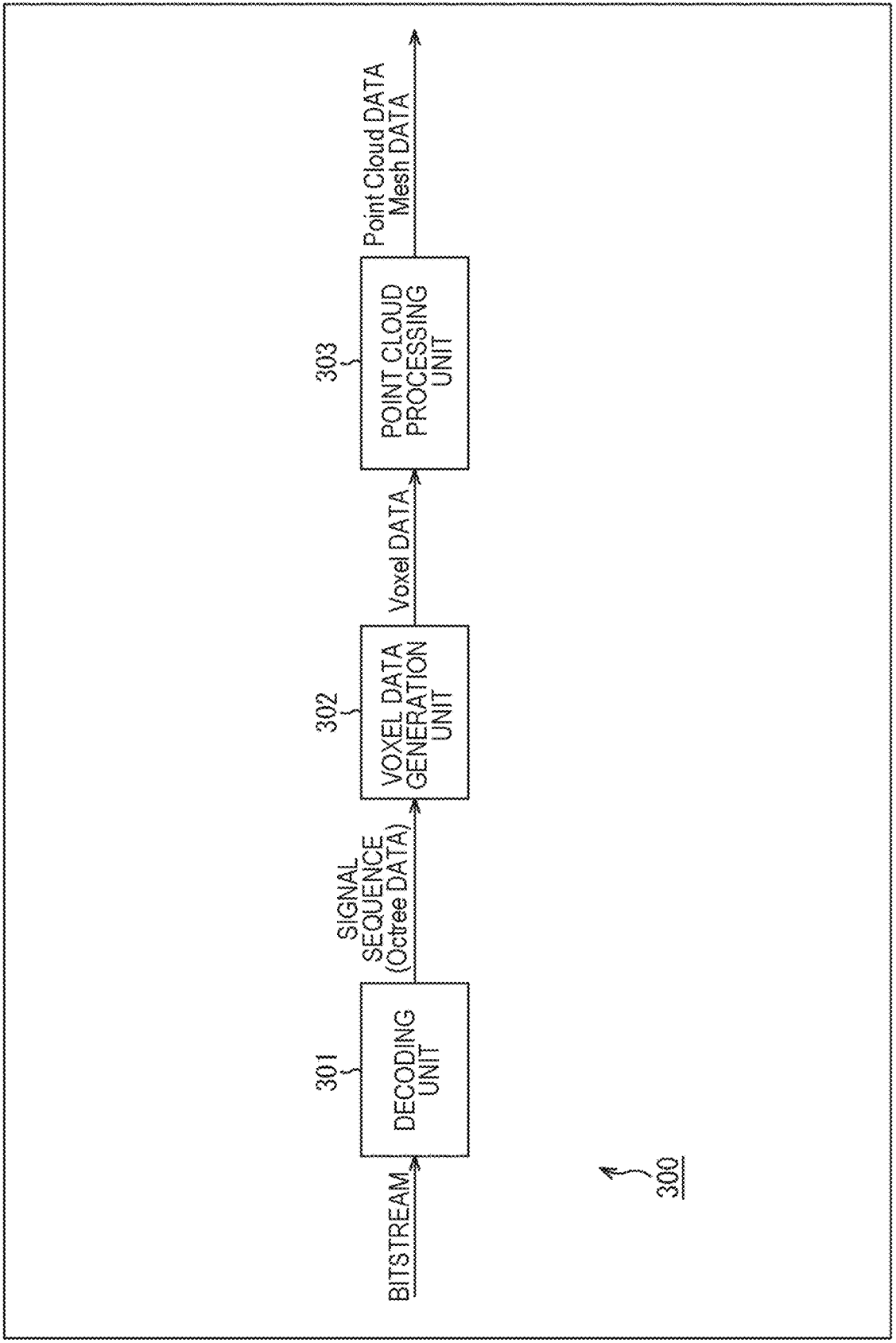
FIG. 11 is a block diagram illustrating a main configuration example of a decoding apparatus.

FIG. 11 is a block diagram illustrating a main configuration example of a decoding apparatus, which is an embodiment of an information processing apparatus to which the present technology is applied. The decoding apparatus 300 illustrated in FIG. 11 is a decoding apparatus corresponding to the encoding apparatus 200 in FIG. 6, and for example, the decoding apparatus 300 decodes coded data of a point cloud generated by this encoding apparatus 200, and restores the data of the point cloud.

As illustrated in FIG. 11, the decoding apparatus 300 includes a decoding unit 301, a voxel data generation unit 302, and a point cloud processing unit 303.

The decoding unit 301 performs a process relating to the decoding of the bitstream. For example, the decoding unit 301 decodes the bitstream using a decoding method corresponding to the encoding method of the encoding unit 215, and obtains a signal sequence (for example, octree data). The decoding unit 301 supplies the obtained signal sequence to the voxel data generation unit 302.

Note that the decoding unit 301 may have any configuration; for example, the decoding unit 301 may include a CPU, a ROM, a RAM, and the like such that the CPU performs a process relating to decoding by loading a program or data stored in the ROM or the like into the RAM and executing the loaded program or data.

The voxel data generation unit 302 performs a process relating to the generation of the voxel data. For example, the voxel data generation unit 302 generates voxel data corresponding to the signal sequence supplied from the decoding unit 301. For example, when the signal sequence of octree data is supplied from the decoding unit 301, the voxel data generation unit 302 performs octree decoding on the supplied signal sequence to generate voxel data. The voxel data generation unit 302 supplies the generated voxel data to the point cloud processing unit 303.

Note that the voxel data generation unit 302 may have any configuration; for example, the voxel data generation unit 302 may include a CPU, a ROM, a RAM, and the like such that the CPU performs a process relating to the generation of the voxel data by loading a program or data stored in the ROM or the like into the RAM and executing the loaded program or data.

The point cloud processing unit 303 performs a process relating to the restoration of the point cloud data. For example, the point cloud processing unit 303 converts the supplied voxel data into point cloud data (generates decoded point cloud data). Note that the point cloud processing unit 303 may further convert this decoded point cloud data into mesh data.

The point cloud processing unit 303 outputs the generated decoded point cloud data (or mesh data) to the outside of the decoding apparatus 300. This output decoded point cloud data (or mesh data) may be subjected to an image process by, for example, a processing unit (not illustrated) at a subsequent stage to be displayed on a monitor or the like as image information, or may be sent by a communication unit (not illustrated) to be transmitted to another apparatus via a predetermined transmission path, or may be recorded in a recording medium (not illustrated).

Note that the point cloud processing unit 303 may have any configuration; for example, the point cloud processing unit 303 may include a CPU, a ROM, a RAM, and the like such that the CPU performs a process relating to the restoration of the point cloud data by loading a program or data stored in the ROM or the like into the RAM and executing the loaded program or data.

<Decoding Unit>

Figure 12:
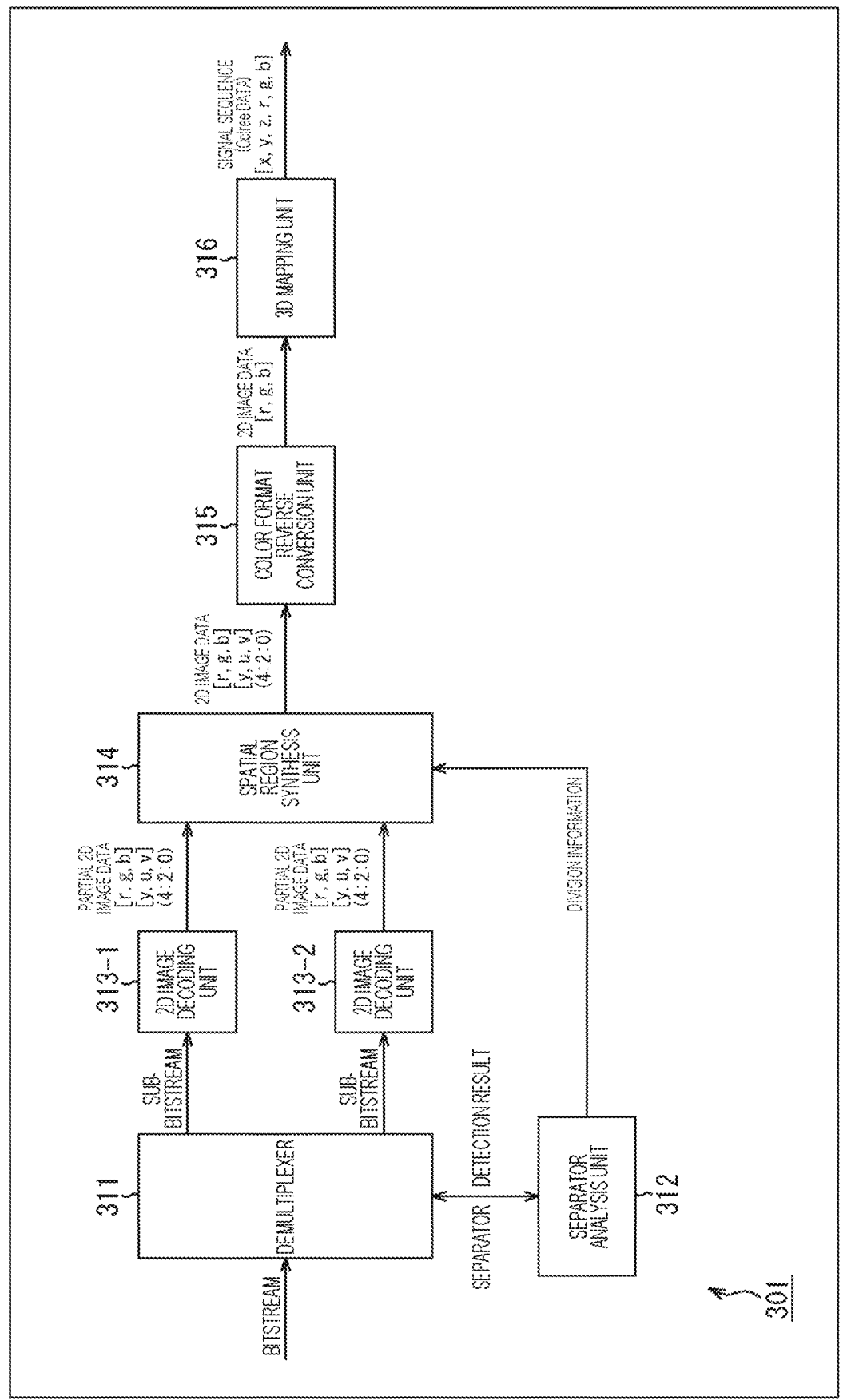
FIG. 12 is a block diagram illustrating a main configuration example of a decoding unit.

FIG. 12 is a block diagram illustrating a main configuration example of the decoding unit 301 (FIG. 11). In this case, the decoding unit 301 synthesizes a plurality of pieces of divided 2D data representing a two-dimensional structure obtained by decoding each of a plurality of sub-bitstreams, on the basis of position information including information indicating positions of parts of a three-dimensional structure of 3D data corresponding to the sub-bitstreams in the two-dimensional structure. As illustrated in FIG. 12, the decoding unit 301 includes a demultiplexer 311, a separator analysis unit 312, a 2D image decoding unit 313-1, a 2D image decoding unit 313-2, a spatial region synthesis unit 314, and a color format reverse conversion unit 315, and a 3D mapping unit 316.

The demultiplexer 311 performs a process relating to demultiplexing. For example, upon acquiring a bitstream input to the decoding apparatus 300, the demultiplexer 311 demultiplexes the acquired bitstream to obtain a plurality of sub-bitstreams. The demultiplexer 311 supplies the obtained plurality of sub-bitstreams to the 2D image decoding units 313-1 and 313-2. Note that, in the following, the 2D image decoding units 313-1 and 313-2 will be referred to as 2D image decoding units 313 when it is not necessary to distinguish the 2D image decoding units 313-1 and 313-2 from each other for explanation.

Note that the demultiplexer 311 may have any configuration; for example, the demultiplexer 311 may include a CPU, a ROM, a RAM, and the like such that the CPU performs a process relating to demultiplexing by loading a program or data stored in the ROM or the like into the RAM and executing the loaded program or data.

The separator analysis unit 312 performs a process relating to the detection and analysis of the separator. For example, the separator analysis unit 312 detects a separator in the bitstream supplied to the demultiplexer 311, and notifies the demultiplexer 311 of the result of the detection. Furthermore, the separator analysis unit 312 analyzes information included in the detected separator, and supplies this analyzed information to the spatial region synthesis unit 314 as division information.

Note that the separator analysis unit 312 may have any configuration; for example, the separator analysis unit 312 may include a CPU, a ROM, a RAM, and the like such that the CPU performs a process relating to the detection and analysis of the separator by loading a program or data stored in the ROM or the like into the RAM and executing the loaded program or data.

The 2D image decoding unit 313 performs a process relating to the decoding of the bitstream. For example, the 2D image decoding unit 313 decodes the sub-bitstream supplied from the demultiplexer 311, and supplies the obtained partial 2D image data to the spatial region synthesis unit 314.

Note that the 2D image decoding unit 313 may have any configuration; for example, the 2D image decoding unit 313 may include a CPU, a ROM, a RAM, and the like such that the CPU performs a process relating to decoding by loading a program or data stored in the ROM or the like into the RAM and executing the loaded program or data.

The spatial region synthesis unit 314 performs a process relating to the synthesis of the partial 2D image data. For example, the spatial region synthesis unit 314 synthesizes a plurality of pieces of partial 2D image data supplied from the respective 2D image decoding units 313 to generate one piece of 2D image data. At that time, the spatial region synthesis unit 314 performs the above synthesis on the basis of the division information supplied from the separator analysis unit 312 (that is, information regarding the sub-bitstreams). The spatial region synthesis unit 314 supplies the obtained 2D image data to the color format reverse conversion unit 315.

Note that the spatial region synthesis unit 314 may have any configuration; for example, the spatial region synthesis unit 314 may include a CPU, a ROM, a RAM, and the like such that the CPU performs a process relating to synthesis by loading a program or data stored in the ROM or the like into the RAM and executing the loaded program or data.

The color format reverse conversion unit 315 performs a process relating to color format reverse conversion. The reverse conversion is a reverse process of color format conversion performed by the color format conversion unit 272 (FIG. 8). For example, the color format reverse conversion unit 315 converts the color format of the supplied 2D image data from the YUV format with a color sampling type of 4:2:0 to the RGB format. The color format reverse conversion unit 315 supplies the 2D image data (r, g, b) after the reverse conversion process to the 3D mapping unit 316.

Note that the color format reverse conversion unit 315 may have any configuration; for example, the color format reverse conversion unit 315 may include a CPU, a ROM, a RAM, and the like such that the CPU performs a process relating to the reverse conversion of color format by loading a program or data stored in the ROM or the like into the RAM and executing the loaded program or data.

The 3D mapping unit 316 performs a process relating to the mapping of 2D data on a three-dimensional space. For example, the 3D mapping unit 316 maps the 2D image data supplied from the color format reverse conversion unit 315 on a three-dimensional space, and generates a signal sequence (for example, octree data). The 3D mapping unit 316 supplies the obtained signal sequence (octree data) to the voxel data generation unit 302 (FIG. 11).

Note that the 3D mapping unit 316 may have any configuration; for example, the 3D mapping unit 316 may include a CPU, a ROM, a RAM, and the like such that the CPU performs a process relating to mapping by loading a program or data stored in the ROM or the like into the RAM and executing the loaded program or data.

In the decoding unit 301 having such a configuration, the demultiplexer 311 divides the bitstream at a position indicated by the separator included in the bitstream. Since the separator indicates a position where the bitstream is supposed to be divided, the demultiplexer 311 can easily divide this bitstream at the correct position on the basis of the information on the position.

Furthermore, in the bitstream, the separator is arranged at a joint between the sub-bitstreams (divided bitstreams). That is, the separator is arranged at a position where the bitstream is supposed to be divided. In different terms, the separator is arranged at a position where the bitstream is supposed to be divided (a joint between the sub-bitstreams), and indicates that the arranged position is a position where the bitstream is supposed to be divided. The separator analysis unit 312 detects the separator arranged as described above, and the demultiplexer 311 divides the bitstream at the detected position. By dividing the bitstream in this manner, the demultiplexer 311 can easily divide the bitstream into every sub-bitstream.

Note that this separator includes a unique bit pattern, and the separator analysis unit 312 can detect the separator more easily by detecting the unique bit pattern of the separator in the bitstream.

As described above, the demultiplexer 311 divides the bitstream into every sub-bitstream (divided bitstream). Accordingly, the 2D image decoding unit 313 is only required to decode the divided sub-bitstream. Since the data amount of the sub-bitstream is reduced as compared with the bitstream before division, an increase in load for decoding the 3D data can be suppressed, and the processing amount can be suppressed to a realistic level.

As described in regard to the encoding apparatus 200, the data amount per sub-bitstream (one piece of partial 2D image data corresponding to the sub-bitstream) can be controlled at the encoding side. That is, since the sub-bitstream can satisfy the constraints of existing 2D image encoding standards, the 2D image decoding unit 313 can perform decoding with a decoding technique compliant with existing 2D image encoding standards, for example, JPEG, HEVC, and the like. Accordingly, the decoding unit 301 can be easily developed as compared with a case where a new decoding unit for 3D data is developed from scratch.

Furthermore, the separator further includes information regarding a sub-bitstream (divided bitstream) corresponding to this particular separator. The separator analysis unit 312 analyzes the separator to obtain this information. The 2D image decoding unit 313 decodes the sub-bitstream on the basis of the obtained information. Accordingly, the 2D image decoding unit 313 can decode the sub-bitstream by an appropriate method.

This information may be any information. For example, information regarding the data size of the sub-bitstream may be included. Furthermore, for example, information regarding the decoding method for the sub-bitstream may be included. In addition, for example, information regarding the prediction method applied in decoding of the sub-bitstream may be included. In addition, for example, information indicating the reference destination of prediction performed in decoding of the sub-bitstream may be included. In addition, for example, information indicating the type of color sampling of data obtained by decoding the sub-bitstream may be included. In addition, for example, information indicating the bit width of data obtained by decoding the sub-bitstream may be included. Any one of these items of information may be included in the separator, or a plurality thereof may be included in the separator. By using these items of information, the 2D image decoding unit 313 can decode the sub-bitstream by a more appropriate method.

Furthermore, as described above, the spatial region synthesis unit 314 synthesizes a plurality of pieces of the partial 2D image data on the basis of information regarding the sub-bitstream obtained by the separator analysis unit 312 analyzing the separator. This information regarding the sub-bitstream is arbitrary; for example, this information may include position information indicating the position of a part of the three-dimensional structure of the 3D data corresponding to this particular sub-bitstream. Furthermore, for example, the above position information may include information indicating the start position of a part of the three-dimensional structure of the 3D data corresponding to the sub-bitstream. Moreover, for example, information indicating the range of a part of the three-dimensional structure of the 3D data corresponding to the divided bitstream may be further included.

For example, such position information may include information indicating the position of a part of the three-dimensional structure of the 3D data corresponding to the sub-bitstream in the two-dimensional structure such that the spatial region synthesis unit 314 synthesizes a plurality of pieces of divided 2D data representing a two-dimensional structure obtained by the 2D image decoding unit 313 decoding each of a plurality of sub-bitstreams, on the basis of position information obtained by the separator analysis unit 312 analyzing the separator.

By using such information in this manner, the spatial region synthesis unit 314 can easily specify the position of each sub-bitstream in the three-dimensional structure of the 3D data, such that each sub-bitstream can be easily synthesized with the correct configuration (that is, can be synthesized so as to have a configuration before division).

<Flow of Decoding Process>

An example of the flow of a decoding process executed by the decoding apparatus 300 having the configuration as described above will be described with reference to a flowchart in FIG. 13.

When the decoding process is started, in step S141, the decoding unit 301 decodes the supplied bitstream to generate a signal sequence.

In step S142, the voxel data generation unit 302 generates voxel data from the signal sequence obtained in step S141.

In step S143, the point cloud processing unit 303 restores point cloud data from the voxel data obtained in step S142.

In step S144, the point cloud processing unit 303 outputs the point cloud data (decoded point cloud data) restored in step S143 to the outside of the decoding apparatus 300.

Once the process in step S144 ends, the decoding process ends.

<Flow of Bitstream Decoding Process>

Next, an example of the flow of a bitstream decoding process executed in step S141 in FIG. 13 will be described with reference to a flowchart in FIG. 14.

When the bitstream decoding process is started, the separator analysis unit 312 detects a separator in the bitstream in step S161.

In step S162, the separator analysis unit 312 analyzes the separator detected in step S161 to generate division information.

In step S163, the demultiplexer 311 divides the bitstream into every sub-bitstream on the basis of the separator.

In step S164, the 2D image decoding unit 313 decodes each sub-bitstream.

In step S165, the spatial region synthesis unit 314 synthesizes partial 2D image data obtained in step S164 so as to synthesize respective partial regions divided at the encoding side in the 2D space, on the basis of the division information. One piece of 2D image data is generated by this process.

In step S166, the color format reverse conversion unit 315 performs reverse conversion on the color format of the 2D image data obtained by the process in step S165.

In step S167, the 3D mapping unit 316 maps the 2D image data after the reverse conversion on a 3D space to generate a signal sequence (3D data).

Figure 13:
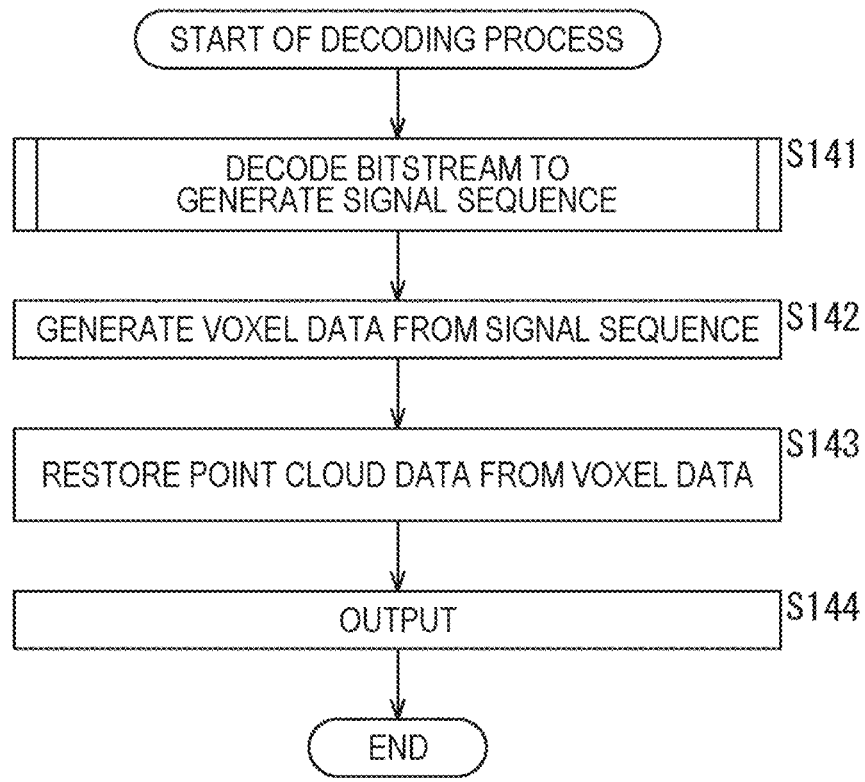
FIG. 13 is a flowchart for explaining an example of the flow of a decoding process.
Figure 14:
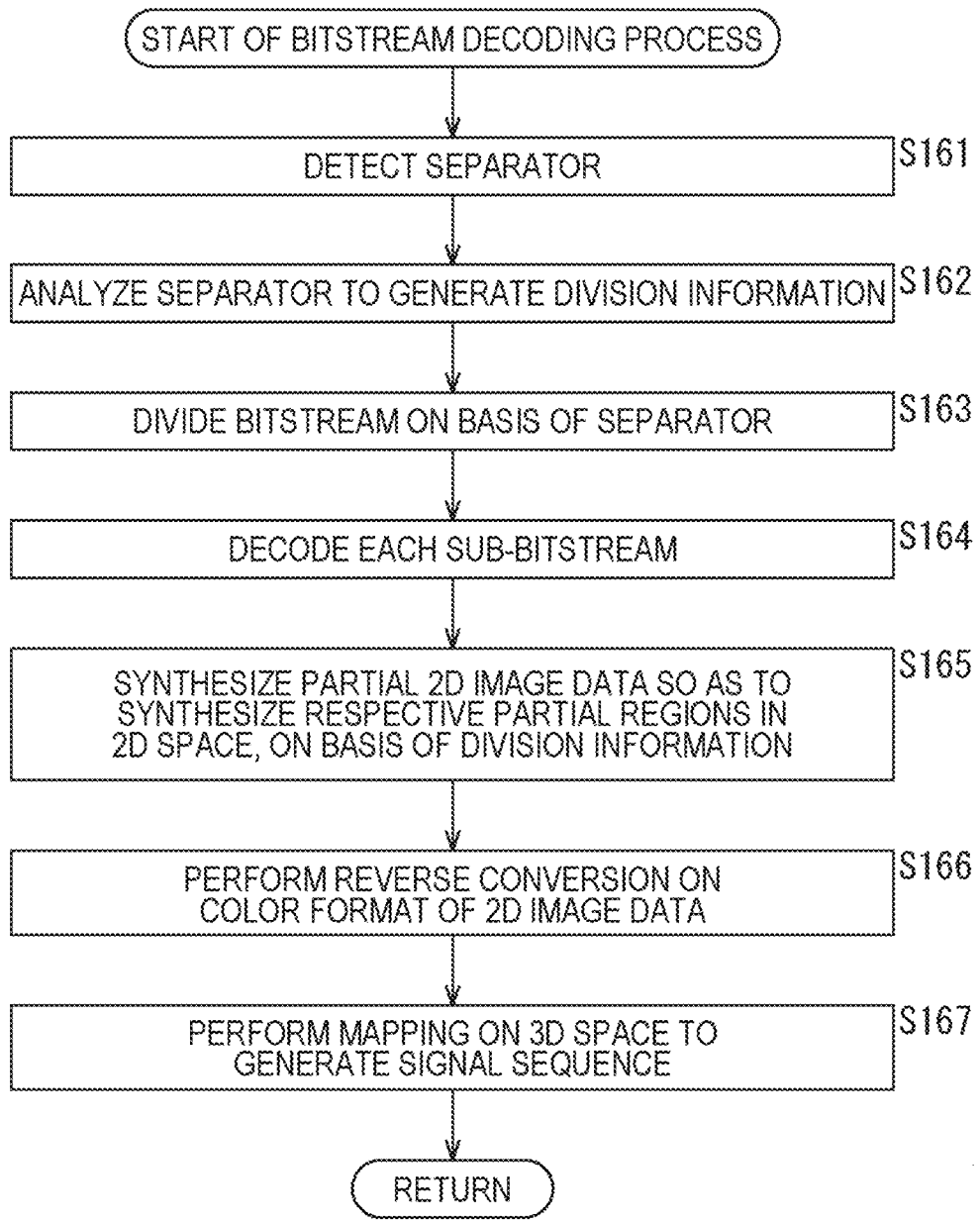
FIG. 14 is a flowchart for explaining an example of the flow of a bitstream decoding process.

Once the process in step S167 ends, the bitstream decoding process ends, and the process returns to FIG. 13.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

<2-2. Division of 3D Spatial Region>

Next, among cases where "division of spatial region" indicated in the uppermost row (excluding the item name row) of the table illustrated in FIG. 5 (a row with "1" in the leftmost column) is performed, the case of "division of region in 3D space" will be described.

<Encoding Apparatus>

Also in this case, since the configuration of the encoding apparatus is similar to the configuration in the case of <2-1. Division of Spatial Region> (FIG. 6), the description of the encoding apparatus will be omitted.

<Encoding Unit>

Figure 15:
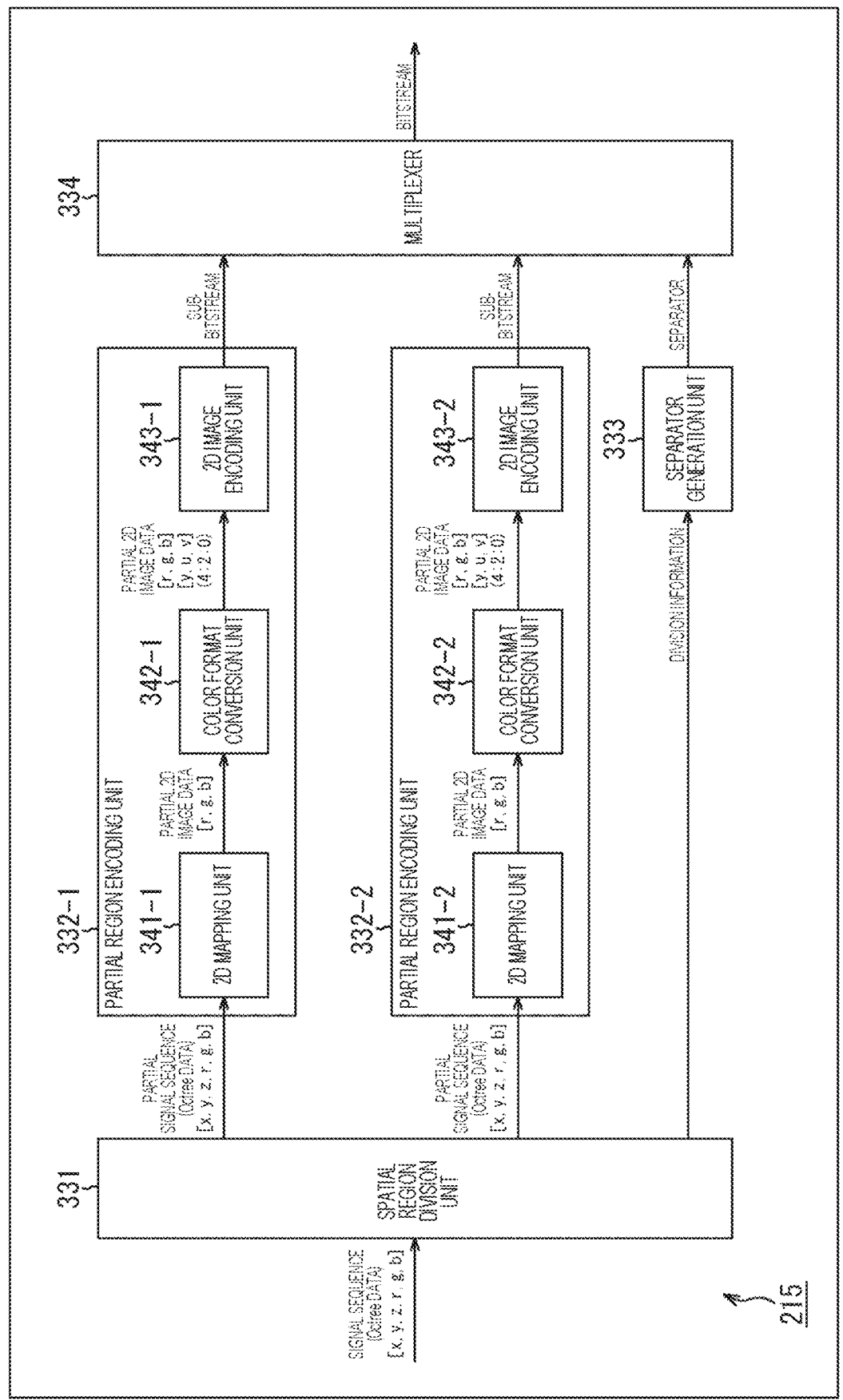
FIG. 15 is a block diagram illustrating a main configuration example of an encoding unit.

FIG. 15 is a block diagram illustrating a main configuration example of the encoding unit 215 (FIG. 6) in this case. In this case, the encoding unit 215 generates a plurality of divided bitstreams by dividing the 3D data on the basis of the three-dimensional structure to convert each of the obtained plurality of pieces of divided 3D data into divided 2D data representing a two-dimensional structure, and encoding each of the obtained plurality of pieces of the divided 2D data. As illustrated in FIG. 15, the encoding unit 215 in this case includes a spatial region division unit 331, a partial region encoding unit 332-1, a partial region encoding unit 332-2, a separator generation unit 333, and a multiplexer 334.

The spatial region division unit 331 divides data so as to divide the spatial region into partial regions, similarly to the spatial region division unit 273 (FIG. 8). However, unlike the case of the spatial region division unit 273, the spatial region division unit 331 divides a signal sequence (for example, octree data), which is 3D data, so as to divide the three-dimensional structure of the signal sequence into a plurality of partial regions. For example, in the case of FIG. 15, the spatial region division unit 331 divides the supplied signal sequence into two to generate two partial signal sequences. These two partial signal sequences are 3D data corresponding to different 3D spatial regions.

The spatial region division unit 331 supplies the generated respective partial signal sequences to the partial region encoding units 332-1 and 332-2. Note that, hereinafter, the partial region encoding units 332-1 and 332-2 will be referred to as partial region encoding units 332 when it is not necessary to distinguish the partial region encoding units 332-1 and 332-2 from each other for explanation.

Furthermore, the spatial region division unit 331 supplies, to the separator generation unit 333, information regarding the division of the signal sequence (3D data), such as how the signal sequence was divided and what information is included in each partial signal sequence, as division information, for example.

The partial region encoding unit 332 encodes the supplied partial signal sequence. The method for this encoding is basically similar to the case of FIG. 8. That is, the partial region encoding unit 332-1 includes a 2D mapping unit 341-1, a color format conversion unit 342-1, and a 2D image encoding unit 343-1. Similarly, the partial region encoding unit 332-2 includes a 2D mapping unit 341-2, a color format conversion unit 342-2, and a 2D image encoding unit 343-2. Note that, in the following, the 2D mapping units 341-1 and 341-2 will be referred to as 2D mapping units 341 when it is not necessary to distinguish the 2D mapping units 341-1 and 341-2 from each other for explanation. Furthermore, the color format conversion units 342-1 and 342-2 will be referred to as color format conversion units 342 when it is not necessary to distinguish the color format conversion units 342-1 and 342-2 from each other for explanation. In addition, the 2D image encoding units 343-1 and 343-2 will be referred to as 2D image encoding units 343 when it is not necessary to distinguish the 2D image encoding units 343-1 and 343-2 from each other for explanation.

Similar to the 2D mapping unit 271 (FIG. 8), the 2D mapping unit 341 maps the 3D data on a two-dimensional space, and generates 2D image data, which is 2D data representing a two-dimensional structure. However, in the case of the 2D mapping unit 341, the divided partial signal sequence is mapped on a two-dimensional space. Therefore, partial 2D image data is obtained. The 2D mapping unit 341 supplies the obtained partial 2D image data to the color format conversion unit 342.

Similar to the color format conversion unit 272 (FIG. 8), the color format conversion unit 342 converts the color format of the 2D image data from the RGB format to the YUV format with a color sampling type of 4:2:0. However, in the case of the color format conversion unit 342, the color format of the divided partial 2D image data is converted. The color format conversion unit 342 supplies the partial 2D image data whose color format has been converted, to the 2D image encoding unit 343.

Similar to the 2D image encoding unit 274 (FIG. 8), the 2D image encoding unit 343 encodes the partial 2D image data to generate a sub-bitstream, which is a divided bitstream. The 2D image encoding unit 343 supplies the generated sub-bitstream to the multiplexer 334.

The separator generation unit 333 is a processing unit that is basically similar to the separator generation unit 275 (FIG. 8), and has a similar configuration and performs a similar process. For example, the separator generation unit 333 generates a separator having a unique bit pattern. Furthermore, for example, the separator generation unit 333 puts information included in the division information supplied from the spatial region division unit 331 in the separator. The separator generation unit 333 supplies the generated separator to the multiplexer 334.

The multiplexer 334 is basically a processing unit similar to the multiplexer 276 (FIG. 8), and has a similar configuration and performs a similar process. For example, the multiplexer 334 multiplexes respective sub-bitstreams supplied from the respective 2D image encoding units 343 and the separators supplied from the separator generation unit 333 to generate one bitstream. At that time, as described with reference to FIG. 3, the multiplexer 334 connects the respective sub-bitstreams in series, and arranges the separator at the position of a joint between the sub-bitstreams. In different terms, the multiplexer 334 connects the respective sub-bitstreams in series such that the separator is sandwiched between the respective sub-bitstreams.

Note that, as described above, each sub-bitstream in this case is data that has been divided and encoded in a three-dimensional space. Accordingly, this sub-bitstream is data different from the sub-bitstream in the case of FIG. 8 that has been divided in a two-dimensional space.

The multiplexer 334 outputs the generated bitstream to the outside of the encoding unit 215 (that is, the outside of the encoding apparatus 200).

Note that such spatial region division unit 331 to multiplexer 334 (and 2D mapping unit 341 to 2D image encoding unit 343) may have any configuration; for example, these units may each include a CPU, a ROM, a RAM, and the like such that the CPU performs each process by loading a program or data stored in the ROM or the like into the RAM and executing the loaded program or data.

Also in this case, since the spatial region division unit 331 divides the 3D data into a plurality of pieces, the partial region encoding unit 332 (2D image encoding unit 343) is only required to encode the divided partial data. Accordingly, similarly to the case of FIG. 8, it is possible to suppress an increase in load for encoding the 3D data and to suppress the processing amount to a realistic level.

Note that, also in this case, the number of divisions of 3D data (signal sequences) by the spatial region division unit 331 (the number of pieces of the partial 3D data (partial signal sequences) after division) is arbitrary. This number of divisions may be variable. That is, for example, the image size (resolution) of the partial 2D image data can be restricted to a maximum size or less stipulated in an existing standard for 2D image encoding. Since it is possible to satisfy the constraints of the standard in this manner, the 2D image encoding unit 343 can perform encoding with an encoding technique compliant with existing 2D image encoding standards, for example, JPEG, HEVC, and the like. Accordingly, in this case as well, the encoding unit 215 can be easily developed as compared with a case where a new encoding unit for 3D data is developed from scratch.

Note that the number of the partial region encoding units 332 (the 2D mapping units 341 to the 2D image encoding units 343) is arbitrary. The number of the partial region encoding units 332 (the 2D mapping units 341 to the 2D image encoding units 343) may be single or three or more. Furthermore, this number may be variable or fixed. The number of the partial region encoding units 332 (the 2D mapping units 341 to the 2D image encoding units 343) may be larger or smaller than the number of the partial signal sequences supplied from the spatial region division unit 331. When this number is smaller, this case can be dealt with by time division or the like, as in the case of FIG. 8.

Note that, also in this case, since the multiplexer 334 arranges the separator at the position of a joint between the sub-bitstreams connected in series, the position of a joint between the sub-bitstreams (divided bitstreams) can be easily specified by detecting the arranged separator at the time of decoding. Consequently, the division into every sub-bitstream (divided bitstream) can be easily made. Note that, since the separator includes a unique bit pattern as described earlier, the separator can be easily detected.

Furthermore, also in this case, the separator generation unit 333 puts information regarding the division in the separator. By configuring in this manner, information included in the divided bitstream, the processing method for each divided bitstream, and the like can be easily grasped at the time of decoding.

For example, as in the case of the separator generation unit 275, the separator generation unit 333 writes position information indicating the position (for example, the start position, the range, and the like) of a part of the three-dimensional structure of the 3D data corresponding to the sub-bitstream (divided bitstream), in a separator corresponding to that sub-bitstream. Accordingly, at the time of decoding, the position of each sub-bitstream in the three-dimensional structure of the 3D data can be easily specified on the basis of these pieces of information, such that each sub-bitstream can be easily synthesized with the correct configuration (that is, can be synthesized so as to have a configuration before division).

<Flow of Encoding Process>

Also in this case, the encoding process is performed basically in a flow similar to the case described with reference to the flowchart in FIG. 9. Accordingly, the description of the flow will be omitted.

<Flow of Signal Sequence Encoding Process>

Figure 16:
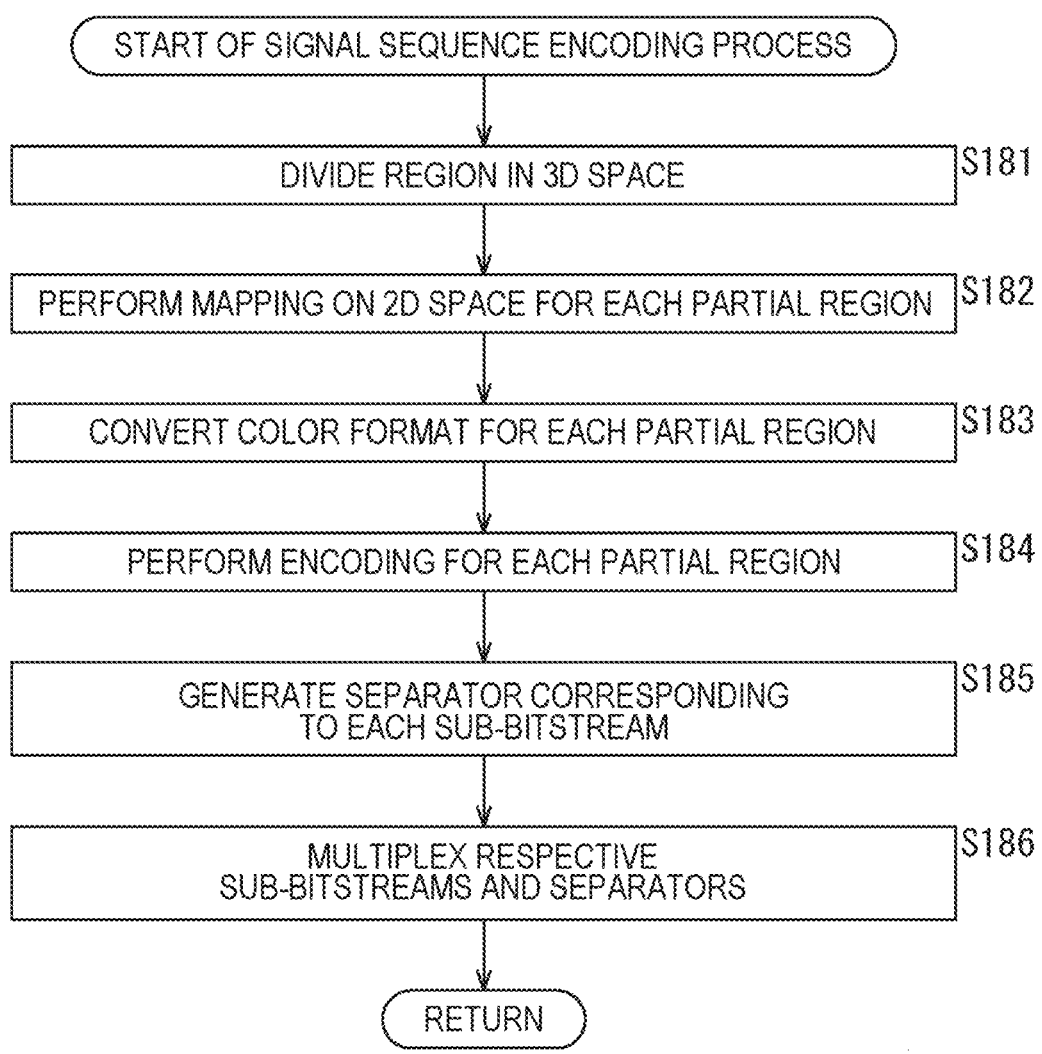
FIG. 16 is a flowchart for explaining an example of the flow of a signal sequence encoding process.

Next, an example of the flow of the signal sequence encoding process executed in step S105 in FIG. 9 will be described with reference to a flowchart in FIG. 16.

When the signal sequence encoding process is started, the spatial region division unit 331 divides the region in a three-dimensional space in step S181.

In step S182, the 2D mapping unit 341 maps 3D data on a two-dimensional space for each partial region set in step S181 to generate 2D data.

In step S183, the color format conversion unit 342 converts the color format of the 2D data generated in step S182 for each partial region.

In step S184, the 2D image encoding unit 343 encodes the 2D data whose color format has been converted in step S183 for each partial region.

In step S185, the separator generation unit 333 generates a separator corresponding to each sub-bitstream.

In step S186, the multiplexer 334 multiplexes the respective sub-bitstreams and the separators.

Once the process in step S187 ends, the signal sequence encoding process ends, and the process returns to FIG. 9.

By executing each process as described above, the 3D data can be divided into a plurality of pieces and encoded, such that an increase in load for encoding and decoding the 3D data can be suppressed.

<Decoding Apparatus>

Since the decoding apparatus in this case is similar to the case of FIG. 11, the description of the decoding apparatus will be omitted.

<Decoding Unit>

Figure 17:
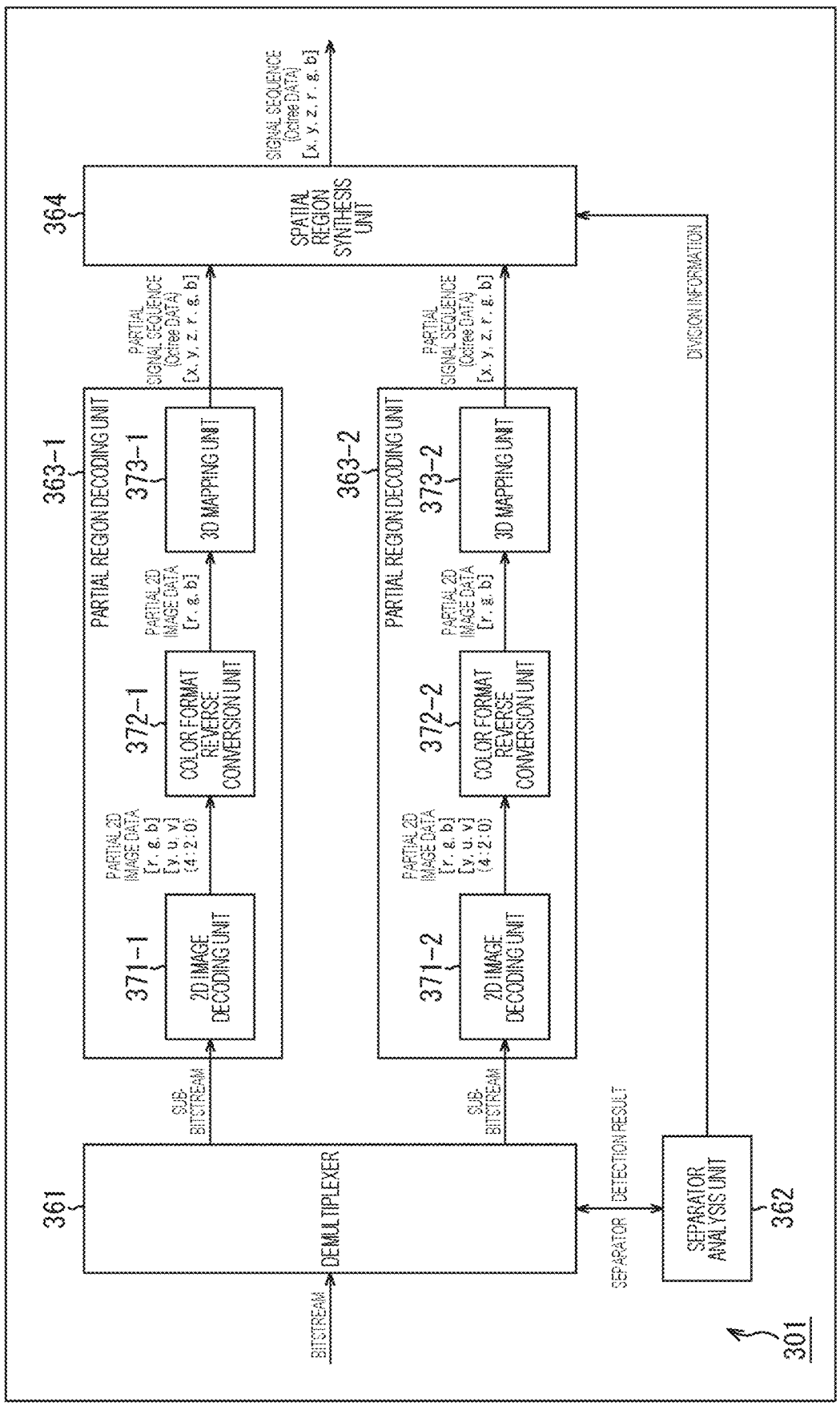
FIG. 17 is a block diagram illustrating a main configuration example of a decoding unit.

FIG. 17 is a block diagram illustrating a main configuration example of the decoding unit 301 in this case. The decoding unit 301 in this case synthesizes a plurality of pieces of divided 3D data obtained by decoding each of a plurality of divided bitstreams, on the basis of position information obtained by analyzing the separator, which includes information indicating the position of a part of a three-dimensional structure of 3D data corresponding to each divided bitstream in this three-dimensional structure. As illustrated in FIG. 17, the decoding unit 301 in this case includes a demultiplexer 361, a separator analysis unit 362, a partial region decoding unit 363-1, a partial region decoding unit 363-2, and a spatial region synthesis unit 364.

The demultiplexer 361 performs a process similar to the process of the demultiplexer 311 (FIG. 12). For example, upon acquiring a bitstream input to the decoding apparatus 300, the demultiplexer 361 demultiplexes the acquired bitstream to obtain a plurality of sub-bitstreams. The demultiplexer 361 supplies the obtained plurality of sub-bitstreams to the partial region decoding units 363-1 and 363-2. Hereinafter, the partial region decoding units 363-1 and 363-2 will be referred to as partial region decoding units 363 when it is not necessary to distinguish the partial region decoding units 363-1 and 363-2 from each other for explanation.

The separator analysis unit 362 performs a process similar to the process of the separator analysis unit 312. For example, the separator analysis unit 362 detects a separator in the bitstream supplied to the demultiplexer 361, and notifies the demultiplexer 361 of the result of the detection. Furthermore, the separator analysis unit 362 analyzes information included in the detected separator, and supplies this analyzed information to the spatial region synthesis unit 364 as division information.

The partial region decoding unit 363 decodes the supplied sub-bitstream. The method for this decoding is basically similar to the case of FIG. 12. That is, the partial region decoding unit 363-1 includes a 2D image decoding unit 371-1, a color format reverse conversion unit 372-1, and a 3D mapping unit 373-1. Similarly, the partial region decoding unit 363-2 includes a 2D image decoding unit 371-2, a color format reverse conversion unit 372-2, and a 3D mapping unit 373-2. In the following, the 2D image decoding units 371-1 and 371-2 will be referred to as 2D image decoding units 371 when it is not necessary to distinguish the 2D image decoding units 371-1 and 371-2 from each other for explanation. Furthermore, the color format reverse conversion units 372-1 and 372-2 will be referred to as color format reverse conversion units 372 when it is not necessary to distinguish the color format reverse conversion units 372-1 and 372-2 from each other for explanation. In addition, in the following, the 3D mapping units 373-1 and 373-2 will be referred to as 3D mapping units 373 when it is not necessary to distinguish the 3D mapping units 373-1 and 373-2 from each other for explanation.

The 2D image decoding unit 371 decodes the sub-bitstream supplied from the demultiplexer 361, and supplies the obtained partial 2D image data to the color format reverse conversion unit 372.

The color format reverse conversion unit 372 converts the color format of the supplied partial 2D image data from the YUV format with a color sampling type of 4:2:0 to the RGB format. The color format reverse conversion unit 372 supplies the partial 2D image data (r, g, b) after the reverse conversion process to the 3D mapping unit 373.

The 3D mapping unit 373 maps the partial 2D image data supplied from the color format reverse conversion unit 372 on a three-dimensional space, and generates a partial signal sequence (for example, octree data). The 3D mapping unit 373 supplies the obtained partial signal sequence (octree data) to the spatial region synthesis unit 364.

The spatial region synthesis unit 364 synthesizes a plurality of partial signal sequences (partial 3D data) supplied from the respective 3D mapping units 373 to generate one signal sequence (3D data). At that time, the spatial region synthesis unit 364 performs the above synthesis on the basis of the division information supplied from the separator analysis unit 362. The spatial region synthesis unit 364 supplies the obtained signal sequence (for example, octree data) to the outside of the decoding unit 301 (for example, the voxel data generation unit 302 or the like).

Note that demultiplexer 361 to the spatial region synthesis unit 364, and the 2D image decoding unit 371 to the 3D mapping unit 373 may have any configuration; for example, these units may each include a CPU, a ROM, a RAM, and the like such that the CPU performs each process by loading a program or data stored in the ROM or the like into the RAM and executing the loaded program or data.

Also in the decoding unit 301 in this case, the demultiplexer 361 divides the bitstream at a position indicated by the separator included in the bitstream. Since the separator indicates a position where the bitstream is supposed to be divided, the demultiplexer 361 can easily divide this bitstream at the correct position on the basis of the information on the position.

Furthermore, in the bitstream, the separator is arranged at a joint between the sub-bitstreams (divided bitstreams). That is, the separator is arranged at a position where the bitstream is supposed to be divided. In different terms, the separator is arranged at a position where the bitstream is supposed to be divided (a joint between the sub-bitstreams), and indicates that the arranged position is a position where the bitstream is supposed to be divided. The separator analysis unit 362 detects the separator arranged as described above, and the demultiplexer 361 divides the bitstream at the detected position. By dividing the bitstream in this manner, the demultiplexer 361 can easily divide the bitstream into every sub-bitstream.

Note that this separator includes a unique bit pattern, and the separator analysis unit 362 can detect the separator more easily by detecting the unique bit pattern of the separator in the bitstream.

As described above, the demultiplexer 361 divides the bitstream into every sub-bitstream (divided bitstream). Accordingly, the 2D image decoding unit 371 is only required to decode the divided sub-bitstream. Since the data amount of the sub-bitstream is reduced as compared with the bitstream before division, an increase in load for decoding the 3D data can be suppressed, and the processing amount can be suppressed to a realistic level.

As described in regard to the encoding apparatus 200, the data amount per sub-bitstream (one piece of partial 2D image data corresponding to the sub-bitstream) can be controlled at the encoding side. That is, since the sub-bitstream can satisfy the constraints of existing 2D image encoding standards, the 2D image decoding unit 371 can perform decoding with a decoding technique compliant with existing 2D image encoding standards, for example, JPEG, HEVC, and the like. Accordingly, the decoding unit 301 can be easily developed as compared with a case where a new decoding unit for 3D data is developed from scratch.

Furthermore, the separator further includes information regarding a sub-bitstream (divided bitstream) corresponding to this particular separator. The separator analysis unit 312 analyzes the separator to obtain this information. The 2D image decoding unit 313 decodes the sub-bitstream on the basis of the obtained information. Accordingly, the 2D image decoding unit 313 can decode the sub-bitstream by an appropriate method.

Furthermore, also in this case, the spatial region synthesis unit 364 synthesizes a plurality of pieces of the partial 2D image data on the basis of information regarding the sub-bitstream obtained by the separator analysis unit 362 analyzing the separator. This information regarding the sub-bitstream is arbitrary; for example, this information may include position information indicating the position of a part of the three-dimensional structure of the 3D data corresponding to this particular sub-bitstream. Furthermore, for example, the above position information may include information indicating the start position of a part of the three-dimensional structure of the 3D data corresponding to the sub-bitstream. Moreover, for example, information indicating the range of a part of the three-dimensional structure of the 3D data corresponding to the divided bitstream may be further included.

For example, such position information may include information indicating the position of a part of the three-dimensional structure of the 3D data corresponding to the sub-bitstream in the three-dimensional structure such that the spatial region synthesis unit 364 synthesizes a plurality of pieces of divided 3D data obtained by the decoding unit decoding each of a plurality of divided bitstreams, on the basis of position information obtained by the separator analysis unit 312 analyzing the separator.

By using such information in this manner, the spatial region synthesis unit 364 can easily specify the position of each sub-bitstream in the three-dimensional structure of the 3D data, such that each sub-bitstream can be easily synthesized with the correct configuration (that is, can be synthesized so as to have a configuration before division).

<Flow of Decoding Process>

Also in this case, since the decoding process is similar to the case described with reference to the flowchart in FIG. 13, the description of the decoding process will be omitted.

<Flow of Bitstream Decoding Process>

Figure 18:
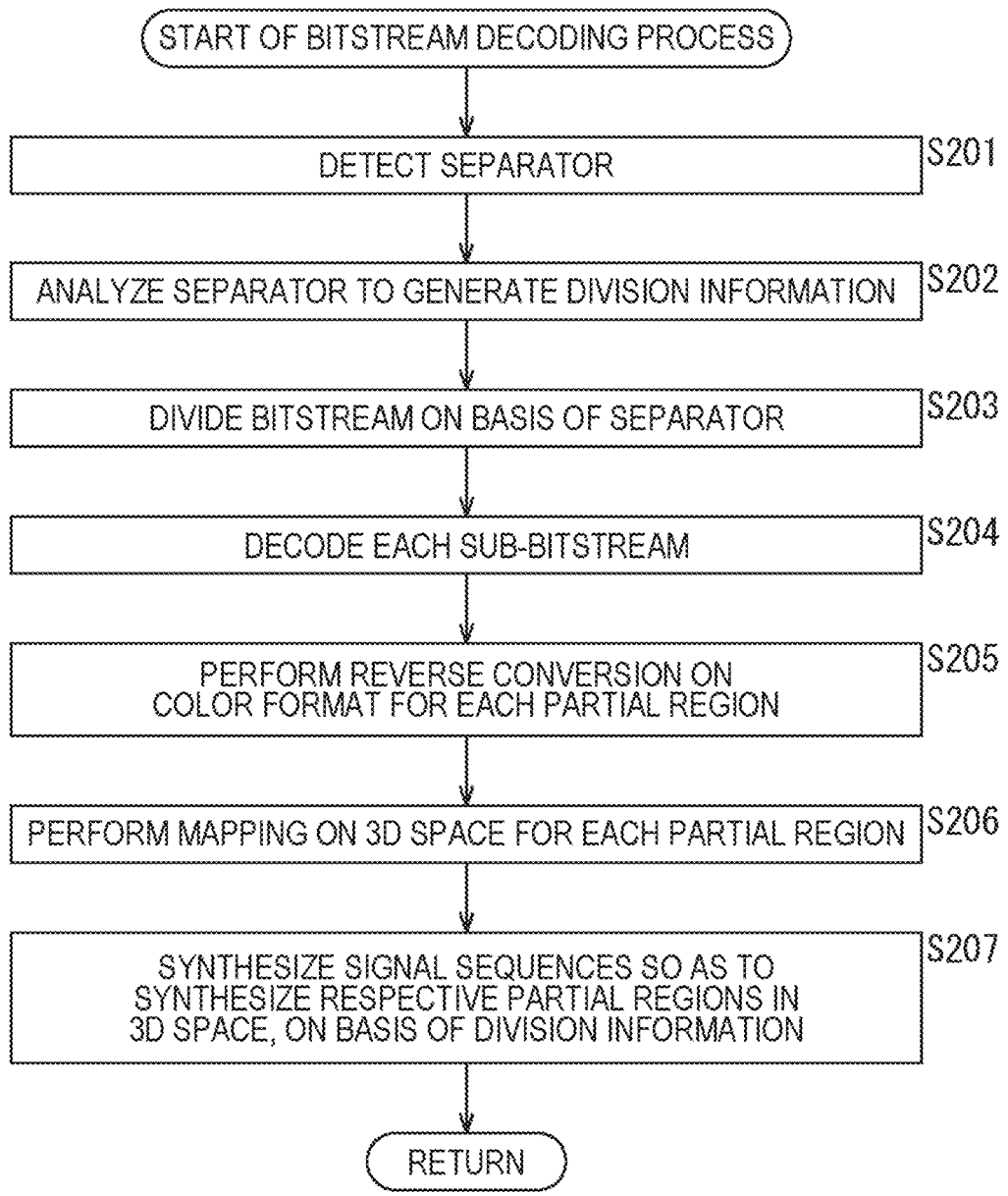
FIG. 18 is a flowchart for explaining an example of the flow of a bitstream decoding process.

Next, an example of the flow of the bitstream decoding process executed in step S141 in FIG. 13 will be described with reference to a flowchart in FIG. 18.

When the bitstream decoding process is started, the separator analysis unit 362 detects a separator in the bitstream in step S201.

In step S202, the separator analysis unit 362 analyzes the separator detected in step S161 to generate division information.

In step S203, the demultiplexer 361 divides the bitstream into every sub-bitstream on the basis of the separator.

In step S204, the 2D image decoding unit 371 decodes each sub-bitstream.

In step S205, the color format reverse conversion unit 372 performs reverse conversion on the color format of the partial 2D image data obtained by the process in step S204 for each partial region.

In step S206, the 3D mapping unit 373 maps the partial 2D image data after the reverse conversion on a 3D space to generate a partial signal sequence (3D data).

In step S207, the spatial region synthesis unit 364 synthesizes the partial signal sequences obtained in step S206 so as to synthesize respective partial regions divided at the encoding side in the 3D space, on the basis of the division information. One piece of 3D data is generated by this process.

Once the process in step S167 ends in step S166, the bitstream decoding process ends, and the process returns to FIG. 13.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

3. Second Embodiment

<Division of Attribute Information>

Next, a description will be given of a case where "division of attribute information" indicated in the second row from the top (excluding the item name row) of the table illustrated in FIG. 5 (a row with "2" in the leftmost column) is performed.

<Encoding Apparatus>

Also in this case, since the configuration of the encoding apparatus is similar to the configuration in the case of <2. First Embodiment> (FIG. 6), the description of the encoding apparatus will be omitted.

<Encoding Unit>

Figure 19:
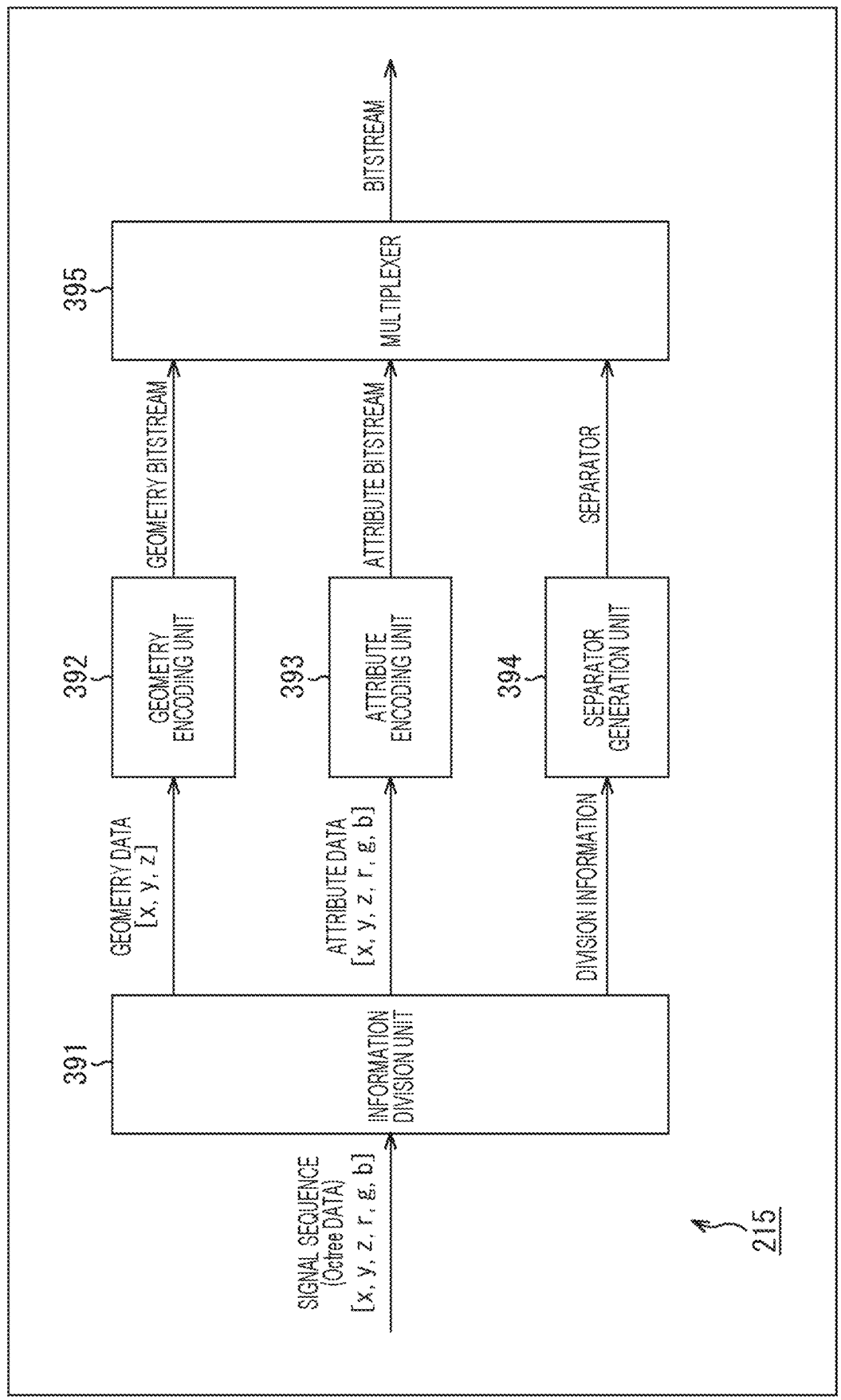
FIG. 19 is a block diagram illustrating a main configuration example of an encoding unit.

FIG. 19 is a block diagram illustrating a main configuration example of an encoding unit 215 in this case. In this case, the encoding unit 215 divides the 3D data into geometry data indicating the position of each point of a point cloud and attribute data indicating attribute information on each point of this point cloud to encode the divided data, and generates a plurality of divided bitstreams of the 3D data. As illustrated in FIG. 19, the encoding unit 215 in this case includes an information division unit 391, a geometry encoding unit 392, an attribute encoding unit 393, a separator generation unit 394, and a multiplexer 395.

The information division unit 391 divides a signal sequence (for example, octree data), which is 3D data, into geometry data indicating the position of each point of a point cloud and attribute data indicating attribute information on each point of this point cloud.

The information division unit 391 supplies the divided geometry data to the geometry encoding unit 392. Furthermore, the information division unit 391 supplies the divided attribute data to the attribute encoding unit 393.

In addition, the information division unit 391 supplies, to the separator generation unit 394, information regarding the division of the signal sequence (3D data), such as how the signal sequence was divided and what information is included in each partial signal sequence, as division information, for example.

The geometry encoding unit 392 encodes the geometry data to generate a geometry bitstream and supplies the generated geometry bitstream to the multiplexer 395. Similarly, the attribute encoding unit 393 encodes the attribute data to generate an attribute bitstream, and supplies the generated attribute bitstream to the multiplexer 395.

Note that, similarly to the partial region encoding unit 332 of the first embodiment, the geometry encoding unit 392 and the attribute encoding unit 393 each map the 3D data on a two-dimensional space, convert the color format, and perform encoding with an encoding technique for 2D data.

The separator generation unit 394 is a processing unit that is basically similar to the separator generation unit 275 (FIG. 8) of the first embodiment, and has a similar configuration and performs a similar process. For example, the separator generation unit 394 generates a separator having a unique bit pattern. Furthermore, for example, the separator generation unit 394 puts information included in the division information supplied from the information division unit 391 in the separator. The separator generation unit 394 supplies the generated separator to the multiplexer 395.

The multiplexer 395 multiplexes the geometry bitstream supplied from the geometry encoding unit 392, the attribute bitstream supplied from the attribute encoding unit 393, and the separator supplied from the separator generation unit 394, and generates one bitstream. At that time, as described with reference to FIG. 3, the multiplexer 395 connects the respective sub-bitstreams in series, and arranges the separator at the position of a joint between the sub-bitstreams. In different terms, the multiplexer 395 connects the respective sub-bitstreams in series such that the separator is sandwiched between the respective sub-bitstreams.

Such information division unit 391 to multiplexer 395 may have any configuration; for example, these units may each include a CPU, a ROM, a RAM, and the like such that the CPU performs each process by loading a program or data stored in the ROM or the like into the RAM and executing the loaded program or data.

As described above, also in this case, the signal sequence, which is 3D data, is divided into a plurality of pieces and encoded. Accordingly, similarly to the case of the first embodiment, it is possible to suppress an increase in load for encoding the 3D data and to suppress the processing amount to a realistic level. That is, since it is possible to satisfy the constraints of the standard in this manner, the geometry encoding unit 392 and the attribute encoding unit 393 can perform encoding with an encoding technique compliant with existing 2D image encoding standards, for example, JPEG, HEVC, and the like. Accordingly, in this case as well, the encoding unit 215 can be easily developed as compared with a case where a new encoding unit for 3D data is developed from scratch.

Furthermore, also in this case, as described above, since the separator is generated and embedded in the bitstream as in the case of the first embodiment, effects similar to the effects of the first embodiment can be obtained.

Note that the attribute data may be further divided and encoded for each attribute. For example, the attribute data may be divided for each attribute such as color information, normal line information, and a channel (transparency), and encoded for the each attribute. By configuring in this manner, the degree of parallelism in encoding can be improved, such that an increase in load for encoding the 3D data can be further suppressed.

<Flow of Encoding Process>

Also in this case, the encoding process is performed basically in a flow similar to the case described with reference to the flowchart in FIG. 9. Accordingly, the description of the flow will be omitted.

<Flow of Signal Sequence Encoding Process>

Figure 20:
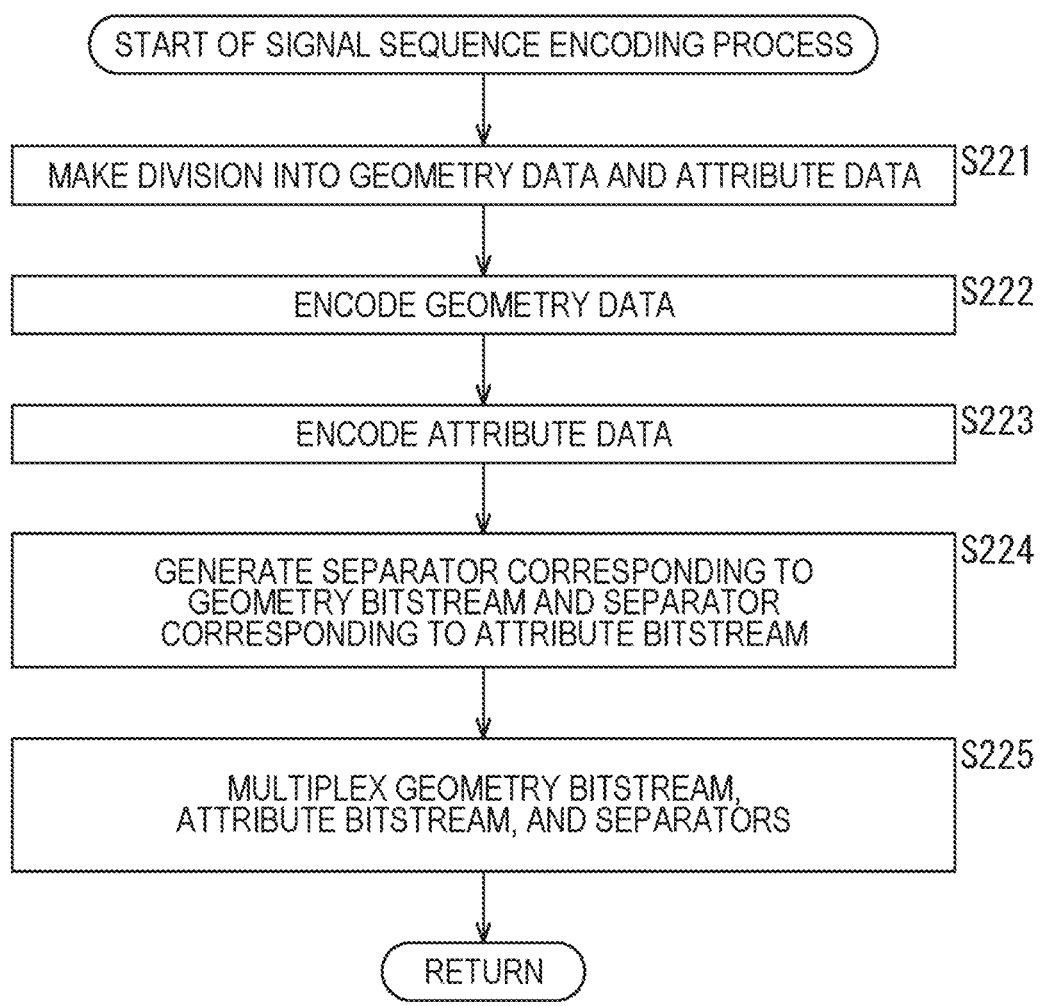
FIG. 20 is a flowchart for explaining an example of the flow of a signal sequence encoding process.

Next, an example of the flow of the signal sequence encoding process executed in step S105 in FIG. 9 will be described with reference to a flowchart in FIG. 20.

When the signal sequence encoding process is started, the information division unit 391 makes division into the geometry data and the attribute data in step S221.

In step S222, the geometry encoding unit 392 encodes the divided geometry data.

In step S223, the attribute encoding unit 393 encodes the divided attribute data.

In step S224, the separator generation unit 394 generates a separator corresponding to a geometry bitstream generated in step S222 and a separator corresponding to an attribute bitstream generated in step S223.

In step S225, the multiplexer 395 multiplexes the geometry bitstream generated in step S222, the attribute bitstream generated in step S223, and the separators generated in step S224 to generate one bitstream.

Once the process in step S225 ends, the signal sequence encoding process ends, and the process returns to FIG. 9.

By executing each process as described above, the 3D data can be divided into a plurality of pieces and encoded, such that an increase in load for encoding and decoding the 3D data can be suppressed.

<Decoding Apparatus>

Since the decoding apparatus in this case is similar to the case of FIG. 11, the description of the decoding apparatus will be omitted.

<Decoding Unit>

Figure 21:
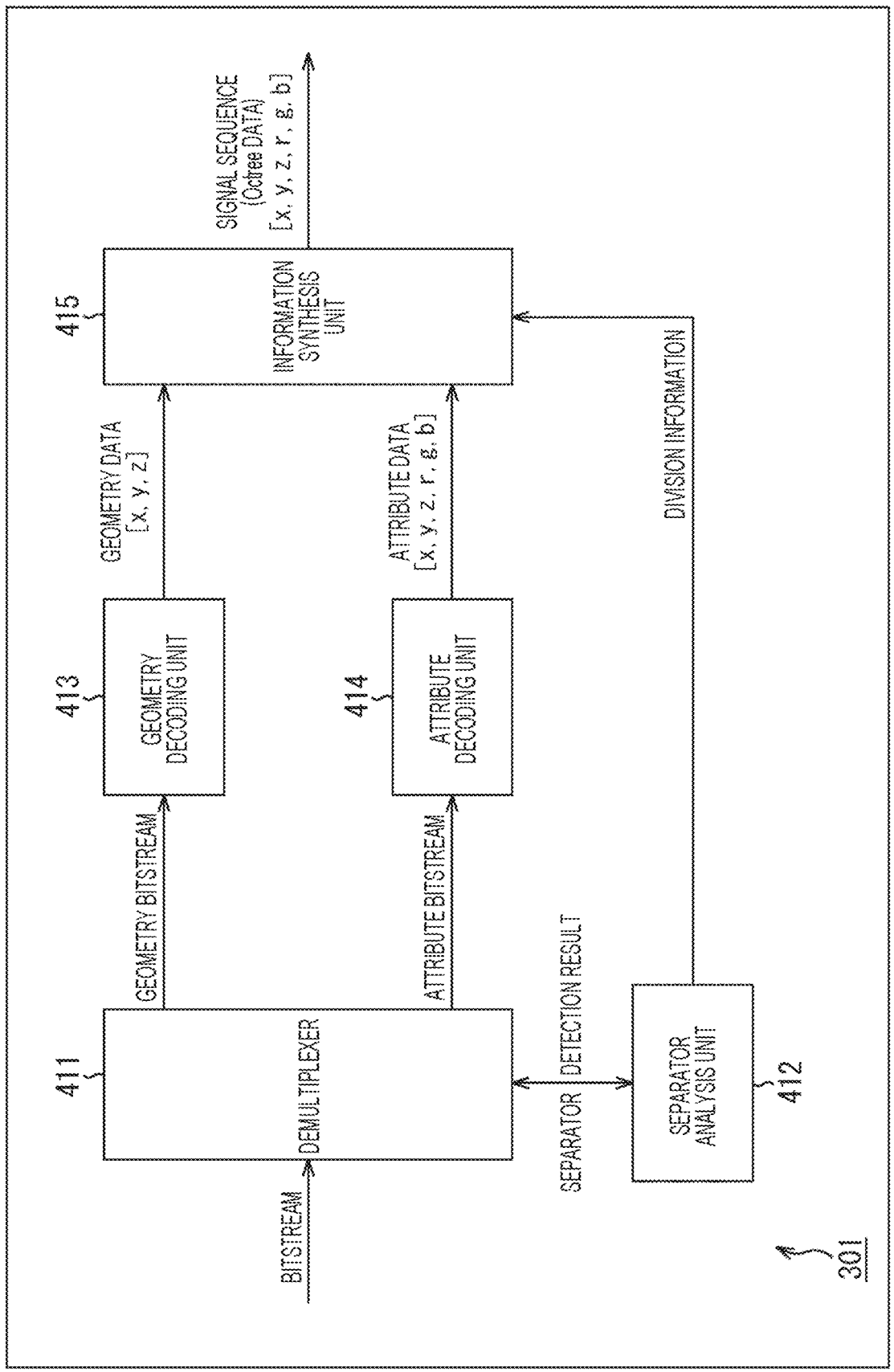
FIG. 21 is a block diagram illustrating a main configuration example of a decoding unit.

FIG. 21 is a block diagram illustrating a main configuration example of a decoding unit 301 in this case. The decoding unit 301 in this case synthesizes the geometry data indicating the position of each point of a point cloud and the attribute data indicating attribute information on each point of this point cloud, obtained by decoding each of a plurality of divided bitstreams, on the basis of information regarding the attribute of the divided bitstream obtained by analyzing the separator. As illustrated in FIG. 21, the decoding unit 301 in this case includes a demultiplexer 411, a separator analysis unit 412, a geometry decoding unit 413, an attribute decoding unit 414, and an information synthesis unit 415.

Upon acquiring a bitstream input to a decoding apparatus 300, the demultiplexer 411 demultiplexes the acquired bitstream to obtain a geometry bitstream and an attribute bitstream. The demultiplexer 411 supplies the obtained geometry bitstream to the geometry decoding unit 413. Furthermore, the demultiplexer 411 supplies the obtained attribute bitstream to the attribute decoding unit 414.

The separator analysis unit 412 performs a process similar to the process of the separator analysis unit 312. For example, the separator analysis unit 412 detects a separator in the bitstream supplied to the demultiplexer 411, and notifies the demultiplexer 411 of the result of the detection. In addition, the separator analysis unit 412 analyzes information included in the detected separator, and supplies this analyzed information to the information synthesis unit 415 as division information.

The geometry decoding unit 413 decodes the supplied geometry bitstream (divided bitstream) to generate geometry data, and supplies the generated geometry data to the information synthesis unit 415. Meanwhile, the attribute decoding unit 414 decodes the supplied attribute bitstream (divided bitstream) to generate attribute data, and supplies the generated attribute data to the information synthesis unit 415.

Note that, similarly to the partial region decoding unit 363 of the first embodiment, each of the geometry decoding unit 413 and the attribute decoding unit 414 decodes the divided bitstream with a decoding technique for 2D data, converts the color format, and maps 2D data on a three-dimensional space.

The information synthesis unit 415 synthesizes the geometry data supplied from the geometry decoding unit 413 and the attribute data supplied from the attribute decoding unit 414 to generate one signal sequence (3D data, for example, octree data or the like). At that time, the information synthesis unit 415 performs the above synthesis on the basis of the division information supplied from the separator analysis unit 412 (that is, information regarding the divided bitstreams). The information synthesis unit 415 supplies the generated signal sequence to the outside of the decoding unit 301 (for example, a voxel data generation unit 302 or the like).

Note that the demultiplexer 411 to the information synthesis unit 415 may have any configuration; for example, these units may each include a CPU, a ROM, a RAM, and the like such that the CPU performs each process by loading a program or data stored in the ROM or the like into the RAM and executing the loaded program or data.

As described above, also in this case, the bitstream is divided into a plurality of pieces and decoded. Accordingly, effects similar to the case of the first embodiment can be obtained.

Furthermore, also in this case, a separator similar to the case of the first embodiment is embedded in the bitstream, and the decoding unit 301 performs the decoding process using the embedded separator. Accordingly, effects similar to the effects of the first embodiment can be obtained.

Note that the attribute data may be further divided and encoded for each attribute at the encoding side. For example, the attribute data may be divided for each attribute such as color information, normal line information, and a channel (transparency), and encoded for the each attribute.

In that case, the demultiplexer 411 divides the bitstream to supply the geometry bitstream to the geometry decoding unit 413 and supply the attribute bitstream for each attribute to the attribute decoding unit 414. The geometry decoding unit 413 decodes the geometry bitstream to generate geometry data, and supplies the generated geometry data to the information synthesis unit 415. The attribute decoding unit 414 decodes every attribute bitstream for each attribute to generate attribute data for each attribute, and supplies the generated attribute data to the information synthesis unit 415.

The information synthesis unit 415 synthesizes the supplied geometry data and attribute data for each attribute on the basis of information regarding the attribute obtained by the separator analysis unit 412 analyzing the separator. By configuring in this manner, the degree of parallelism in decoding can be improved, such that an increase in load for decoding the 3D data can be further suppressed.

<Flow of Decoding Process>

Also in this case, since the decoding process is similar to the case described with reference to the flowchart in FIG. 13, the description of the decoding process will be omitted.

<Flow of Bitstream Decoding Process>

Figure 22:
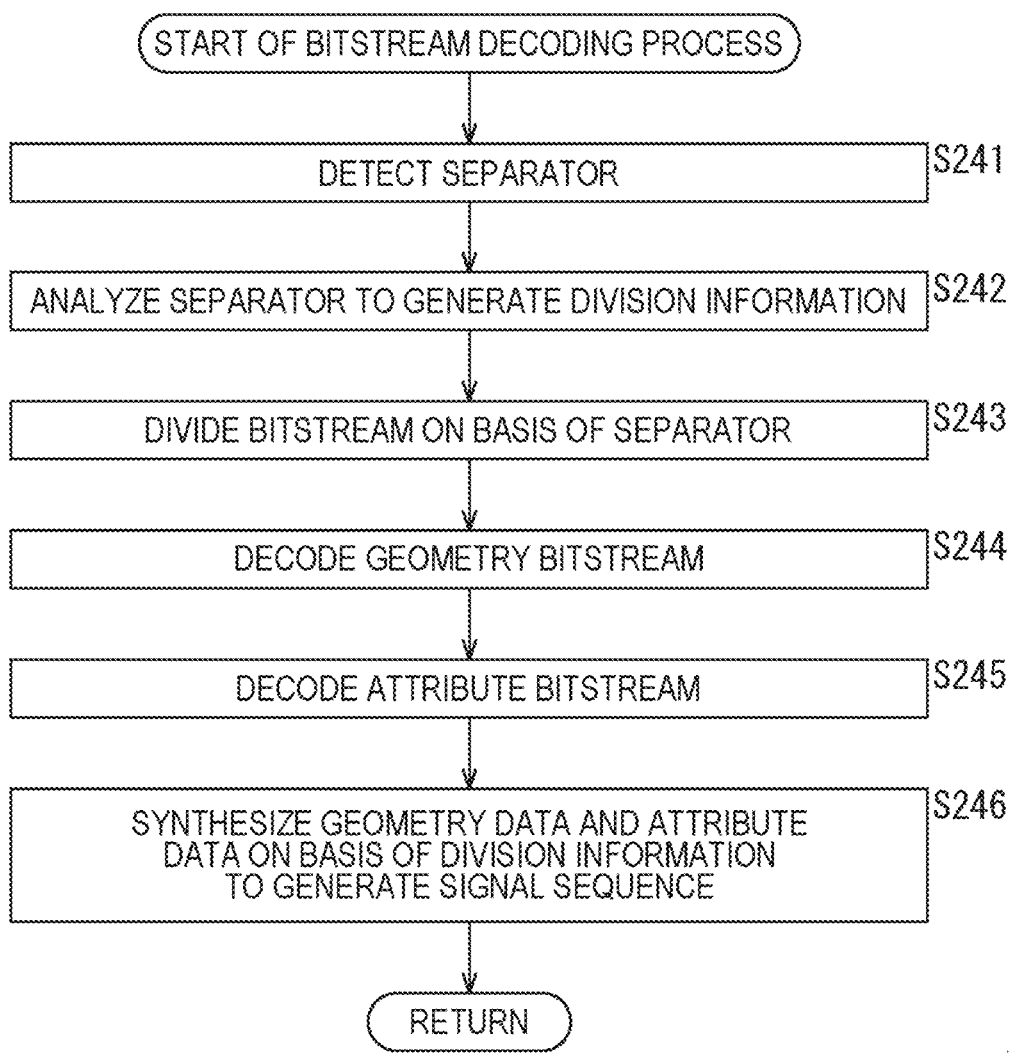
FIG. 22 is a flowchart for explaining an example of the flow of a bitstream decoding process.

Next, an example of the flow of the bitstream decoding process executed in step S141 in FIG. 13 will be described with reference to a flowchart in FIG. 22.

When the bitstream decoding process is started, the separator analysis unit 362 detects a separator in the bitstream in step S241.

In step S242, the separator analysis unit 412 analyzes the separator detected in step S241 to generate division information.

In step S243, the demultiplexer 411 divides the bitstream into every sub-bitstream on the basis of the separator. That is, division into the geometry bitstream and the attribute bitstream is made.

In step S244, the geometry decoding unit 413 decodes the geometry bitstream.

In step S245, the attribute decoding unit 414 decodes the attribute bitstream.

In step S246, the information synthesis unit 415 synthesizes the geometry data and the attribute data on the basis of the division information to generate a signal sequence.

Once the process in step S246 ends, the bitstream decoding process ends, and the process returns to FIG. 13.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

4. Third Embodiment

<Division of Attribute Information>

Next, a description will be given of a case where "division between spatial resolutions" indicated in the third row from the top (excluding the item name row) of the table illustrated in FIG. 5 (a row with "3" in the leftmost column) is performed.

<Encoding Apparatus>

Also in this case, since the configuration of the encoding apparatus is similar to the configuration in the case of <2. First Embodiment> (FIG. 6), the description of the encoding apparatus will be omitted.

<Encoding Unit>

Figure 23:
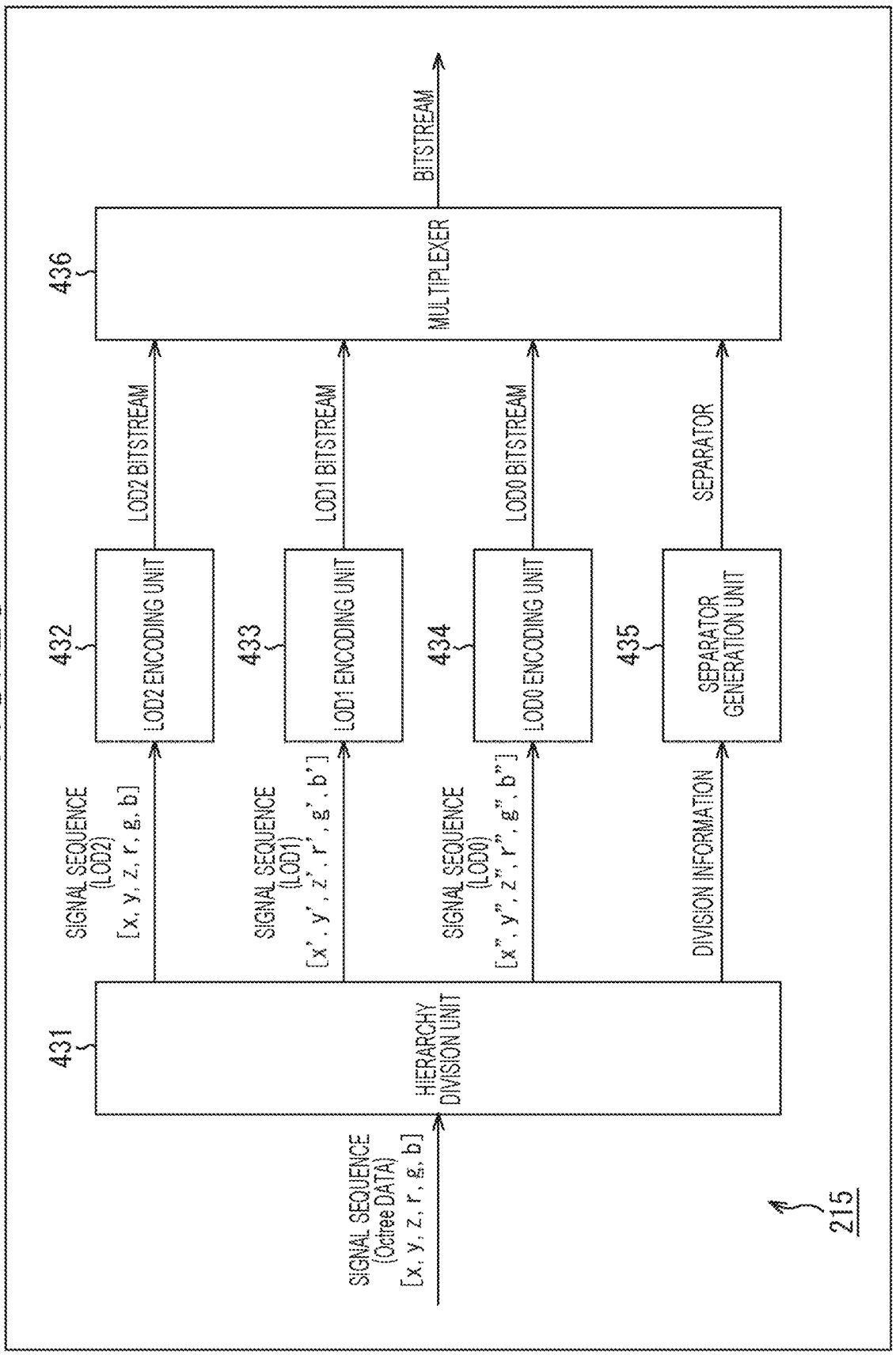
FIG. 23 is a block diagram illustrating a main configuration example of an encoding unit.

FIG. 23 is a block diagram illustrating a main configuration example of an encoding unit 215 in this case. In this case, the encoding unit 215 divides and encodes 3D data according to the resolution, and generates a plurality of divided bitstreams. Furthermore, the 3D data may be hierarchized according to the resolution such that the encoding unit 215 divides and encodes the 3D data for each hierarchy of the 3D data to generate a plurality of divided bitstreams of the 3D data. In addition, the 3D data may be, for example, octree data having an octree structure.

As illustrated in FIG. 23, the encoding unit 215 in this case includes a hierarchy division unit 431, an LOD2 encoding unit 432, an LOD1 encoding unit 433, an LOD0 encoding unit 434, a separator generation unit 435, and a multiplexer 436.

The hierarchy division unit 431 divides a signal sequence (for example, octree data), which is hierarchized 3D data, for each hierarchy of the 3D data, and generates signal sequences for each hierarchy (a signal sequence (LOD2), a signal sequence (LOD1), and a signal sequence (LOD0)). The hierarchy division unit 431 supplies the generated signal sequence (LOD2) to the LOD2 encoding unit 432, supplies the generated signal sequence (LOD1) to the LOD1 encoding unit 433, and supplies the generated signal sequence (LOD0) to the LOD0 encoding unit 434.

Furthermore, the hierarchy division unit 431 supplies, to the separator generation unit 435, information regarding the division of the signal sequence (3D data), such as how the signal sequence was divided and what information is included in each partial signal sequence, as division information, for example.

The LOD2 encoding unit 432 encodes the signal sequence (LOD2) at LOD2 to generate an LOD2 bitstream, which is a divided bitstream, and supplies the generated LOD2 bitstream to the multiplexer 436. Similarly, the attribute encoding unit 393 encodes the attribute data to generate an attribute bitstream, and supplies the generated attribute bitstream to the multiplexer 395. Note that, similarly to the partial region encoding unit 332 of the first embodiment, the LOD2 encoding unit 432 maps the 3D data (signal sequence (LOD2)) on a two-dimensional space, converts the color format, and performs encoding with an encoding technique for 2D data.

The LOD1 encoding unit 433 and the LOD0 encoding unit 434 also each perform a process similar to the process of the LOD2 encoding unit 432 on the signal sequence of each hierarchy.

Similarly to the separator generation unit 275 (FIG. 8) of the first embodiment, or the like, the separator generation unit 435 generates a separator having a unique bit pattern, to put information included in the division information supplied from the hierarchy division unit 431 in the generated separator, and supplies the separator with the information to the multiplexer 436.

The multiplexer 436 multiplexes the LOD2 bitstream supplied from the LOD2 encoding unit 432, the LOD1 bitstream supplied from the LOD1 encoding unit 433, the LOD0 bitstream supplied from the LOD0 encoding unit 434, and the separators supplied from the separator generation unit 435, and generates and outputs one bitstream. At that time, as described with reference to FIG. 3, the multiplexer 436 connects the respective sub-bitstreams in series, and arranges the separator at the position of a joint between the sub-bitstreams. In different terms, the multiplexer 436 connects the respective sub-bitstreams in series such that the separator is sandwiched between the respective sub-bitstreams.

Such hierarchy division unit 431 to multiplexer 436 may have any configuration; for example, these units may each include a CPU, a ROM, a RAM, and the like such that the CPU performs each process by loading a program or data stored in the ROM or the like into the RAM and executing the loaded program or data.

As described above, also in this case, the signal sequence, which is 3D data, is divided into a plurality of pieces and encoded. Accordingly, the encoding unit 215 in this case can also obtain effects similar to the case of the first embodiment.

Furthermore, also in this case, as described above, since the separator is generated and embedded in the bitstream as in the case of the first embodiment, effects similar to the effects of the first embodiment can be obtained.

Note that, in the above, the number of hierarchies of the octree data has been described as three (LOD0 to LOD2); however, the number of hierarchies is arbitrary, and may be two or less, or four or more. Furthermore, the hierarchy division unit 431 can divide the signal sequence into an arbitrary number. This number of divisions may be the same as the number of hierarchies of the signal sequence, or may be smaller than the number of hierarchies. In addition, an arbitrary number of encoding units such as the LOD2 encoding unit 432 to the LOD0 encoding unit 434 can be provided. For example, the number of encoding units may be the same as the number of divisions of the signal sequence, or may be larger or smaller than the number of divisions. When the number of encoding units is smaller than the number of divisions, a plurality of signal sequences only needs to be processed in one encoding unit by time division or the like.

Furthermore, in the above, the supplied signal sequence (3D data) has been described as having a hierarchical structure; however, the hierarchization is not limited to this example, and a resolution conversion unit that converts the resolution of the signal sequence to hierarchize the signal sequence may be further provided. That is, a signal sequence that does not have a hierarchical structure may be supplied such that the resolution conversion unit converts the resolution of the supplied signal sequence (for example, by performing downsampling or the like) to hierarchize the signal sequence, and an encoding unit 215 divides and encodes the hierarchized signal sequence whose resolution has been converted, for each hierarchy, and generates a plurality of divided bitstreams.

By configuring in this manner, the process can be performed as described above even for a non-hierarchical signal sequence. Accordingly, effects similar to the effects of the first embodiment can be obtained.

<Flow of Encoding Process>

Also in this case, the encoding process is performed basically in a flow similar to the case described with reference to the flowchart in FIG. 9. Accordingly, the description of the flow will be omitted.

<Flow of Signal Sequence Encoding Process>

Figure 24:
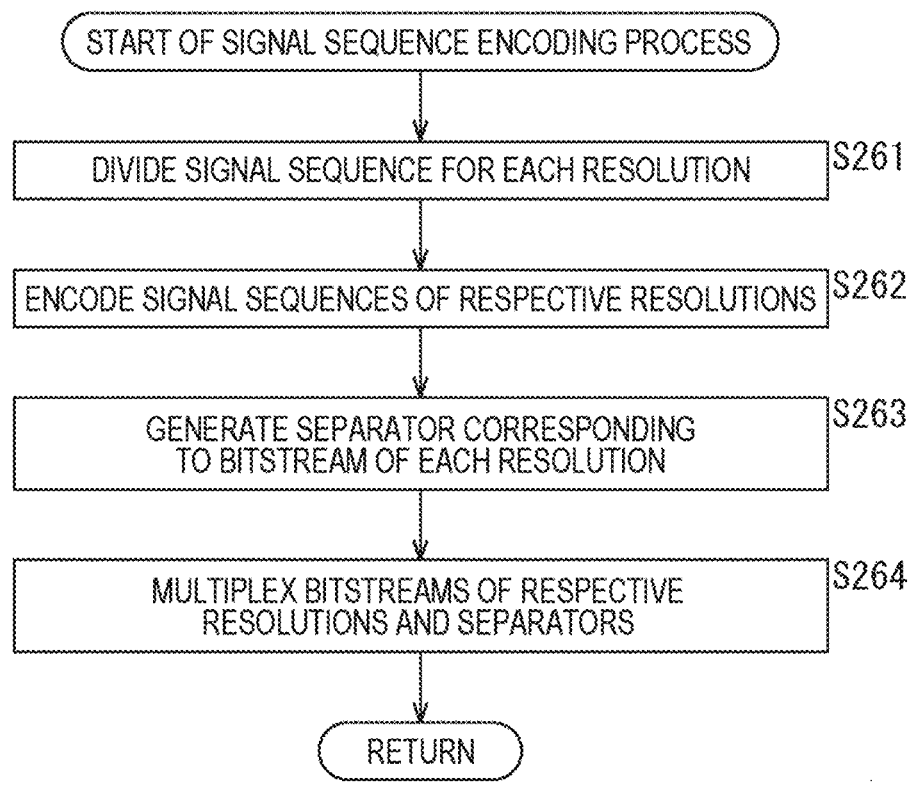
FIG. 24 is a flowchart for explaining an example of the flow of a signal sequence encoding process.

Next, an example of the flow of the signal sequence encoding process in this case executed in step S105 in FIG. 9 will be described with reference to a flowchart in FIG. 24.

When the signal sequence encoding process is started, the hierarchy division unit 431 divides the signal sequence for each hierarchy (for each resolution) in step S261.

In step S262, the LOD2 encoding unit 432 to the LOD0 encoding unit 434 encode the signal sequences of respective hierarchies (respective resolutions).

In step S263, the separator generation unit 435 generates a separator corresponding to the bitstream of each hierarchy (each resolution).

In step S264, the multiplexer 436 multiplexes the bitstreams and the separators of respective hierarchies (respective resolutions).

Once the process in step S264 ends, the signal sequence encoding process ends, and the process returns to FIG. 9.

By executing each process as described above, the 3D data can be divided into a plurality of pieces and encoded, such that an increase in load for encoding and decoding the 3D data can be suppressed.

<Decoding Apparatus>

Since the decoding apparatus in this case is similar to the case of FIG. 11, the description of the decoding apparatus will be omitted.

<Decoding Unit>

Figure 25:
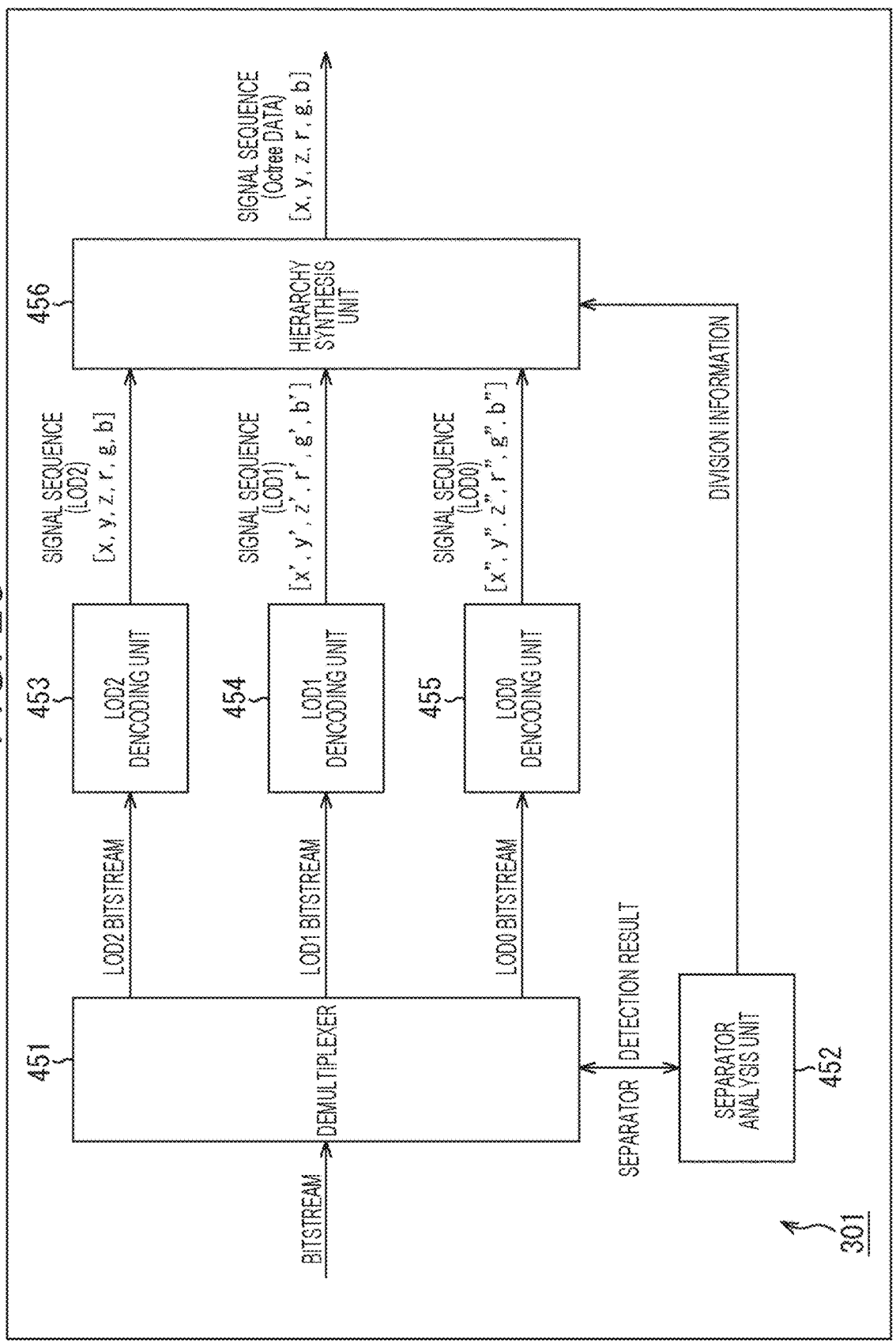
FIG. 25 is a block diagram illustrating a main configuration example of a decoding unit.

FIG. 25 is a block diagram illustrating a main configuration example of a decoding unit 301 in this case. The decoding unit 301 in this case synthesizes a plurality of pieces of divided data obtained by decoding each of a plurality of divided bitstreams, on the basis of information regarding a resolution corresponding to the divided bitstream obtained by analyzing the separator. As illustrated in FIG. 25, the decoding unit 301 in this case includes a demultiplexer 451, a separator analysis unit 452, an LOD2 decoding unit 453, an LOD1 decoding unit 454, an LOD0 decoding unit 455, and a hierarchy synthesis unit 456.

Upon acquiring a bitstream input to a decoding apparatus 300, the demultiplexer 451 demultiplexes the acquired bitstream to obtain a bitstream for each hierarchy (an LOD2 bitstream, an LOD1 bitstream, and an LOD0 bitstream). The demultiplexer 451 supplies the obtained bitstream of each hierarchy to the decoding unit corresponding to each hierarchy (the LOD2 decoding unit 453 to the LOD0 decoding unit 455).

The separator analysis unit 452 performs a process similar to the process of the separator analysis unit 312. For example, the separator analysis unit 452 detects a separator in the bitstream supplied to the demultiplexer 451, and notifies the demultiplexer 451 of the result of the detection. In addition, the separator analysis unit 452 analyzes information included in the detected separator, and supplies this analyzed information to the hierarchy synthesis unit 456 as division information.

The LOD2 decoding unit 453 decodes the supplied LOD2 bitstream (divided bitstream) to generate a signal sequence (LOD2), and supplies the generated signal sequence to the hierarchy synthesis unit 456. Note that, similarly to the partial region decoding unit 363 of the first embodiment, the LOD2 decoding unit 453 decodes the divided bitstream with a decoding technique for 2D data, converts the color format, and maps 2D data on a three-dimensional space.

The LOD1 decoding unit 454 and the LOD0 decoding unit 455 also each perform a process similar to the process of the LOD2 decoding unit 453 on the bitstream of each hierarchy.

The hierarchy synthesis unit 456 synthesizes the signal sequence (LOD2) supplied from the LOD2 decoding unit 453, the signal sequence (LOD1) supplied from the LOD1 decoding unit 454, and the signal sequence (LOD0) supplied from the LOD0 decoding unit 455, and generates one signal sequence (3D data, for example, octree data or the like). At that time, the hierarchy synthesis unit 456 performs the above synthesis on the basis of the division information supplied from the separator analysis unit 452 (that is, information regarding the divided bitstreams). The hierarchy synthesis unit 456 supplies the generated signal sequence to the outside of the decoding unit 301 (for example, a voxel data generation unit 302 or the like).

Note that the demultiplexer 451 to the hierarchy synthesis unit 456 may have any configuration; for example, these units may each include a CPU, a ROM, a RAM, and the like such that the CPU performs each process by loading a program or data stored in the ROM or the like into the RAM and executing the loaded program or data.

As described above, also in this case, the bitstream is divided into a plurality of pieces and decoded. Accordingly, effects similar to the case of the first embodiment can be obtained.

Furthermore, also in this case, a separator similar to the case of the first embodiment is embedded in the bitstream, and the decoding unit 301 performs the decoding process using the embedded separator. Accordingly, effects similar to the effects of the first embodiment can be obtained.

Note that, as described for the encoding side, the number of hierarchies of the octree data is arbitrary. Furthermore, the number of divisions by the demultiplexer 451 (the number of multiplexes of the bitstream) is also arbitrary. In addition, an arbitrary number of decoding units such as the LOD2 decoding unit 453 to the LOD0 decoding unit 455 can be provided. When the number of decoding units is smaller than the number of divisions, a plurality of bitstreams only needs to be processed in one decoding unit by time division or the like.

<Flow of Decoding Process>

Also in this case, since the decoding process is similar to the case described with reference to the flowchart in FIG. 13, the description of the decoding process will be omitted.

<Flow of Bitstream Decoding Process>

Figure 26:
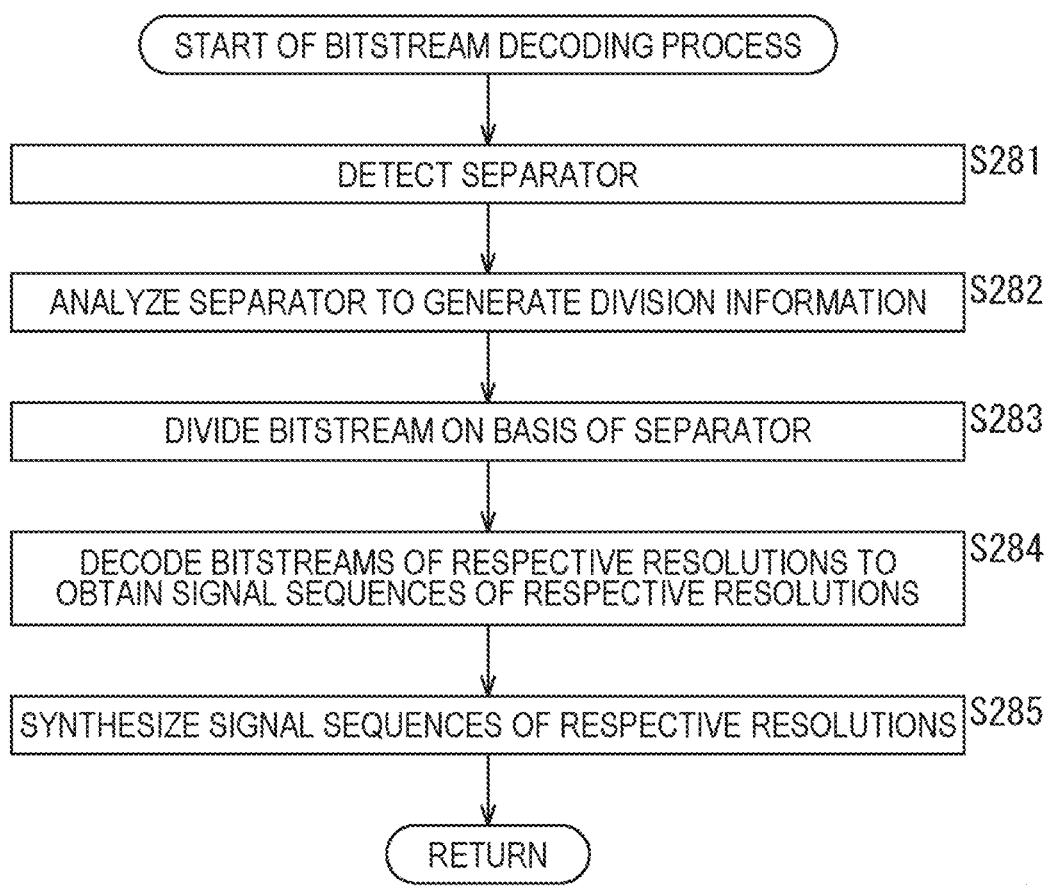
FIG. 26 is a flowchart for explaining an example of the flow of a bitstream decoding process.

Next, an example of the flow of the bitstream decoding process executed in step S141 in FIG. 13 will be described with reference to a flowchart in FIG. 26.

When the bitstream decoding process is started, the separator analysis unit 452 detects a separator in the bitstream in step S281.

In step S282, the separator analysis unit 452 analyzes the separator detected in step S281 to generate division information.

In step S283, the demultiplexer 451 divides the bitstream into every sub-bitstream on the basis of the separator. That is, division into bitstreams for each hierarchy (each resolution) is made.

In step S284, the LOD2 decoding unit 453 to the LOD0 decoding unit 455 decode the bitstreams of respective hierarchies (respective resolutions) to generate signal sequences of respective hierarchies (respective resolutions).

In step S285, the hierarchy synthesis unit 456 synthesizes the signal sequences of respective hierarchies (respective resolutions) generated in step S284 on the basis of the division information to generate one signal sequence.

Once the process in step S285 ends, the bitstream decoding process ends, and the process returns to FIG. 13.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

Combination of Embodiments

The respective approaches described in the above respective embodiments can be used in combination with each other as appropriate. The way of combining the approaches is arbitrary.

<Encoding Unit>

Figure 27:
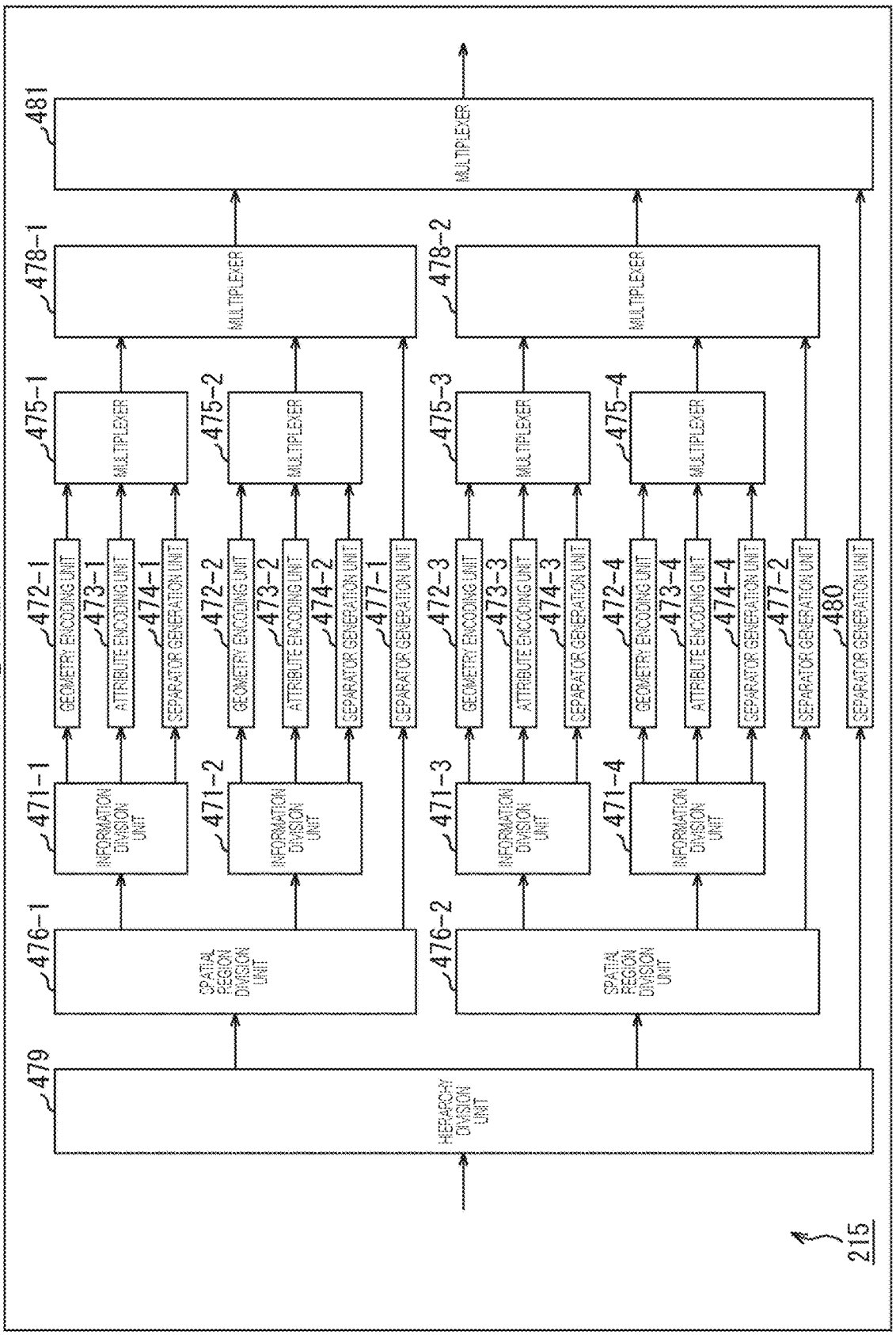
FIG. 27 is a block diagram illustrating a main configuration example of an encoding unit.

FIG. 27 is a block diagram illustrating a main configuration example of the encoding unit 215 when the above-described "division of spatial region", "division of attribute information", and "division between spatial resolutions" are combined. In this case, the encoding unit 215 has blocks as illustrated in FIG. 27.

The input signal sequence is divided for each hierarchy by a hierarchy division unit 479. The signal sequence of each hierarchy is divided into signal sequences of two respective regions by a spatial region division unit 476-1 and a spatial region division unit 476-2. Moreover, the signal sequences of respective hierarchies and respective regions are each divided into the geometry data and the attribute data by an information division unit 471-1 to an information division unit 471-4.

Note that, in the following, the spatial region division units 476-1 and 476-2 will be referred to as spatial region division units 476 when it is not necessary to distinguish the spatial region division units 476-1 and 476-2 from each other for explanation. Likewise, the information division units 471-1 to 471-4 will be referred to as information division units 471 when it is not necessary to distinguish the information division units 471-1 to 471-4 from each other for explanation.

A geometry encoding unit 472-1 to a geometry encoding unit 472-4 encode the geometry data to generate geometry bitstreams for respective hierarchies and partial regions. An attribute encoding unit 473-1 to an attribute encoding unit 473-4 encode the attribute data to generate attribute bitstreams for respective hierarchies and partial regions.

Note that, in the following, the geometry encoding units 472-1 to 472-4 will be referred to as geometry encoding units 472 when it is not necessary to distinguish the geometry encoding units 472-1 to 472-4 from each other for explanation. Likewise, the attribute encoding units 473-1 to 473-4 will be referred to as attribute encoding units 473 when it is not necessary to distinguish the attribute encoding units 473-1 to 473-4 from each other for explanation.

Furthermore, a separator generation unit 480 acquires division information from a hierarchy division unit 479, and generates a separator corresponding to a bitstream of each hierarchy. In addition, a separator generation unit 477-1 and a separator generation unit 477-2 generate separators corresponding to bitstreams of respective partial regions in respective hierarchies. Moreover, a separator generation unit 474-1 to a separator generation unit 474-4 generate separators corresponding to the geometry bitstreams and separators corresponding to the attribute bitstreams in respective hierarchies and partial regions.

Note that, in the following, the separator generation units 474-1 to 474-4 will be referred to as separator generation units 474 when it is not necessary to distinguish the separator generation units 474-1 to 474-4 from each other for explanation. In addition, the separator generation units 477-1 and 477-2 will be referred to as separator generation units 477 when it is not necessary to distinguish the separator generation units 477-1 and 477-2 from each other for explanation.

A multiplexer 475-1 to a multiplexer 475-4 each multiplex the geometry bitstream, the attribute bitstream, and the separators in each hierarchy and partial region to generate one bitstream. A multiplexer 478-1 and a multiplexer 478-2 each multiplex the bitstreams and the separators of each partial region in each hierarchy to generate one bitstream. A multiplexer 481 multiplexes the bitstreams and the separators of respective hierarchies to generate one bitstream.

Note that, in the following, the multiplexers 475-1 to 475-4 will be referred to as multiplexers 475 when it is not necessary to distinguish the multiplexers 475-1 to 475-4 from each other for explanation. Likewise, the multiplexers 478-1 and 478-2 will be referred to as multiplexers 478 when it is not necessary to distinguish the multiplexers 478-1 and 478-2 from each other for explanation.

As described above, by combining the division for each hierarchy, the division for each partial region, and the division for each type of information in a hierarchical manner, the number of divisions can be easily increased, and an increase in load for encoding can be further suppressed.

Note that the order of combinations is arbitrary and is not limited to the above example. Furthermore, the number of combinations, the number of divisions in each approach, and the like are also arbitrary.

<Flow of Encoding Process>

Also in this case, the encoding process is performed basically in a flow similar to the case described with reference to the flowchart in FIG. 9. Accordingly, the description of the flow will be omitted.

<Flow of Signal Sequence Encoding Process>

Next, an example of the flow of the signal sequence encoding process executed in step S105 in FIG. 9 will be described with reference to a flowchart in FIGS. 28 and 29.

When the signal sequence encoding process is started, the hierarchy division unit 479 divides the signal sequence for each resolution in step S301.

In step S302, the spatial region division unit 476 selects a hierarchy as a processing target.

In step S303, the spatial region division unit 476 divides the region in the 3D space in the processing target hierarchy.

In step S304, the information division unit 471 selects a partial region as a processing target.

In step S305, the information division unit 471 divides the signal sequence into the geometry data and the attribute data in the processing target hierarchy and partial region.

In step S306, the geometry encoding unit 472 encodes the geometry data to generate a geometry bitstream.

In step S307, the attribute encoding unit 473 encodes the attribute data to generate an attribute bitstream.

In step S308, the separator generation unit 474 generates an information separator corresponding to the geometry bitstream generated in step S306 and an information separator corresponding to the attribute bitstream generated in step S307.

In step S309, the multiplexer 475 multiplexes the geometry bitstream generated in step S306, the attribute bitstream generated in step S307, and the respective information separators generated in step S308 to generate one bitstream.

Figure 29:
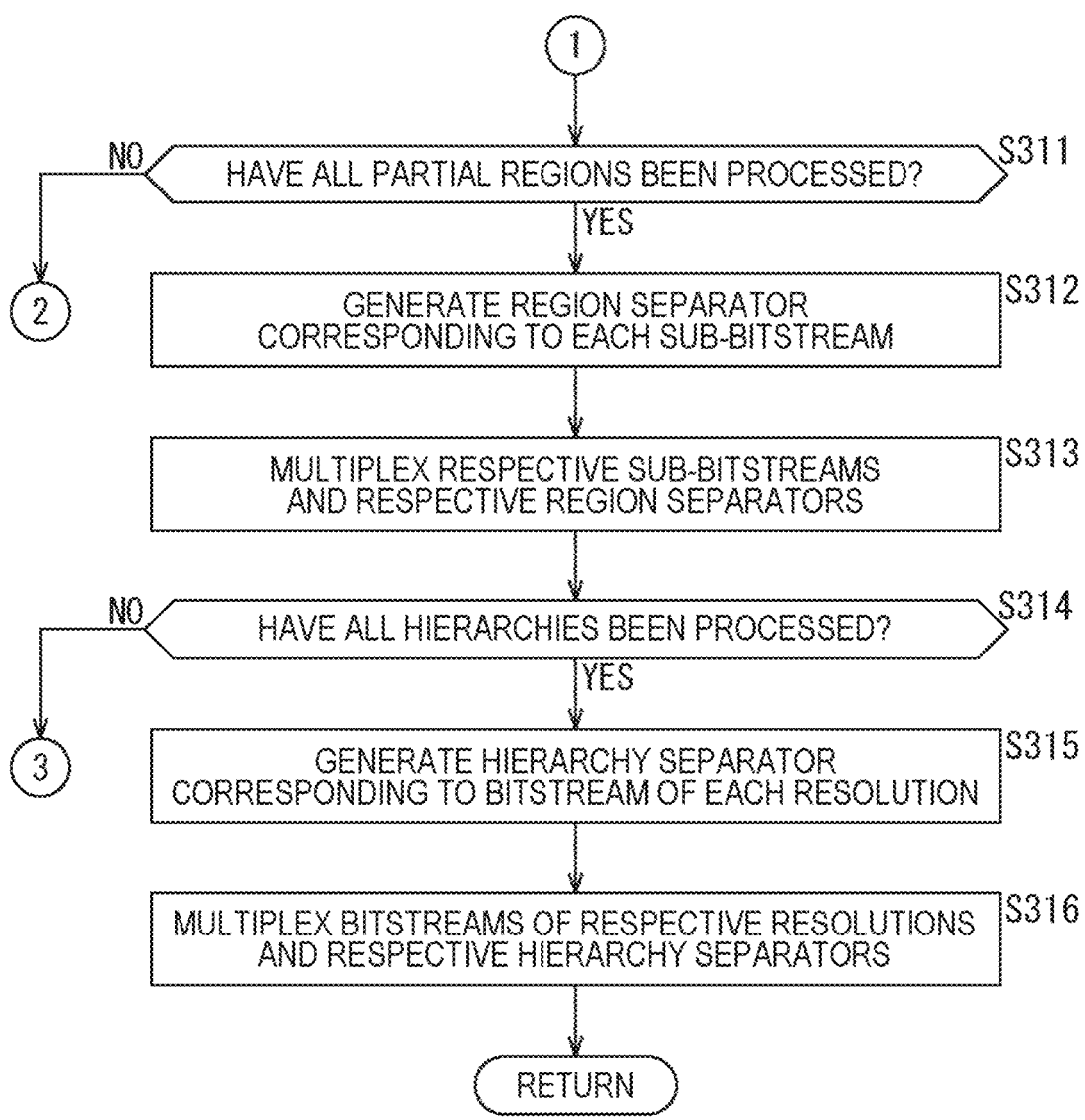
FIG. 29 is a flowchart subsequent to FIG. 28, for explaining an example of the flow of a signal sequence encoding process.

Once the process in step S309 ends, the process proceeds to step S311 in FIG. 29.

In step S311 in FIG. 29, the information division unit 471 determines whether or not all partial regions have been processed. When it is determined that there is an unprocessed partial region, the process returns to step S304 in FIG. 28. In step S304, a new partial region is selected as a processing target, and the subsequent processes are executed. That is, the respective processes in step S304 to step S311 are executed for each partial region.

Then, when it is determined in step S311 in FIG. 29 that all partial regions have been processed, the process proceeds to step S312.

Figure 28:
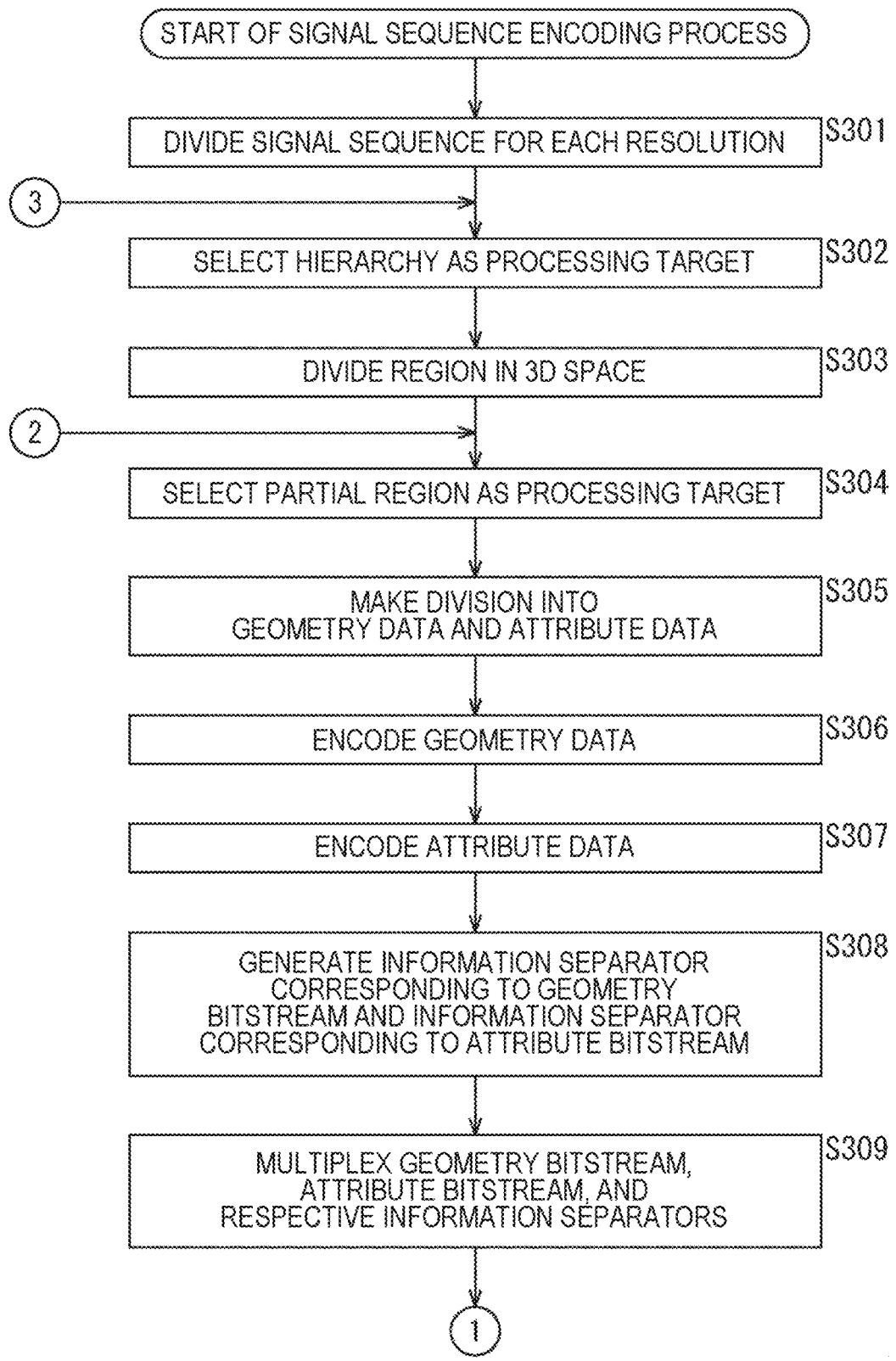
FIG. 28 is a flowchart for explaining an example of the flow of a signal sequence encoding process.

In step S312, the separator generation unit 477 generates a region separator corresponding to each sub-bitstream generated in step S309 in FIG. 28 in the processing target hierarchy.

In step S313, the multiplexer 478 multiplexes the respective sub-bitstreams generated in step S309 in FIG. 28 and the respective region separators generated in step S312 in the processing target hierarchy to generate one bitstream.

In step S314, the spatial region division unit 476 determines whether or not all hierarchies have been processed. When it is determined that there is an unprocessed hierarchy, the process returns to step S302 in FIG. 28. In step S302, a new hierarchy is selected as a processing target, and the subsequent processes are executed. That is, the respective processes in step S302 to step S314 are executed for each hierarchy.

Then, when it is determined in step S314 in FIG. 29 that all hierarchies have been processed, the process proceeds to step S315.

In step S315, the separator generation unit 480 generates a hierarchy separator corresponding to the bitstream of each hierarchy (each resolution) generated in step S313.

In step S316, the multiplexer 481 multiplexes the bitstreams of respective hierarchies (respective resolutions) generated in step S313 and respective hierarchy separators generated in step S315 to generate one bitstream.

Once the process in step S316 ends, the signal sequence encoding process ends, and the process returns to FIG. 9.

By executing each process as described above, the 3D data can be divided into a plurality of pieces and encoded, such that an increase in load for encoding and decoding the 3D data can be suppressed.

<Decoding Apparatus>

Since the decoding apparatus in this case is similar to the case of FIG. 11, the description of the decoding apparatus will be omitted.

<Decoding Unit>

Figure 30:
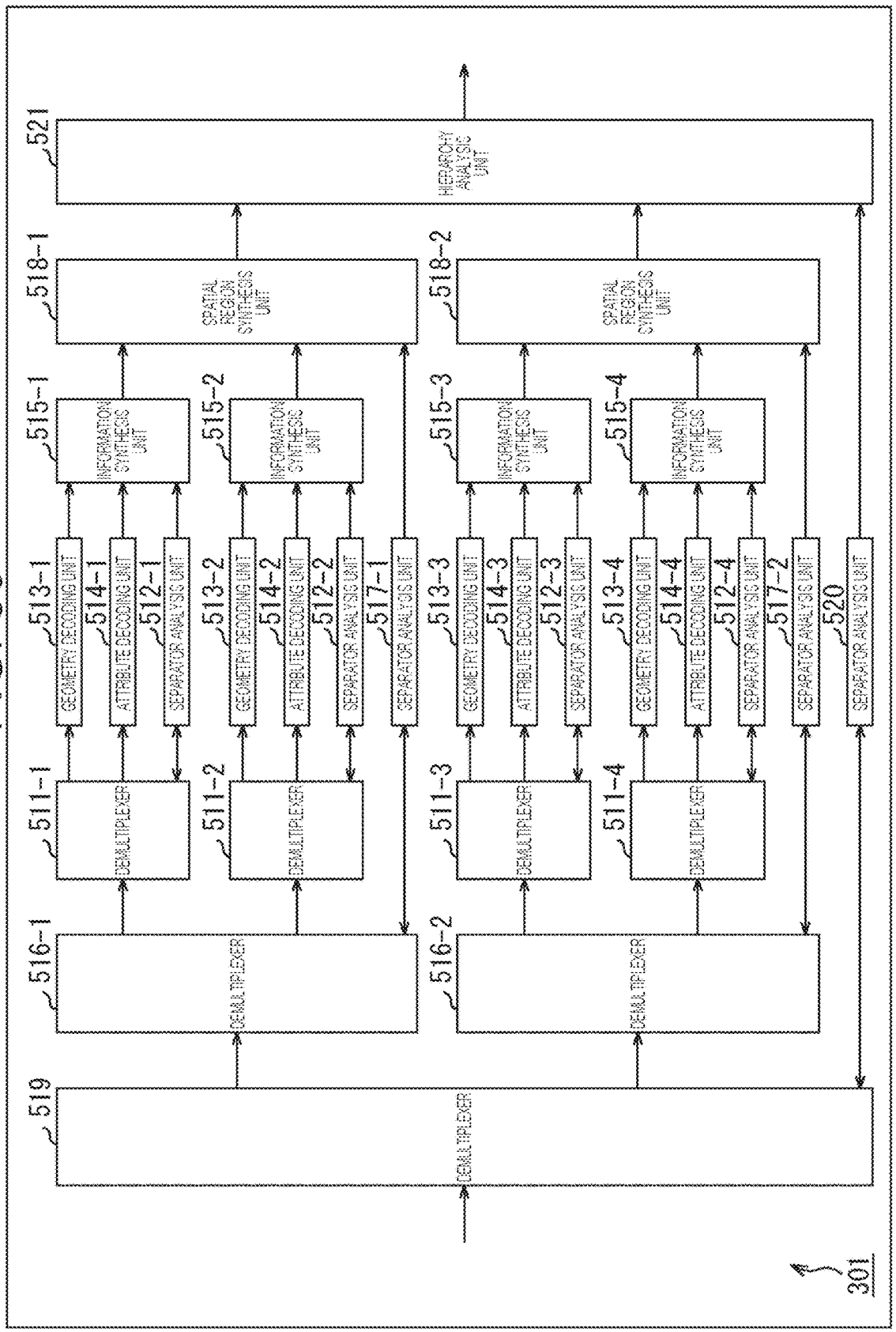
FIG. 30 is a block diagram illustrating a main configuration example of a decoding unit.

FIG. 30 is a block diagram illustrating a main configuration example of the decoding unit 301 when the above-described "division of spatial region", "division of attribute information", and "division between spatial resolutions" are combined. In this case, the decoding unit 301 has blocks as illustrated in FIG. 30.

The input bitstream is demultiplexed and divided into bitstreams of respective hierarchies by a demultiplexer 519. The bitstreams of respective hierarchies are demultiplexed, and divided into bitstreams of two regions by a demultiplexer 516-1 and a demultiplexer 516-2. Moreover, the bitstreams of respective hierarches and respective regions are each divided into a geometry bitstream and an attribute bitstream by a demultiplexer 511-1 to a demultiplexer 511-4.

Note that, in the following, the demultiplexers 516-1 and 516-2 will be referred to as demultiplexers 516 when it is not necessary to distinguish the demultiplexers 516-1 and 516-2 from each other for explanation. Likewise, the demultiplexers 511-1 to 511-4 will be referred to as demultiplexers 511 when it is not necessary to distinguish the demultiplexers 511-1 to 511-4 from each other for explanation.

A geometry decoding unit 513-1 to a geometry decoding unit 513-4 decode geometry bitstreams, and generate geometry data for respective hierarchies and partial regions. An attribute decoding unit 514-1 to an attribute decoding unit 514-4 decode attribute bitstreams, and generate attribute data for respective hierarchies and partial regions.

Note that, in the following, the geometry decoding units 513-1 to 513-4 will be referred to as geometry decoding units 513 when it is not necessary to distinguish the geometry decoding units 513-1 to 513-4 from each other for explanation. Likewise, the attribute decoding units 514-1 to 514-4 will be referred to as attribute decoding units 514 when it is not necessary to distinguish the attribute decoding units 514-1 to 514-4 from each other for explanation.

Furthermore, a separator analysis unit 520 detects the hierarchy separator from the bitstream to analyze the detected hierarchy separator, and obtains hierarchy division information. In addition, a separator analysis unit 517-1 and a separator analysis unit 517-2 detect the region separators from the bitstreams of respective partial regions in respective hierarchies to analyze the detected region separators, and obtain region division information. Moreover, a separator analysis unit 512-1 to a separator analysis unit 512-4 detect the information separators from the bitstreams in respective hierarchies and partial regions to analyze the detected information separators, and obtain information division information.

Note that, in the following, the separator analysis units 512-1 to 512-4 will be referred to as separator analysis units 512 when it is not necessary to distinguish the separator analysis units 512-1 to 512-4 from each other for explanation. Likewise, the separator analysis units 517-1 and 517-2 will be referred to as separator analysis units 517 when it is not necessary to distinguish the separator analysis units 517-1 and 517-2 from each other for explanation.

An information synthesis unit 515-1 to an information synthesis unit 515-4 each synthesize the geometry data and the attribute data on the basis of the information division information in each hierarchy and partial region to generate one signal sequence. A spatial region synthesis unit 518-1 and a spatial region synthesis unit 518-2 each synthesize the signal sequences of respective partial regions on the basis of the region division information in each hierarchy to generate one signal sequence. A hierarchy synthesis unit 521 synthesizes the signal sequences of respective hierarchies on the basis of the hierarchy division information to generate one signal sequence.

Note that, in the following, the information synthesis units 515-1 to 515-4 will be referred to as information synthesis units 515 when it is not necessary to distinguish the information synthesis units 515-1 to 515-4 from each other for explanation. Likewise, in the following, the spatial region synthesis units 518-1 and 518-2 will be referred to as spatial region synthesis units 518 when it is not necessary to distinguish the spatial region synthesis units 518-1 and 518-2 from each other for explanation.

As described above, by combining the division for each hierarchy, the division for each partial region, and the division for each type of information in a hierarchical manner, the number of divisions can be easily increased, and an increase in load for decoding can be further suppressed.

Note that the order of combinations is arbitrary and is not limited to the above example. Furthermore, the number of combinations, the number of divisions in each approach, and the like are also arbitrary.

<Flow of Decoding Process>

Also in this case, the decoding process is performed basically in a flow similar to the case described with reference to the flowchart in FIG. 13. Accordingly, the description of the flow will be omitted.

<Flow of Bitstream Decoding Process>

Next, an example of the flow of the bitstream decoding process executed in step S141 in FIG. 13 will be described with reference to a flowchart in FIGS. 31 and 32.

When the bitstream decoding process is started, the separator analysis unit 520 detects a hierarchy separator in the input bitstream in step S331.

In step S332, the separator analysis unit 520 analyzes the hierarchy separator detected in step S331 to generate hierarchy division information.

In step S333, the demultiplexer 519 divides the bitstream for each resolution on the basis of the hierarchy separator.

In step S334, the demultiplexer 516 selects a hierarchy as a processing target.

In step S335, the separator analysis unit 517 detects a region separator in the bitstream of the processing target hierarchy.

In step S336, the separator analysis unit 517 generates region division information obtained by analyzing the detected region separator.

In step S337, the demultiplexer 516 divides the bitstream for each partial region on the basis of the region separator.

In step S338, the demultiplexer 511 selects a partial region as a processing target.

In step S339, the separator analysis unit 512 detects an information separator.

Figure 32:
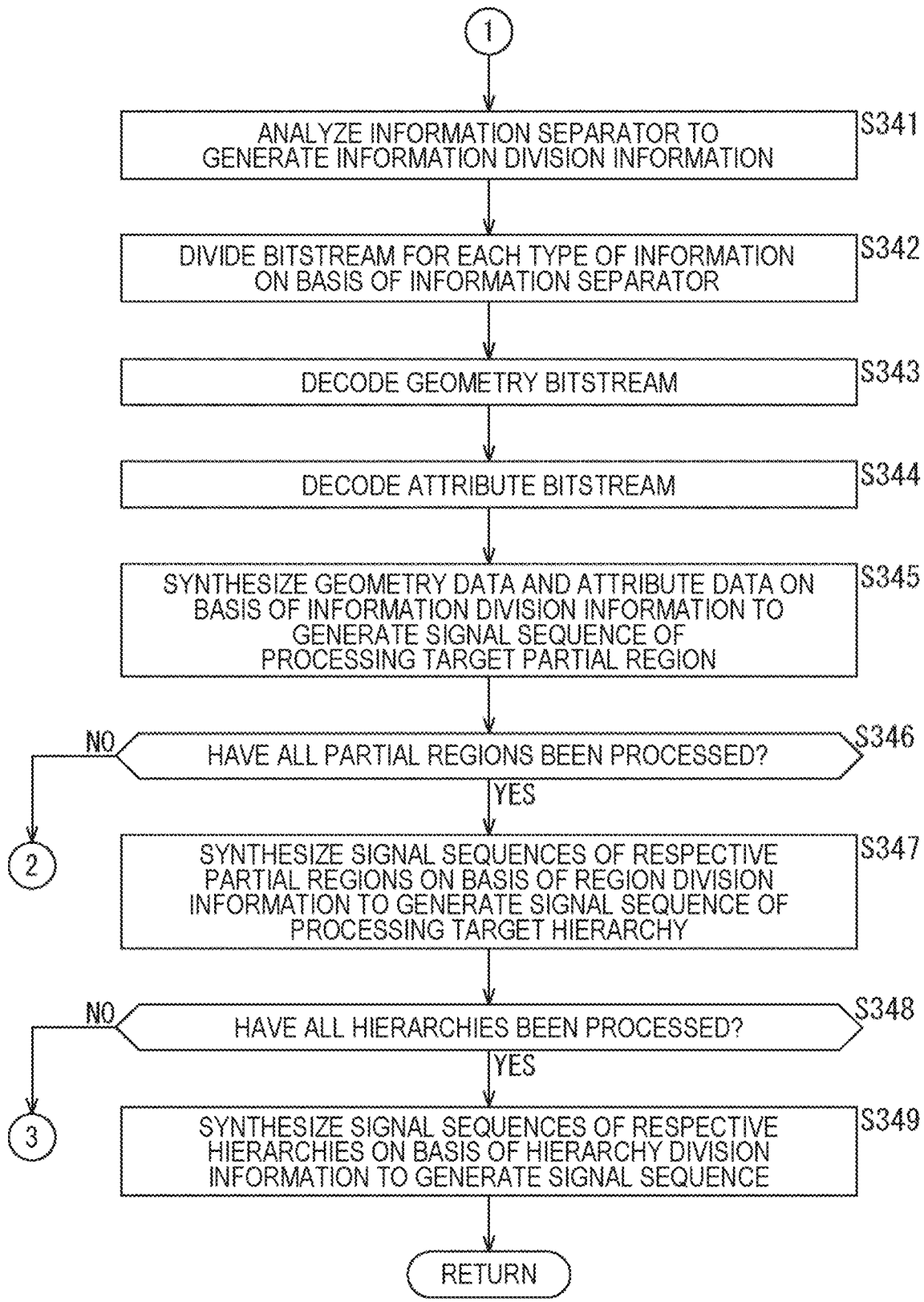
FIG. 32 is a flowchart subsequent to FIG. 31, for explaining an example of the flow of a bitstream decoding process.

Once the process in step S339 ends, the process proceeds to step S341 in FIG. 32.

In step S341 in FIG. 32, the separator analysis unit 512 analyzes the information separator to generate information division information.

In step S342, the demultiplexer 511 divides the bitstream for each type of information on the basis of the information separator.

In step S343, the geometry decoding unit 513 decodes the geometry bitstream in each hierarchy and each partial region to generate geometry data.

In step S344, the attribute decoding unit 514 decodes the attribute bitstream in the processing target hierarchy and partial region to generate attribute data.

In step S345, the information synthesis unit 515 synthesizes the geometry data and the attribute data in the processing target hierarchy and partial region on the basis of the information division information to generate a signal sequence of the processing target partial region.

In step S346, the demultiplexer 511 determines whether or not all partial regions have been processed.

Figure 31:
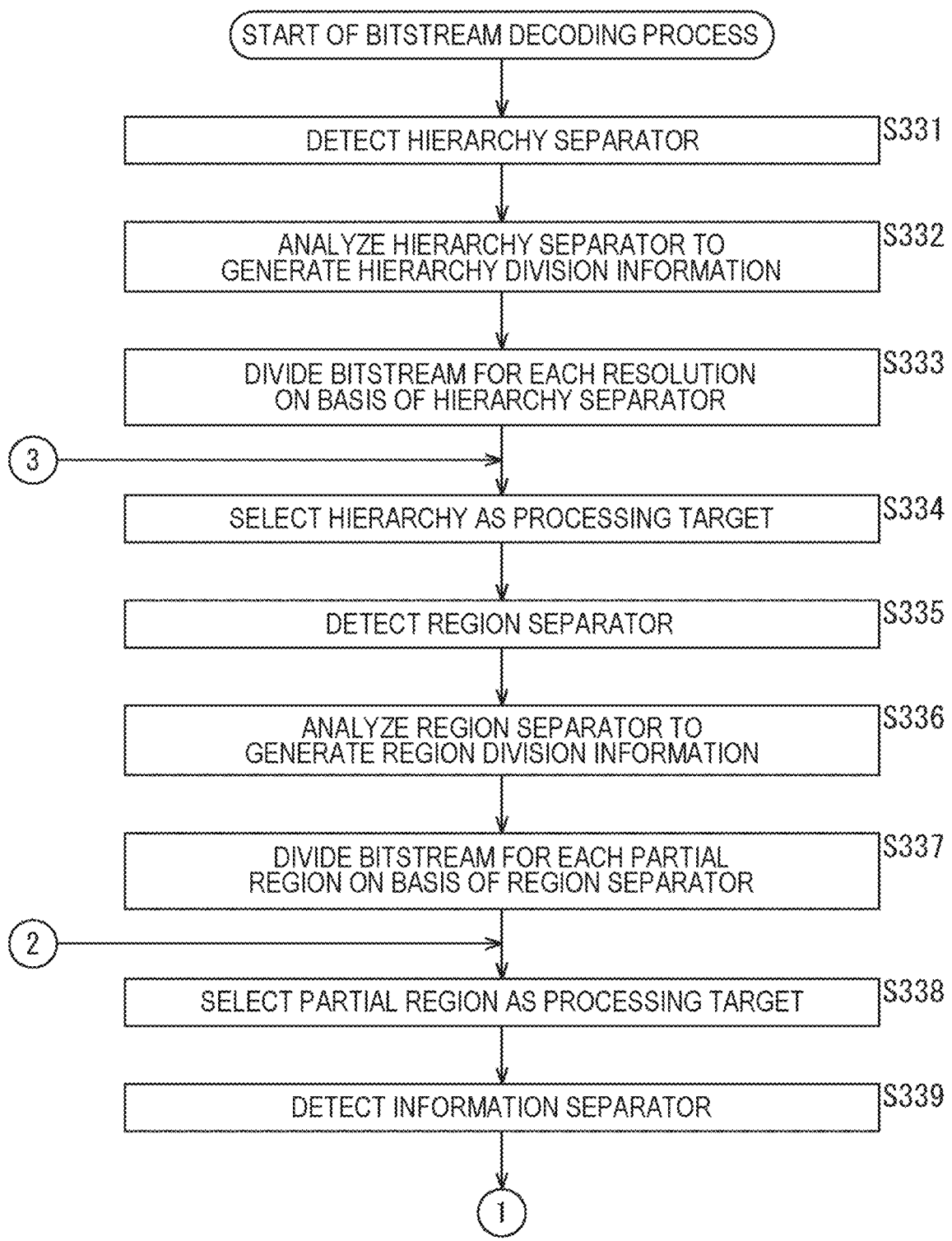
FIG. 31 is a flowchart for explaining an example of the flow of a bitstream decoding process.

When it is determined that there is an unprocessed partial region, the process returns to step S338 in FIG. 31. In step S338, a new partial region is selected as a processing target, and the subsequent processes are executed. That is, the respective processes in step S338 to step S346 are executed for each partial region.

Then, when it is determined in step S346 that all partial regions have been processed, the process proceeds to step S347.

In step S347, the spatial region synthesis unit 518 synthesizes the signal sequences of the respective partial regions on the basis of the region division information to generate a signal sequence of the processing target hierarchy.

In step S348, the demultiplexer 519 determines whether or not all hierarchies have been processed. When it is determined that there is an unprocessed hierarchy, the process returns to step S334 in FIG. 31. In step S334, a new hierarchy is selected as a processing target, and the subsequent processes are executed. That is, the respective processes in step S334 to step S348 are executed for each partial region.

In step S349, the hierarchy synthesis unit 521 synthesizes the signal sequences of respective hierarchies on the basis of the hierarchy division information to generate a signal sequence.

Once the process in step S349 ends, the bitstream decoding process ends, and the process returns to FIG. 13.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

5. Fourth Embodiment

<Division in Time Direction>

Next, a description will be given of a case where "division in time direction" indicated in the fourth row from the top (excluding the item name row) of the table illustrated in FIG. 5 (a row with "4" in the leftmost column) is performed.

<Encoding Apparatus>

Also in this case, since the configuration of the encoding apparatus is similar to the configuration in the case of <2. First Embodiment> (FIG. 6), the description of the encoding apparatus will be omitted.

<Encoding Unit>

Figure 33:
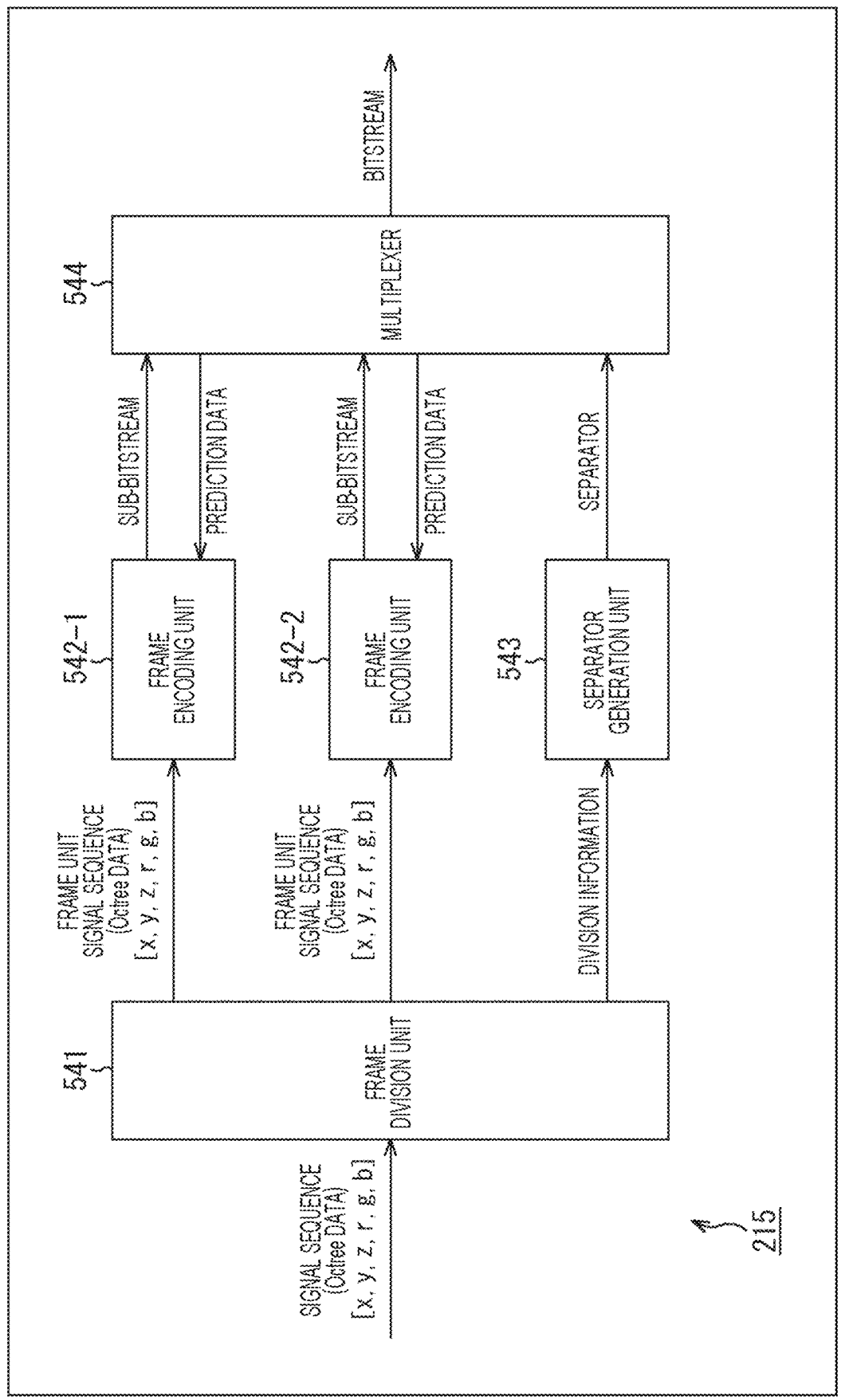
FIG. 33 is a block diagram illustrating a main configuration example of an encoding unit.

FIG. 33 is a block diagram illustrating a main configuration example of an encoding unit 215 in this case. In this case, the encoding unit 215 is configured to divide 3D data made up of a plurality of frames into every frame to encode the divided 3D data, and generate a plurality of divided bitstreams.

As illustrated in FIG. 33, the encoding unit 215 in this case includes a frame division unit 541, a frame encoding unit 542-1, a frame encoding unit 542-2, a separator generation unit 543, and a multiplexer 544.

The frame division unit 541 divides a signal sequence (for example, octree data) made up of a plurality of frames (that is, a signal sequence of a moving image) into every one of the frames to generate frame unit signal sequences. The frame division unit 541 supplies the respective frame unit signal sequences to the frame encoding units 542-1 and 542-2. The frame encoding units 542-1 and 542-2 will be referred to as frame encoding units 542 when it is not necessary to distinguish the frame encoding units 542-1 and 542-2 from each other for explanation.

Furthermore, the frame division unit 541 supplies, to the separator generation unit 543, information regarding the division of the signal sequence (3D data), such as how the signal sequence was divided and what information is included in each partial signal sequence, as division information, for example.

The frame encoding unit 542 encodes the frame unit signal sequence to generate a sub-bitstream (divided bitstream), and supplies the generated sub-bitstream to the multiplexer 544. Similarly to the partial region encoding unit 332 of the first embodiment, the frame encoding unit 542 maps the 3D data (frame unit signal sequence) on a two-dimensional space, converts the color format, and performs encoding with an encoding technique for 2D data. Note that, in FIG. 33, two frame encoding units 542 are indicated, but the number of frame encoding units 542 is arbitrary.

Similarly to the separator generation unit 275 (FIG. 8) of the first embodiment, or the like, the separator generation unit 543 generates a separator having a unique bit pattern, to put information included in the division information supplied from the frame division unit 541 in the generated separator, and supplies the separator with the information to the multiplexer 544.

The multiplexer 544 multiplexes the sub-bitstreams of respective frames supplied from the frame encoding units 542 and the separators of respective frames supplied from the separator generation unit 543 to generate and output one bitstream. At that time, as described with reference to FIG. 3, the multiplexer 544 connects the respective sub-bitstreams in series, and arranges the separator at the position of a joint between the sub-bitstreams. In different terms, the multiplexer 544 connects the respective sub-bitstreams in series such that the separator is sandwiched between the respective sub-bitstreams.

Such frame division unit 541 to multiplexer 544 may have any configuration; for example, these units may each include a CPU, a ROM, a RAM, and the like such that the CPU performs each process by loading a program or data stored in the ROM or the like into the RAM and executing the loaded program or data.

As described above, also in this case, the signal sequence, which is 3D data, is divided into every frame and encoded. Accordingly, the encoding unit 215 in this case can also obtain effects similar to the case of the first embodiment.

Furthermore, also in this case, as described above, since the separator is generated and embedded in the bitstream as in the case of the first embodiment, effects similar to the effects of the first embodiment can be obtained.

<Flow of Encoding Process>

Also in this case, the encoding process is performed basically in a flow similar to the case described with reference to the flowchart in FIG. 9. Accordingly, the description of the flow will be omitted.

<Flow of Signal Sequence Encoding Process>

Figure 34:
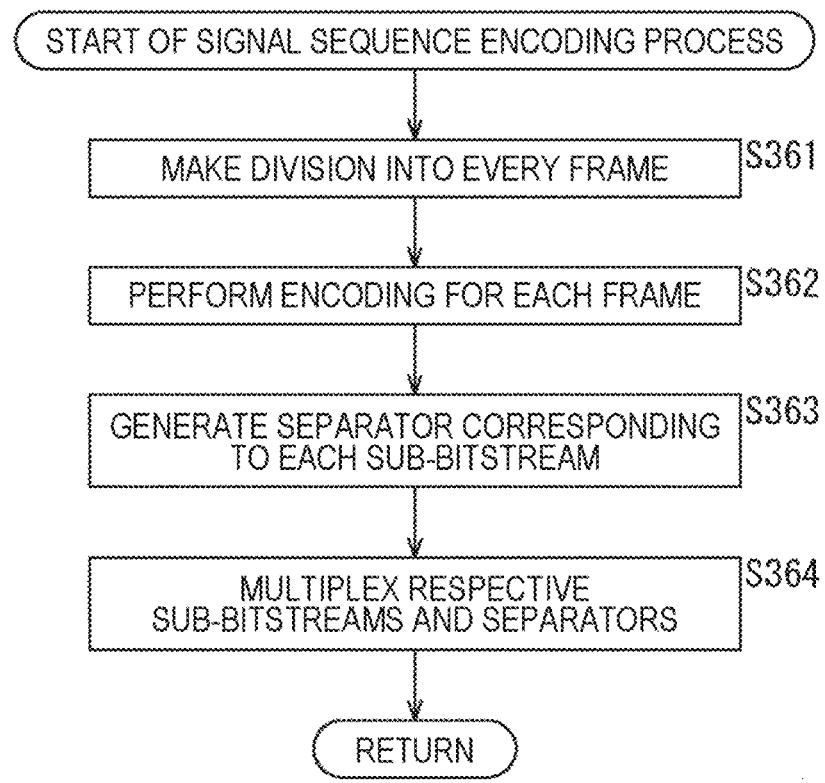
FIG. 34 is a flowchart for explaining an example of the flow of a signal sequence encoding process.

Next, an example of the flow of the signal sequence encoding process in this case executed in step S105 in FIG. 9 will be described with reference to a flowchart in FIG. 34.

When the signal sequence encoding process is started, the frame division unit 541 divides the signal sequence into every frame in step S361.

In step S362, the frame encoding unit 542 encodes the signal sequence for each frame.

In step S363, the separator generation unit 543 generates a separator corresponding to each sub-bitstream.

In step S364, the multiplexer 544 multiplexes the respective sub-bitstreams and the separators.

Once the process in step S364 ends, the signal sequence encoding process ends, and the process returns to FIG. 9.

By executing each process as described above, the 3D data can be divided into a plurality of pieces and encoded, such that an increase in load for encoding and decoding the 3D data can be suppressed.

<Decoding Apparatus>

Since the decoding apparatus in this case is similar to the case of FIG. 11, the description of the decoding apparatus will be omitted.

<Decoding Unit>

Figure 35:
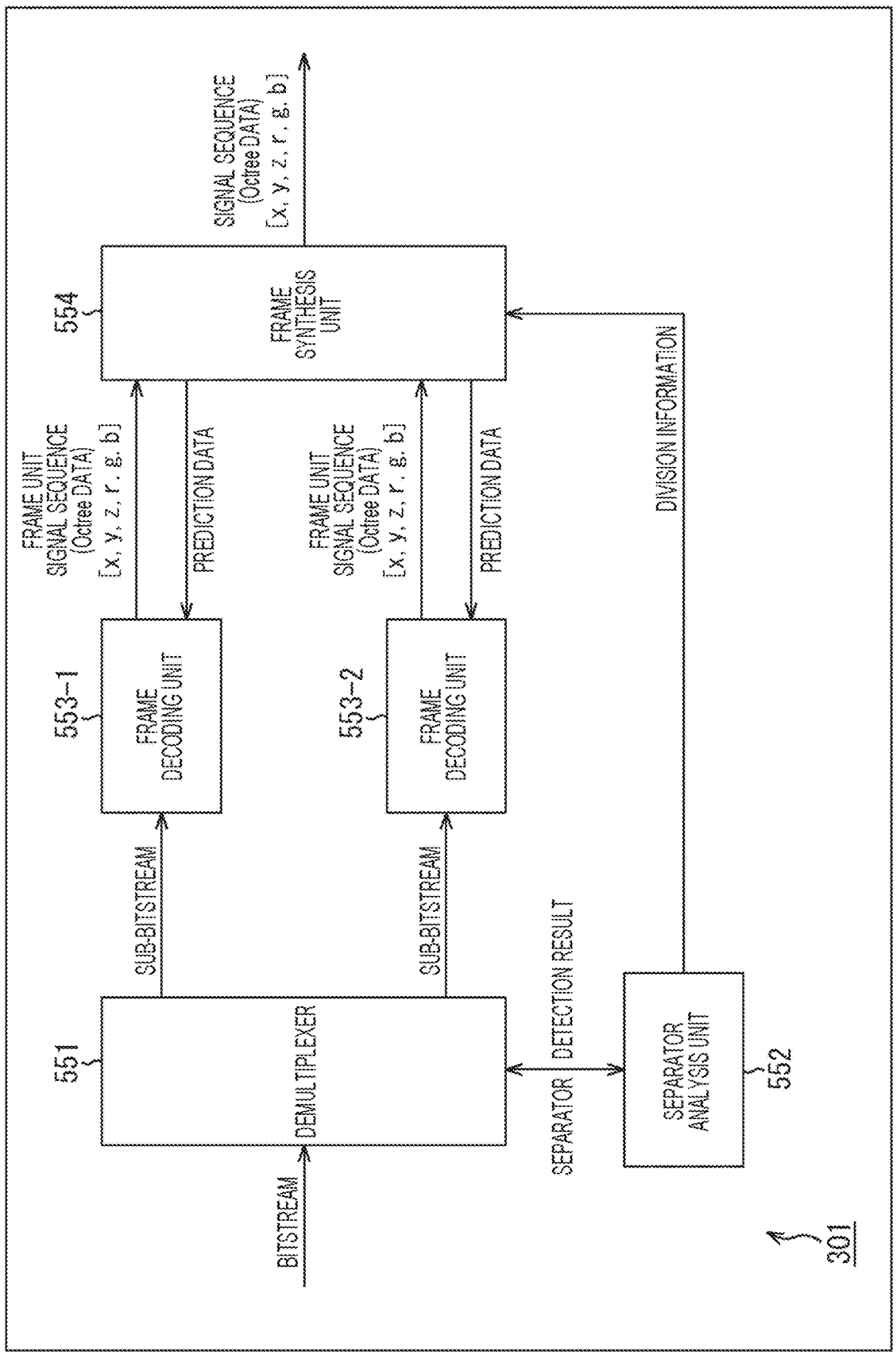
FIG. 35 is a block diagram illustrating a main configuration example of a decoding unit.
Figure 36:
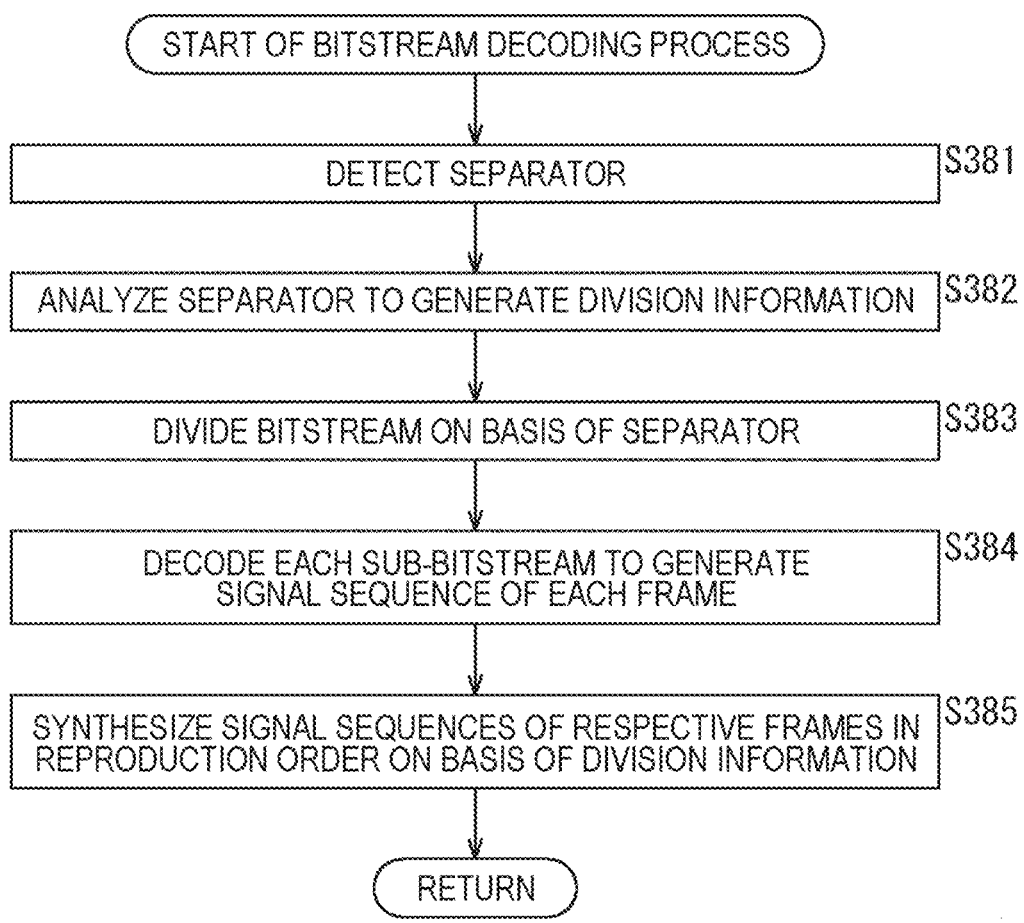
FIG. 36 is a flowchart for explaining an example of the flow of a bitstream decoding process.

FIG. 35 is a block diagram illustrating a main configuration example of a decoding unit 301 in this case. The decoding unit 301 in this case synthesizes a plurality of pieces of divided data obtained by decoding each of a plurality of divided bitstreams, on the basis of information regarding the time of a frame corresponding to the divided bitstream obtained by analyzing the separator. As illustrated in FIG. 35, the decoding unit 301 in this case includes a demultiplexer 551, a separator analysis unit 552, a frame decoding unit 553-1, a frame decoding unit 553-2, and a frame synthesis unit 554.

Upon acquiring a bitstream input to a decoding apparatus 300, the demultiplexer 551 demultiplexes the acquired bitstream to obtain a bitstream (sub-bitstream) for each frame. The demultiplexer 551 supplies the obtained respective sub-bitstreams to the frame decoding units 553-1 and 553-2. The frame decoding units 553-1 and 553-2 will be referred to as frame decoding units 553 when it is not necessary to distinguish the frame decoding units 553-1 and 553-2 from each other for explanation.

The separator analysis unit 552 performs a process similar to the process of the separator analysis unit 312. For example, the separator analysis unit 552 detects a separator in the bitstream supplied to the demultiplexer 551, and notifies the demultiplexer 551 of the result of the detection. Furthermore, the separator analysis unit 552 analyzes information included in the detected separator, and supplies this analyzed information to the frame synthesis unit 554 as division information.

The frame decoding unit 553 decodes the supplied sub-bitstream (divided bitstream) to generate a frame unit signal sequence (for example, octree data), and supplies the generated frame unit signal sequence to the frame synthesis unit 554. Note that, similarly to the partial region decoding unit 363 of the first embodiment, the frame decoding unit 553 decodes the divided bitstream with a decoding technique for 2D data, converts the color format, and maps 2D data on a three-dimensional space.

In FIG. 35, two frame decoding units 553 are illustrated, but the number of frame decoding units 553 is arbitrary. The number of the frame decoding units 553 may be single or three or more.

The frame synthesis unit 554 synthesizes the frame unit signal sequences supplied from the respective frame decoding units 553 to generate one signal sequence (3D data, for example, octree data or the like). At that time, the frame synthesis unit 554 performs the above synthesis on the basis of the division information supplied from the separator analysis unit 552 (that is, information regarding the divided bitstreams). The frame synthesis unit 554 supplies the generated signal sequence to the outside of the decoding unit 301 (for example, a voxel data generation unit 302).

Note that the demultiplexer 551 to the frame synthesis unit 554 may have any configuration; for example, these units may each include a CPU, a ROM, a RAM, and the like such that the CPU performs each process by loading a program or data stored in the ROM or the like into the RAM and executing the loaded program or data.

As described above, also in this case, the bitstream is divided into a plurality of pieces and decoded. Accordingly, effects similar to the case of the first embodiment can be obtained.

Furthermore, also in this case, a separator similar to the case of the first embodiment is embedded in the bitstream, and the decoding unit 301 performs the decoding process using the embedded separator. Accordingly, effects similar to the effects of the first embodiment can be obtained.

<Flow of Decoding Process>

Also in this case, since the decoding process is similar to the case described with reference to the flowchart in FIG. 13, the description of the decoding process will be omitted.

<Flow of Bitstream Decoding Process>

Next, an example of the flow of the bitstream decoding process executed in step S141 in FIG. 13 will be described with reference to a flowchart in FIG. 35.

When the bitstream decoding process is started, the separator analysis unit 552 detects a separator in the bitstream in step S381.

In step S382, the separator analysis unit 552 analyzes the separator detected in step S381 to generate division information.

In step S383, the demultiplexer 551 divides the bitstream into every sub-bitstream on the basis of the separator. That is, division into bitstreams for each frame is made.

In step S384, the frame decoding unit 553 decodes the bitstream of each frame to generate a frame unit signal sequence.

In step S385, the frame synthesis unit 554 synthesizes the frame unit signal sequences generated in step S384 in the reproduction order on the basis of the division information to generate one signal sequence.

Once the process in step S385 ends, the bitstream decoding process ends, and the process returns to FIG. 13.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

6. Fifth Embodiment

<Mesh-Texture>

In the above, a case where the present technology is applied to the process for point cloud data has been described; however, the present technology can be applied to arbitrary 3D data. For example, the present technology can be applied to the process for mesh data that is constituted by vertices, edges, and faces and defines a three-dimensional shape using a polygonal representation.

Next, a description will be given of a case where "mesh-texture data" indicated in the sixth row from the top (excluding the item name row) of the table illustrated in FIG. 5 (a row with "6" in the leftmost column) is performed.

<Encoding Apparatus>

Figure 37:
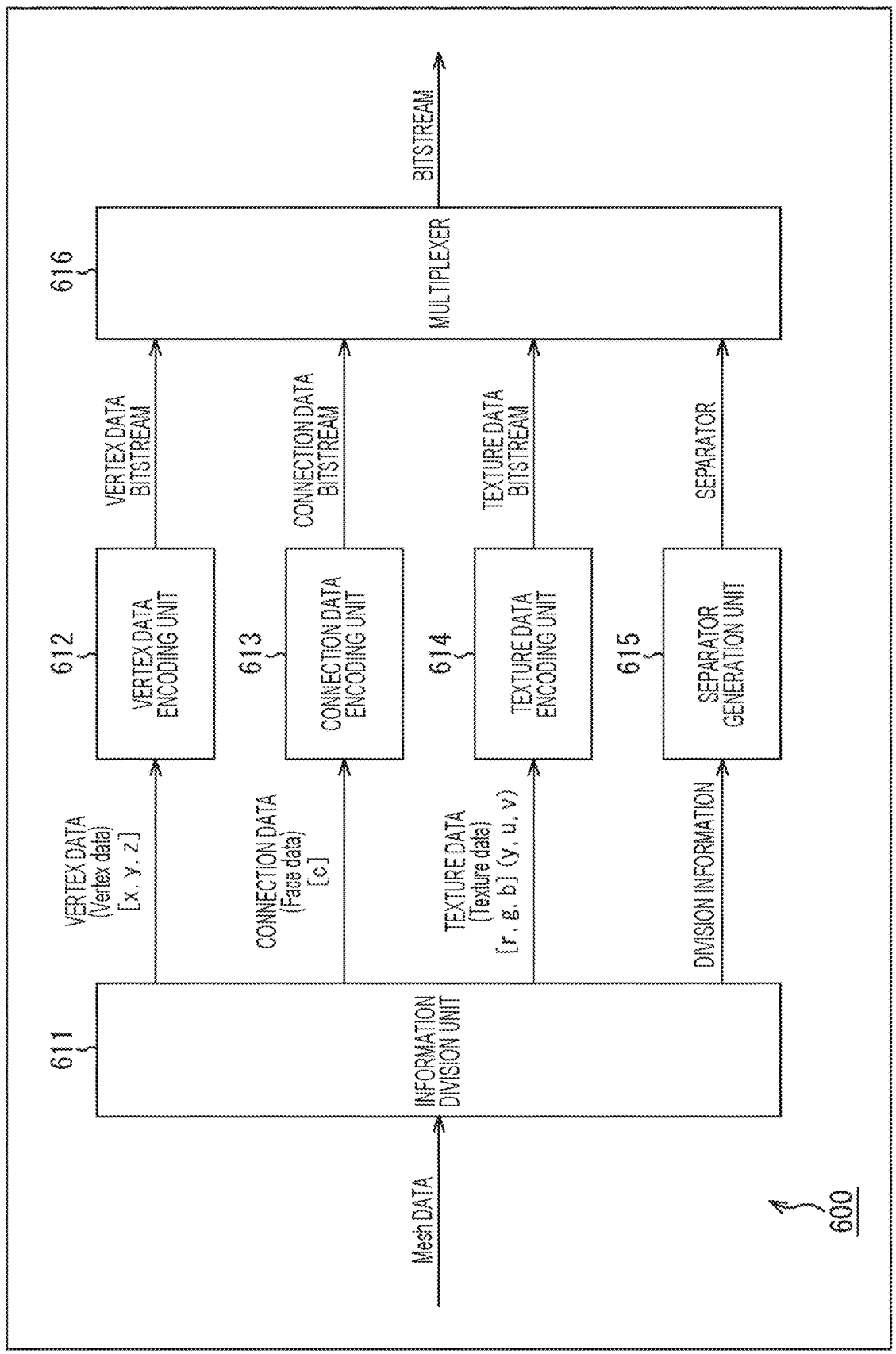
FIG. 37 is a block diagram illustrating a main configuration example of an encoding unit.

FIG. 37 is a block diagram illustrating a main configuration example of an encoding apparatus, which is an embodiment of the information processing apparatus to which the present technology is applied. An encoding apparatus 600 illustrated in FIG. 37 encodes mesh data input as an encoding target and generates a bitstream of the mesh data. At that time, the encoding apparatus 600 performs this encoding by a method to which the present technology is applied as described below.

The encoding apparatus 600 divides the 3D data into vertex data including information regarding vertices of a three-dimensional structure, connection data including information regarding connections of these vertices, and texture data including information regarding the texture of the three-dimensional structure to encode the divided 3D data, and generates a plurality of divided bitstreams. As illustrated in FIG. 6, the encoding apparatus 600 includes an information division unit 611, a vertex data encoding unit 612, a connection data encoding unit 613, a texture data encoding unit 614, a separator generation unit 615, and a multiplexer 616.

The information division unit 611 divides the supplied mesh data for each type of information on the mesh data to divides the data into vertex data (Vertex data), connection data (Face data), and texture data (Texture data). The information division unit 611 supplies the vertex data to the vertex data encoding unit 612. Furthermore, the information division unit 611 supplies the connection data to the connection data encoding unit 613. In addition, the information division unit 611 supplies the texture data to the texture data encoding unit 614.

Besides, the information division unit 611 supplies, to the separator generation unit 615, information regarding the division of the signal sequence (3D data), such as how the signal sequence was divided and what information is included in each partial signal sequence, as division information, for example.

The vertex data encoding unit 612 encodes the vertex data to generate a vertex data bitstream (divided bitstream), and supplies the generated vertex data bitstream to the multiplexer 616. Similarly to the partial region encoding unit 332 of the first embodiment, the vertex data encoding unit 612 maps the 3D data (frame unit signal sequence) on a two-dimensional space, converts the color format, and performs encoding with an encoding technique for 2D data.

The connection data encoding unit 613 and the texture data encoding unit 614 perform processes on data for the respective units (the connection data or the texture data) in a manner similar to the vertex data encoding unit 612. That is, the connection data encoding unit 613 encodes the connection data and supplies a connection data bitstream to the multiplexer 616. Furthermore, the texture data encoding unit 614 encodes the texture data and supplies a texture data bitstream to the multiplexer 616.

Similarly to the separator generation unit 275 (FIG. 8) of the first embodiment, or the like, the separator generation unit 615 generates a separator having a unique bit pattern, to put information included in the division information supplied from the information division unit 611 in the generated separator, and supplies the separator with the information to the multiplexer 616.

The multiplexer 616 multiplexes the vertex data bitstream supplied from the vertex data encoding unit 612, the connection data bitstream supplied from the connection data encoding unit 613, the texture data bitstream supplied from the texture data encoding unit 614, and the separators supplied from the separator generation unit 615, and generates and outputs one bitstream. At that time, as described with reference to FIG. 3, the multiplexer 616 connects the respective sub-bitstreams in series, and arranges the separator at the position of a joint between the sub-bitstreams. In different terms, the multiplexer 616 connects the respective sub-bitstreams in series such that the separator is sandwiched between the respective sub-bitstreams.

Note that the texture data may be further divided into every component and encoded. For example, when 3D data including a texture as illustrated in A of FIG. 38 is mapped on a two-dimensional space, the texture data is developed for each component of the texture data as illustrated in B of FIG. 38. Accordingly, the texture data may be further divided and encoded in units of components of the texture data. By configuring in this manner, the degree of parallelism in encoding and decoding processes rises, such that an increase in load for encoding and decoding the 3D data can be suppressed.

<Flow of Encoding Process>

Figure 39:
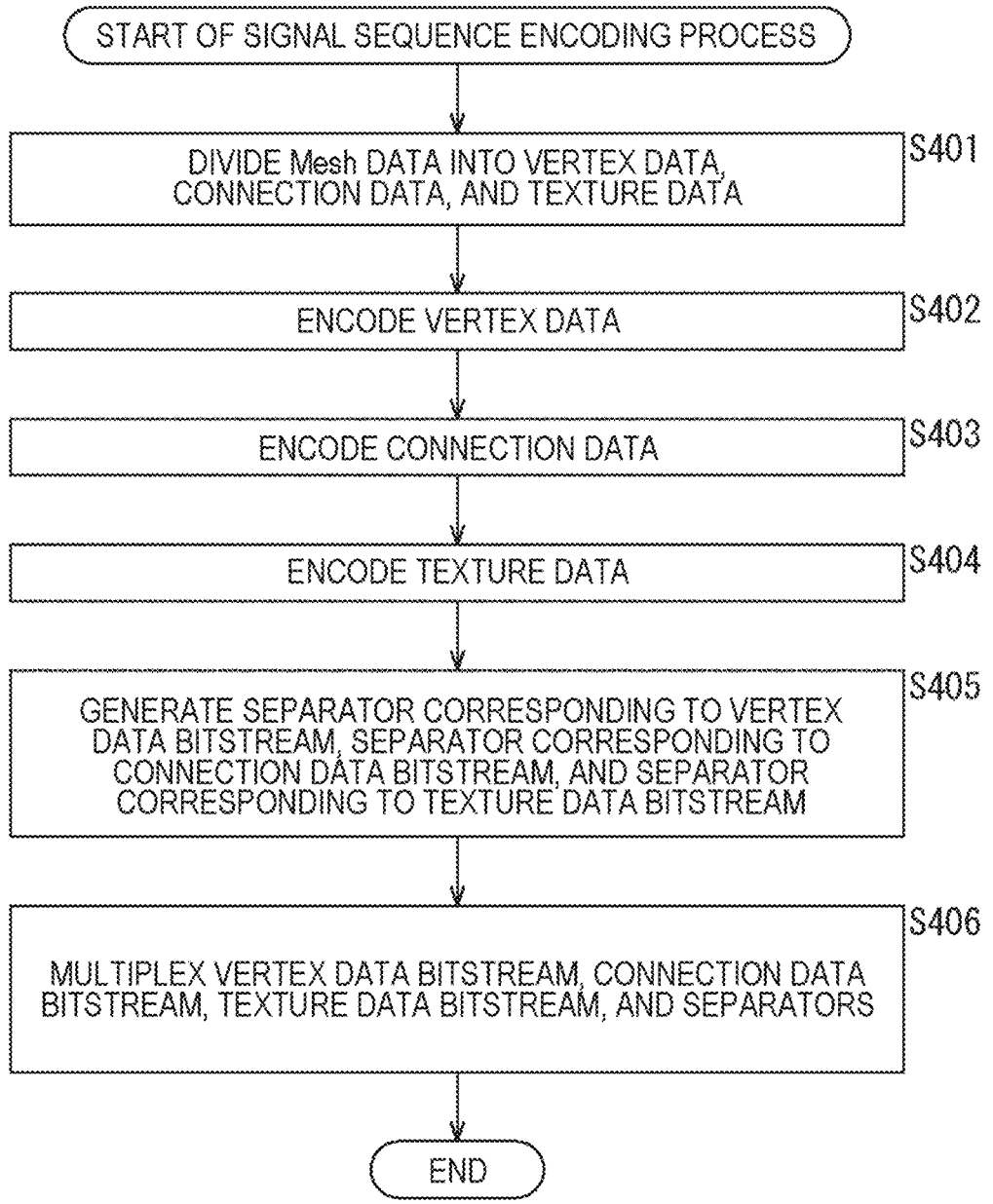
FIG. 39 is a flowchart for explaining an example of the flow of a signal sequence encoding process.

An example of the flow of an encoding process by the encoding apparatus 600 will be described with reference to a flowchart in FIG. 39.

When the encoding process is started, the demultiplexer 661 divides mesh data into vertex data, connection data, and texture data in step S401.

In step S402, the vertex data encoding unit 612 encodes the vertex data.

In step S403, the connection data encoding unit 613 encodes the connection data.

In step S404, the texture data encoding unit 614 encodes the texture data.

In step S405, the separator generation unit 615 generates a separator corresponding to a vertex data bitstream, a separator corresponding to a connection data bitstream, and a separator corresponding to a texture data bitstream.

In step S406, the multiplexer 616 multiplexes the vertex data bitstream, the connection data bitstream, the texture data bitstream, and the separators.

Once the process in step S406 ends, the encoding process ends.

By executing each process as described above, the 3D data can be divided into a plurality of pieces and encoded, such that an increase in load for encoding and decoding the 3D data can be suppressed.

<Decoding Apparatus>

Figure 40:
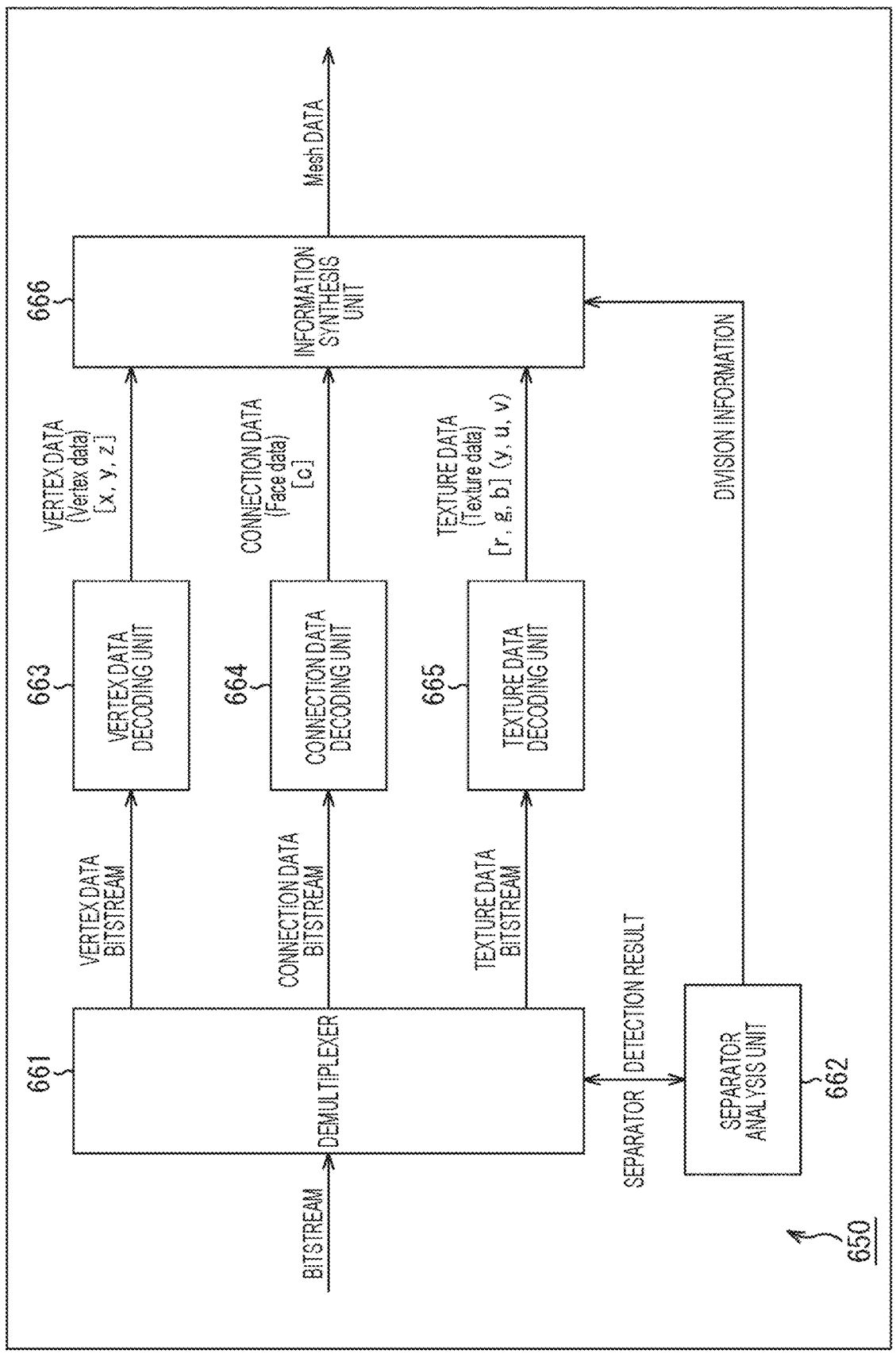
FIG. 40 is a block diagram illustrating a main configuration example of a decoding unit.

FIG. 40 is a block diagram illustrating a main configuration example of a decoding apparatus, which is an embodiment of an information processing apparatus to which the present technology is applied. The decoding apparatus 650 illustrated in FIG. 40 is a decoding apparatus corresponding to the encoding apparatus 600 in FIG. 37, and for example, the decoding apparatus 650 decodes mesh coded data generated by this encoding apparatus 600, and restores mesh data.

The decoding apparatus 650 synthesizes vertex data including information regarding vertices of a three-dimensional structure of a plurality of divided bitstreams, connection data including information regarding connections of these vertices, and texture data including information regarding the texture of this three-dimensional structure, which are obtained by decoding each of the plurality of divided bitstreams, on the basis of information regarding the type of information obtained by analyzing the separator. As illustrated in FIG. 40, the decoding apparatus 650 in this case includes a demultiplexer 661, a separator analysis unit 662, a vertex data decoding unit 663, a connection data decoding unit 664, a texture data decoding unit 665, and an information synthesis unit 666.

Upon acquiring a bitstream input to the decoding apparatus 650, the demultiplexer 661 demultiplexes the input bitstream, and divides the demultiplexed bitstream into a vertex data bitstream, a connection data bitstream, and a texture data bitstream to supply to the vertex data decoding unit 663, the connection data decoding unit 664, and the texture data decoding unit 665, respectively.

The separator analysis unit 662 detects a separator in the bitstream supplied to the demultiplexer 661, and notifies the demultiplexer 661 of the result of the detection. Furthermore, the separator analysis unit 662 analyzes information included in the detected separator, and supplies this analyzed information to the information synthesis unit 666 as division information.

The vertex data decoding unit 663 decodes the supplied vertex data bitstream (divided bitstream) to generate vertex data, and supplies the generated vertex data to the information synthesis unit 666. Note that, similarly to the partial region decoding unit 363 of the first embodiment, the vertex data decoding unit 663 decodes the divided bitstream with a decoding technique for 2D data, converts the color format, and maps 2D data on a three-dimensional space.

The connection data decoding unit 664 decodes the supplied connection data bitstream (divided bitstream) to generate connection data, and supplies the generated connection data to the information synthesis unit 666. Note that, similarly to the partial region decoding unit 363 of the first embodiment, the connection data decoding unit 664 decodes the divided bitstream with a decoding technique for 2D data, converts the color format, and maps 2D data on a three-dimensional space.

The texture data decoding unit 665 decodes the supplied texture data bitstream (divided bitstream) to generate texture data, and supplies the generated texture data to the information synthesis unit 666. Note that, similarly to the partial region decoding unit 363 of the first embodiment, the texture data decoding unit 665 decodes the divided bitstream with a decoding technique for 2D data, converts the color format, and maps 2D data on a three-dimensional space.

The information synthesis unit 666 synthesizes the vertex data supplied from the vertex data decoding unit 663, the connection data supplied from the connection data decoding unit 664, and the texture data supplied from the texture data decoding unit 665 to generate one signal sequence (3D data, for example, mesh data or the like). At that time, the information synthesis unit 666 performs the above synthesis on the basis of the division information supplied from the separator analysis unit 662 (that is, information regarding the divided bitstreams). The information synthesis unit 666 supplies the generated signal sequence to the outside of the decoding apparatus 650.

Note that the demultiplexer 661 to the information synthesis unit 666 may have any configuration; for example, these units may each include a CPU, a ROM, a RAM, and the like such that the CPU performs each process by loading a program or data stored in the ROM or the like into the RAM and executing the loaded program or data.

As described above, also in this case, the bitstream is divided into a plurality of pieces and decoded. Accordingly, effects similar to the case of the first embodiment can be obtained.

Furthermore, also in this case, a separator similar to the case of the first embodiment is embedded in the bitstream, and the decoding apparatus 650 performs the decoding process using the embedded separator. Accordingly, effects similar to the effects of the first embodiment can be obtained.

Note that the decoding apparatus 650 may synthesize the vertex data, the connection data, and the texture data for each component obtained by decoding each of a plurality of divided bitstreams, on the basis of information regarding the type of information obtained by the analysis unit analyzing the separator. By configuring in this manner, the degree of parallelism in encoding and decoding processes rises, such that an increase in load for encoding and decoding the 3D data can be suppressed.

<Flow of Decoding Process>

Figure 41:
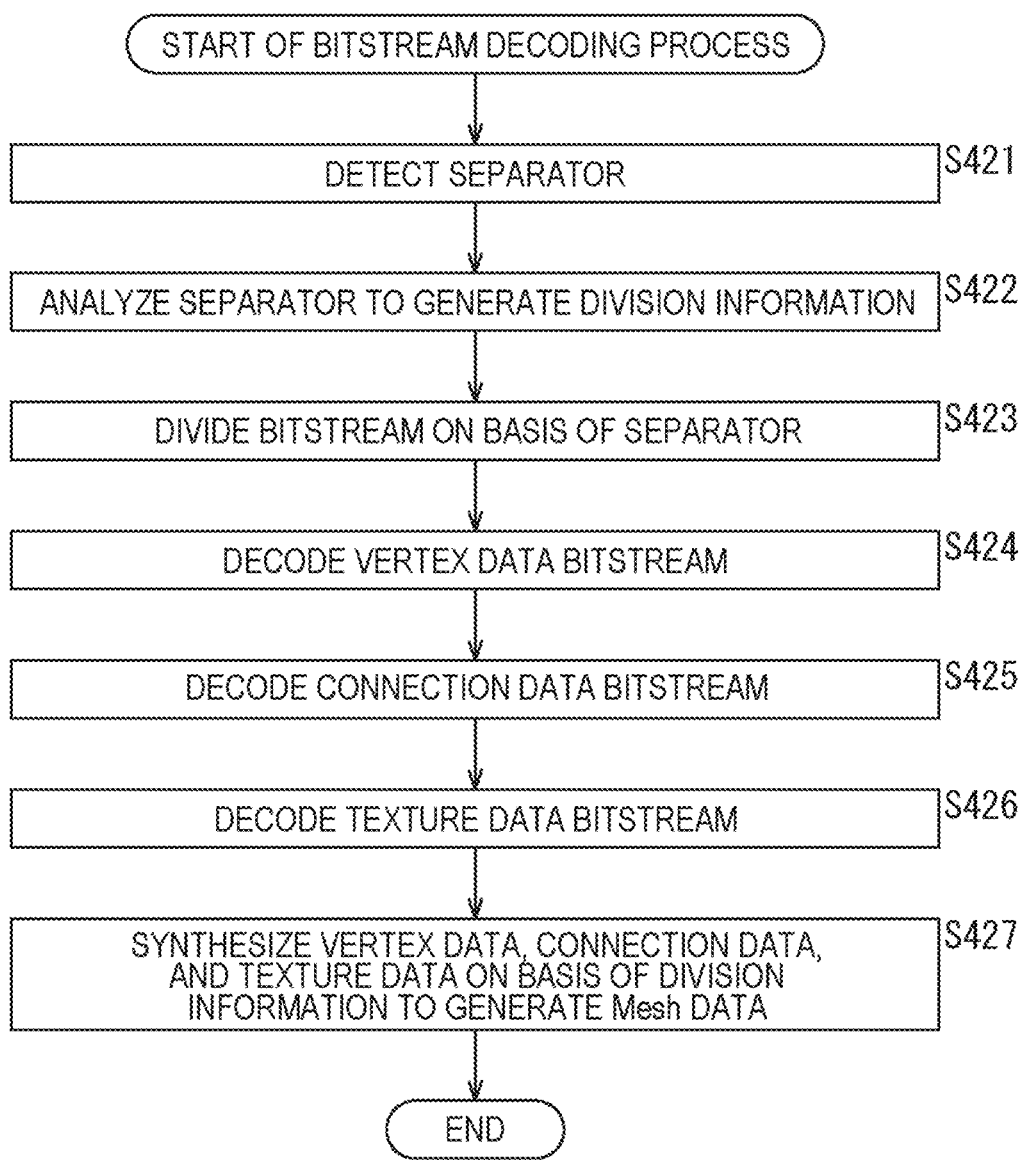
FIG. 41 is a flowchart for explaining an example of the flow of a bitstream decoding process.

An example of the flow of the decoding process in this case will be described with reference to a flowchart in FIG. 41.

When the decoding process is started, the separator analysis unit 662 detects a separator in the bitstream in step S421.

In step S422, the separator analysis unit 662 analyzes the separator detected in step S421 to generate division information.

In step S423, the demultiplexer 661 divides the bitstream into every sub-bitstream on the basis of the separator. That is, division into the vertex data bitstream, the connection data bitstream, and the texture data bitstream is made.

In step S424, the vertex data decoding unit 663 decodes the vertex data bitstream.

In step S425, the connection data decoding unit 664 decodes the connection data bitstream.

In step S426, the texture data decoding unit 665 decodes the texture data bitstream.

In step S427, the information synthesis unit 666 synthesizes vertex data, connection data, and texture data on the basis of the division information to generate mesh data.

Once the process in step S427 ends, the decoding process ends.

By executing each process as described above, a bitstream obtained by dividing the 3D data into a plurality of pieces and encoding the plurality of divided pieces of the 3D data can be divided into a plurality of pieces and decoded, such that an increase in load for encoding and decoding the 3D data can be suppressed.

7. Others

<Control Information>

The control information relating to the present technology described in each of the above embodiments may be transmitted from the encoding side to the decoding side. For example, control information (for example, enabled flag) that controls whether or not the application of the present technology described above is permitted (or prohibited) may be transmitted. Furthermore, for example, control information that designates a range in which the application of the present technology described above is permitted (or prohibited) (for example, an upper limit or a lower limit of the block size, or both of the upper limit and the lower limit, a slice, a picture, a sequence, a component, a view, a layer, and the like) may be transmitted.

<Software>

A series of the above-described processes can be executed by hardware as well and also can be executed by software. Furthermore, a part of processes also can be executed by hardware and the other processes can be executed by software. When the series of the processes is executed by software, a program constituting the software is installed in a computer. Here, the computer includes a computer built into dedicated hardware and a computer capable of executing various types of functions when installed with various types of programs, for example, a general-purpose personal computer or the like.

Figure 42:
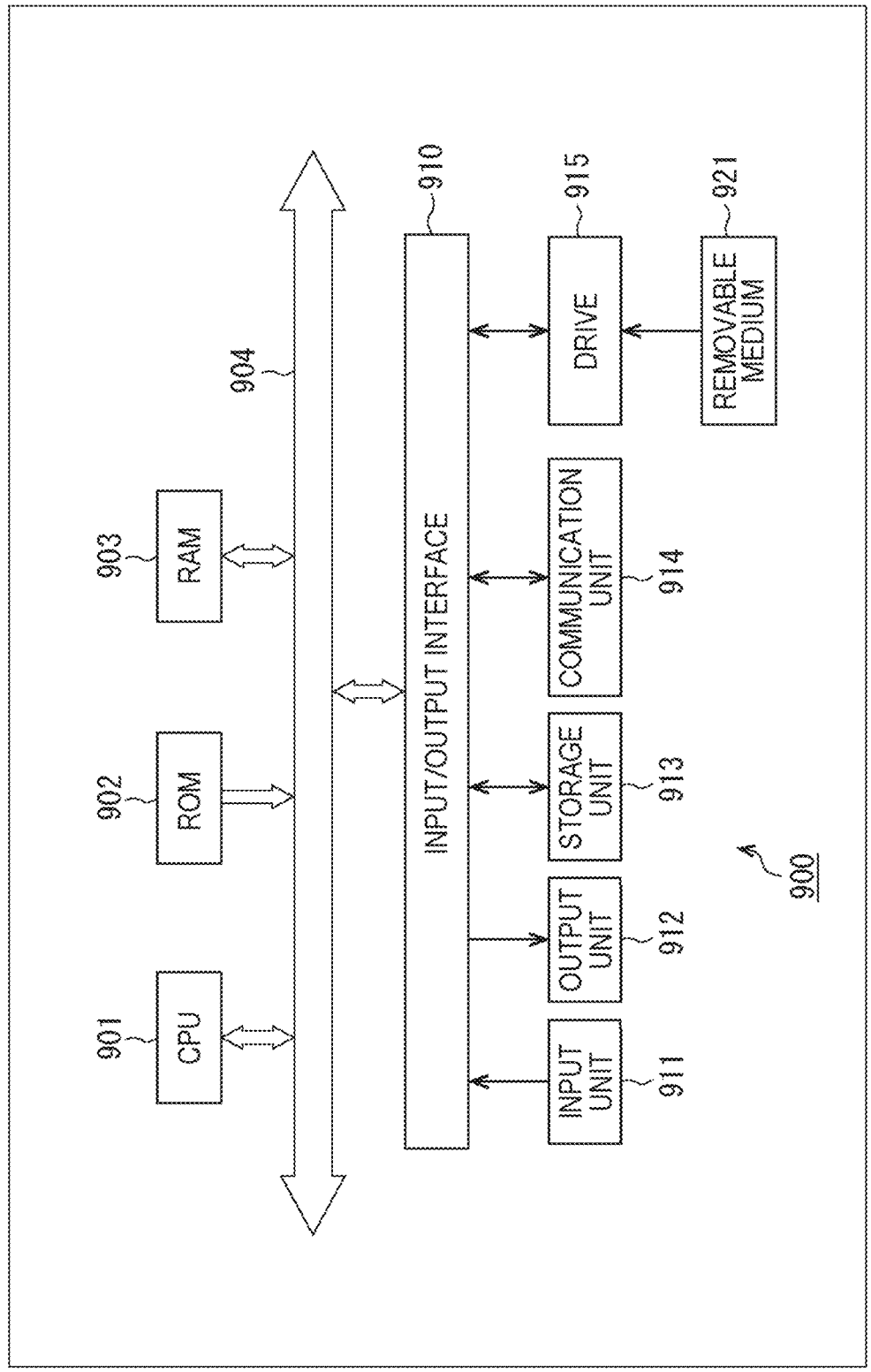
FIG. 42 is a block diagram illustrating a main configuration example of a computer.

FIG. 42 is a block diagram illustrating a hardware configuration example of a computer that executes the above-described series of the processes using a program.

In a computer 900 illustrated in FIG. 42, a central processing unit (CPU) 901, a read only memory (ROM) 902, and a random access memory (RAM) 903 are interconnected via a bus 904.

Furthermore, an input/output interface 910 is also connected to the bus 904. An input unit 911, an output unit 912, a storage unit 913, a communication unit 914, and a drive 915 are connected to the input/output interface 910.

For example, the input unit 911 includes a keyboard, a mouse, a microphone, a touch panel, an input terminal, and the like. For example, the output unit 912 includes a display, a speaker, an output terminal, and the like. For example, the storage unit 913 includes a hard disk, a RAM disk, a non-volatile memory, and the like. For example, the communication unit 914 includes a network interface. The drive 915 drives a removable medium 921 such as a magnetic disk, an optical disc, a magneto-optical disk, or a semiconductor memory.

In the computer configured as described above, for example, the above-described series of the processes is performed in such a manner that the CPU 901 loads a program stored in the storage unit 913 into the RAM 903 via the input/output interface 910 and the bus 904 to execute. Data required by the CPU 901 when executing the various types of the processes, and the like are also stored in the RAM 903 as appropriate.

For example, the program executed by the computer (CPU 901) can be applied by being recorded in the removable medium 921 serving as a package medium or the like. In that case, the program can be installed to the storage unit 913 via the input/output interface 910 by mounting the removable medium 921 in the drive 915. Furthermore, this program can also be provided via a wired or wireless transmission medium such as a local area network, the Internet, or digital satellite broadcasting. In that case, the program can be received by the communication unit 914 to be installed to the storage unit 913. As an alternative manner, this program also can be installed to the ROM 902 or the storage unit 913 in advance.

<Supplement>

The embodiments according to the present technology are not limited to the aforementioned embodiments and various modifications can be made without departing from the scope of the present technology.

For example, the present technology can also be carried out as any configuration constituting an apparatus or a system, for example, a processor serving as system large scale integration (LSI) or the like, a module using a plurality of processors or the like, a unit using a plurality of modules or the like, a set in which another function is further added to a unit, or the like (that is, a partial configuration of an apparatus).

Note that, in the present description, the system refers to a collection of a plurality of constituent members (e.g., apparatuses and modules (components)), and whether or not all the constituent members are arranged within the same cabinet is not regarded as important. Accordingly, a plurality of apparatuses accommodated in separate cabinets so as to be connected to one another via a network and one apparatus of which a plurality of modules is accommodated within one cabinet are both deemed as systems.

Furthermore, the processing units described above may be implemented by any configuration as long as the processing units have the functions described for these processing units. For example, the processing unit may be constituted by an arbitrary circuit, LSI, system LSI, processor, module, unit, set, device, apparatus, system, or the like. In addition, a plurality of the above-mentioned members may be combined. For example, the same type of configuration such as a plurality of circuits or a plurality of processors may be combined, or different types of configurations such as a circuit and LSI may be combined.

Additionally, for example, a configuration described as one apparatus (or a processing unit) may be divided so as to be configured as a plurality of apparatuses (or processing units). On the contrary, a configuration described as a plurality of apparatuses (or processing units) in the above may be integrated so as to be configured as one apparatus (or one processing unit). Furthermore, as a matter of course, a configuration other than those described above may be added to the configurations of the respective apparatuses (or the respective processing units). Moreover, a part of the configuration of a certain apparatus (or a certain processing unit) may be included in the configuration of another apparatus (or another processing unit) as long as the configuration or the action of the system as a whole is maintained substantially unchanged.

Meanwhile, for example, the present technology can employ a cloud computing configuration in which one function is divided and allocated to a plurality of apparatuses so as to be processed in coordination thereamong via a network.

In addition, for example, the above-described program can be executed by an arbitrary apparatus. In that case, that apparatus is only required to have necessary functions (function blocks or the like) such that necessary information can be obtained.

Furthermore, for example, the respective steps described in the aforementioned flowcharts can be executed by a plurality of apparatuses each taking a share thereof as well as executed by a single apparatus. Moreover, when a plurality of processes is included in one step, the plurality of processes included in one step can be executed by a plurality of apparatuses each taking a share thereof as well as executed by a single apparatus. In different terms, a plurality of processes included in one step can also be executed as a process with a plurality of steps. On the contrary, the processes described as a plurality of steps can also be integrated into one step to be executed.

The program executed by the computer may be designed in such a manner that the processes of steps describing the program are executed along the time series in accordance with the order described in the present description, or individually executed in parallel or at a necessary timing, for example, when called. That is, as long as there is no inconsistency, the processes of the respective steps may be executed in an order different from the order described above. Moreover, these processes of the steps describing the program may be executed in parallel with a process of another program, or may be executed in combination with a process of another program.

As long as there is no inconsistency, each of a plurality of the present technologies described in the present description can be independently carried out alone. As a matter of course, it is also possible to carry out an arbitrary plurality of the present technologies at the same time. For example, a part or the whole of the present technology described in any of the embodiments can be carried out in combination with a part or the whole of the present technology described in another embodiment. Furthermore, a part or the whole of an arbitrary one of the present technologies described above can be carried out with another technology not mentioned above at the same time.

Note that the present technology can also be configured as described below.

(1) An information processing apparatus including an encoding unit that divides 3D data representing a three-dimensional structure into a plurality of pieces to encode the plurality of divided pieces of the 3D data, multiplexes an obtained plurality of divided bitstreams, and generates one bitstream including a separator indicating a position of a joint between the divided bitstreams.

(2) The information processing apparatus according to (1), in which
the separator has a unique bit pattern, and indicates a position of a joint between the divided bitstreams by a position of the separator, and
the encoding unit is configured to arrange the separator at a joint between the respective divided bitstreams by connecting respective ones of the plurality of divided bitstreams in series such that the separator is sandwiched by the divided bitstreams.

(3) The information processing apparatus according to (2), in which
the separator further includes information regarding a divided bitstream corresponding to this particular separator.

(4) The information processing apparatus according to (3), in which
the information regarding the divided bitstream includes position information indicating a position of a part of the three-dimensional structure of the 3D data corresponding to the divided bitstream.

(5) The information processing apparatus according to (4), in which
the position information includes information indicating a start position of a part of the three-dimensional structure of the 3D data corresponding to the divided bitstream.

(6) The information processing apparatus according to (5), in which
the position information further includes information indicating a range of a part of the three-dimensional structure of the 3D data corresponding to the divided bitstream.

(7) The information processing apparatus according to any one of (3) to (5), in which
the information regarding the divided bitstream includes information regarding contents of the divided bitstream.

(8) The information processing apparatus according to any one of (3) to (7), in which
the information regarding the divided bitstream includes information regarding time of a frame corresponding to the divided bitstream.

(9) The information processing apparatus according to any one of (3) to (8), in which
the information regarding the divided bitstream includes information regarding a data size of the divided bitstream.

(10) The information processing apparatus according to any one of (3) to (9), in which
the information regarding the divided bitstream includes information regarding an encoding method used for encoding to generate the divided bitstream.

(11) The information processing apparatus according to any one of (3) to (10), in which
the information regarding the divided bitstream includes information regarding a prediction method applied in encoding to generate the divided bitstream.

(12) The information processing apparatus according to (11), in which
the information regarding the divided bitstream includes information indicating a reference destination of prediction in encoding to generate the divided bitstream.

(13) The information processing apparatus according to any one of (3) to (12), in which
the information regarding the divided bitstream includes information regarding a resolution corresponding to the divided bitstream.

(14) The information processing apparatus according to any one of (3) to (13), in which
the information regarding the divided bitstream includes information indicating a type of color sampling of data obtained by decoding the divided bitstream.

(15) The information processing apparatus according to any one of (3) to (14), in which
the information regarding the divided bitstream includes information indicating a bit width of data obtained by decoding the divided bitstream.

(16) The information processing apparatus according to any one of (2) to (15), further including
a generation unit that generates the separator, in which
the encoding unit is configured to arrange the separator generated by the generation unit at a joint between respective divided bitstreams.

(17) The information processing apparatus according to any one of (1) to (16), in which
the encoding unit generates the plurality of divided bitstreams by converting the 3D data into 2D data representing a two-dimensional structure, and dividing and encoding the 2D data on the basis of the two-dimensional structure.

(18) The information processing apparatus according to any one of (1) to (17), in which
the encoding unit generates the plurality of divided bitstreams by dividing the 3D data on the basis of the three-dimensional structure to convert each of the obtained plurality of pieces of divided 3D data into divided 2D data representing a two-dimensional structure, and encoding each of the obtained plurality of pieces of the divided 2D data.

(19) The information processing apparatus according to any one of (1) to (18), in which
the encoding unit divides the 3D data into geometry data indicating a position of each point of a point cloud and attribute data indicating attribute information on each point of the point cloud to encode the divided data, and generates the plurality of divided bitstreams.

(20) The information processing apparatus according to (19), in which
the encoding unit further divides and encodes the attribute data for each attribute.

(21) The information processing apparatus according to any one of (1) to (20), in which
the encoding unit divides and encodes the 3D data according to resolution, and generates the plurality of divided bitstreams.

(22) The information processing apparatus according to (21), in which
the 3D data is hierarchized according to resolution, and
the encoding unit is configured to divide and encode the 3D data for each hierarchy, and generate the plurality of divided bitstreams.

(23) The information processing apparatus according to (22), in which
the 3D data includes octree data having an octree structure.

(24) The information processing apparatus according to (22) and (23), further including
a resolution conversion unit that converts resolution of the 3D data to hierarchize the 3D data, in which
the encoding unit is configured to divide and encode the hierarchized 3D data whose resolution has been converted by the resolution conversion unit, for each hierarchy, and generate the plurality of divided bitstreams.

(25) The information processing apparatus according to any one of (1) to (24), in which
the encoding unit is configured to divide the 3D data made up of a plurality of frames into every frame to encode the divided 3D data, and generate the plurality of divided bitstreams.

(26) The information processing apparatus according to any one of (1) to (25), in which
the encoding unit divides the 3D data into vertex data including information regarding vertices of the three-dimensional structure, connection data including information regarding connections of the vertices, and texture data including information regarding a texture of the three-dimensional structure to encode the 3D data that has been divided, and generates the plurality of divided bitstreams.

(27) The information processing apparatus according to (26), in which
the encoding unit further divides the texture data into every component and encodes the divided texture data.

(28) An information processing method including
dividing 3D data representing a three-dimensional structure into a plurality of pieces to encode the plurality of divided pieces of the 3D data, multiplexing an obtained plurality of divided bitstreams, and generating one bitstream including a separator indicating a position of a joint between the divided bitstreams.

(31) An information processing apparatus including:
an analysis unit that analyzes a separator indicating a position of a joint between divided bitstreams obtained by dividing 3D data representing a three-dimensional structure into a plurality of pieces and encoding the plurality of divided pieces of the 3D data, the separator being included in a bitstream obtained by multiplexing a plurality of the divided bitstreams; and
a decoding unit that divides the bitstream into every divided bitstream on the basis of information included in the separator analyzed by the analysis unit, to decode the every divided bitstream.

(32) The information processing apparatus according to (31), in which
the decoding unit divides the bitstream at the position indicated by the separator.

(33) The information processing apparatus according to (32), in which
the separator has a bit pattern that is unique, and indicates the position by a position of the separator,
the analysis unit detects the separator by detecting the bit pattern, and
the decoding unit is configured to divide the bitstream at a position of the separator detected by the analysis unit.

(34) The information processing apparatus according to (33), in which
the separator further includes information regarding a divided bitstream corresponding to this particular separator, and
the analysis unit is configured to analyze the separator to obtain the information regarding the divided bitstream.

(35) The information processing apparatus according to (34), in which
the information regarding the divided bitstream includes information regarding a data size of the divided bitstream, and
the decoding unit decodes the divided bitstream on the basis of the information regarding the data size obtained the analysis unit analyzing the separator.

(36) The information processing apparatus according to (34) or (35), in which the information regarding the divided bitstream includes information regarding a decoding method for the divided bitstream, and the decoding unit decodes the divided bitstream using a decoding method indicated by the information regarding the decoding method obtained by the analysis unit analyzing the separator.

(37) The information processing apparatus according to any one of (34) to (36), in which the information regarding the divided bitstream includes information regarding a prediction method applied in decoding of the divided bitstream, and the decoding unit decodes the divided bitstream using a prediction method indicated by the information regarding the prediction method obtained by the analysis unit analyzing the separator.

(38) The information processing apparatus according to any one of (34) to (37), in which the information regarding the divided bitstream includes information indicating a reference destination of prediction performed in decoding of the divided bitstream, and the decoding unit performs prediction with reference to a reference destination indicated by the information indicating the reference destination obtained by the analysis unit analyzing the separator, and decodes the divided bitstream.

(39) The information processing apparatus according to any one of (34) to (38), in which the information regarding the divided bitstream includes information indicating a type of color sampling of data obtained by decoding the divided bitstream, and the decoding unit decodes the divided bitstream so as to obtain data of a type of color sampling indicated by the information indicating the type of color sampling obtained by the analysis unit analyzing the separator.

(40) The information processing apparatus according to any one of (34) to (39), in which the information regarding the divided bitstream includes information indicating a bit width of data obtained by decoding the divided bitstream, and the decoding unit decodes the divided bitstream so as to obtain data having a bit width indicated by the information indicating the bit width obtained by the analysis unit analyzing the separator.

(41) The information processing apparatus according to any one of (34) to (40), further including a synthesis unit that synthesizes a plurality of pieces of divided data obtained by the decoding unit decoding each of the plurality of divided bitstreams, on the basis of the information regarding the divided bitstream obtained by the analysis unit analyzing the separator.

(42) The information processing apparatus according to (41), in which the information regarding the divided bitstream includes position information indicating a position of a part of the three-dimensional structure of the 3D data corresponding to the divided bitstream, and the synthesis unit synthesizes the plurality of pieces of divided data on the basis of the position information obtained by the analysis unit analyzing the separator.

(43) The information processing apparatus according to (42), in which the position information includes information indicating a start position of a part of the three-dimensional structure of the 3D data corresponding to the divided bitstream, and the synthesis unit synthesizes the plurality of pieces of divided data on the basis of the information indicating the start position obtained by the analysis unit analyzing the separator.

(44) The information processing apparatus according to (43), in which the position information further includes information indicating a range of a part of the three-dimensional structure of the 3D data corresponding to the divided bitstream, and the synthesis unit synthesizes the plurality of pieces of divided data on the basis of the information indicating the start position and the information indicating the range obtained by the analysis unit analyzing the separator.

(45) The information processing apparatus according to any one of (42) to (44), in which the position information includes information indicating a position of a part of the three-dimensional structure of the 3D data corresponding to the divided bitstream in a two-dimensional structure, and the synthesis unit synthesizes a plurality of pieces of divided 2D data representing a two-dimensional structure obtained by the decoding unit decoding each of the plurality of divided bitstreams, on the basis of position information obtained by the analysis unit analyzing the separator.

(46) The information processing apparatus according to any one of (42) to (45), in which the position information includes information indicating a position of a part of the three-dimensional structure of the 3D data corresponding to the divided bitstream in the three-dimensional structure, and the synthesis unit synthesizes a plurality of divided 3D data obtained by the decoding unit decoding each of the plurality of divided bitstreams, on the basis of the position information obtained by the analysis unit analyzing the separator.

(47) The information processing apparatus according to any one of (41) to (46), in which the information regarding the divided bitstream includes information regarding an attribute of the divided bitstream, and the synthesis unit synthesizes geometry data indicating a position of each point of a point cloud, attribute data indicating attribute information on each point of the point cloud, obtained by the decoding unit decoding each of the plurality of divided bitstreams, on the basis of the information regarding the attribute obtained by the analysis unit analyzing the separator.

(48) The information processing apparatus according to (47), in which the synthesis unit synthesizes the geometry data and attribute data for each attribute obtained by the decoding unit decoding each of the plurality of divided bitstreams, on the basis of the information regarding the attribute obtained by the analysis unit analyzing the separator.

(49) The information processing apparatus according to any one of (41) to (48), in which the information regarding the divided bitstream includes information regarding a resolution corresponding to the divided bitstream, and the synthesis unit synthesizes a plurality of pieces of divided data obtained by the decoding unit decoding each of the plurality of divided bitstreams, on the basis of the information regarding the resolution obtained by the analysis unit analyzing the separator.

(50) The information processing apparatus according to any one of (41) to (49), in which the information regarding the divided bitstream includes information regarding time of a frame corresponding to the divided bitstream, and the synthesis unit synthesizes a plurality of pieces of divided data obtained by the decoding unit decoding each of the plurality of divided bitstreams, on the basis of the information regarding the time of the frame obtained by the analysis unit analyzing the separator.

(51) The information processing apparatus according to any one of (41) to (50), in which the information regarding the divided bitstream includes information regarding a type of information included in the divided bitstream, and the synthesis unit synthesizes vertex data including information regarding vertices of the three-dimensional structure, connection data including information regarding connections of the vertices, and texture data including information regarding a texture of the three-dimensional structure, which are obtained by the decoding unit decoding each of the plurality of divided bitstreams, on the basis of the information regarding the type of information obtained by the analysis unit analyzing the separator.

(52) The information processing apparatus according to (51), in which the synthesis unit synthesizes the vertex data, the connection data, and texture data for each component obtained by the decoding unit decoding each of the plurality of divided bitstreams, on the basis of the information regarding the type of information obtained by the analysis unit analyzing the separator.

(53) An information processing method including:

analyzing a separator indicating a position of a joint between divided bitstreams obtained by dividing 3D data representing a three-dimensional structure into a plurality of pieces and encoding the plurality of divided pieces of the 3D data, the separator being included in a bitstream obtained by multiplexing a plurality of the divided bitstreams; and dividing the bitstream into every divided bitstream on the basis of information included in the analyzed separator to decode the every divided bitstream.

REFERENCE SIGNS LIST

100 Bitstream
101 Header
102 Data
111 Header
112 Separator
113 Data (resolution 1)
114 Separator
115 Data (resolution 2)
116 Separator
117 Data (resolution 3)
121 Header
122 Separator
123 Data (partial region 1)
124 Separator
125 Data (partial region 2)
126 Separator
127 Data (partial region 3)
131 Header
132 Data
200 Encoding apparatus
201 Control unit
211 Preprocessing unit
212 Bounding box setting unit
213 Voxel setting unit
214 Signal sequence generation unit
215 Encoding unit
271 2D mapping unit
272 Color format conversion unit
273 Spatial region division unit
274 2D image encoding unit
275 Separator generation unit
276 Multiplexer
300 Decoding apparatus
301 Decoding unit
302 Voxel data generation unit
303 Point cloud processing unit
311 Demultiplexer
312 Separator analysis unit
313 2D image decoding unit
314 Spatial region synthesis unit
315 Color format reverse conversion unit
316 3D mapping unit
331 Spatial region division unit
332 Partial region encoding unit
333 Separator generation unit
334 Multiplexer
341 2D mapping unit
342 Color format conversion unit
343 2D image encoding unit
361 Demultiplexer
362 Separator analysis unit
363 Partial region decoding unit
364 Spatial region synthesis unit
371 2D image decoding unit
372 Color format reverse conversion unit
373 3D mapping unit
391 Information division unit
392 Geometry encoding unit
393 Attribute encoding unit
394 Separator generation unit
395 Multiplexer
411 Demultiplexer
412 Separator analysis unit
413 Geometry decoding unit
414 Attribute decoding unit
415 Information synthesis unit
431 Hierarchy division unit
432 LOD2 encoding unit
433 LOD1 encoding unit
434 LOD0 encoding unit
435 Separator generation unit
436 Multiplexer
451 Demultiplexer
452 Separator analysis unit
453 LOD2 decoding unit
454 LOD1 decoding unit
455 LOD0 decoding unit
456 Hierarchy synthesis unit
471 Information division unit
472 Geometry encoding unit
473 Attribute encoding unit
474 Separator generation unit
475 Multiplexer
476 Spatial region division unit
477 Separator generation unit
478 Multiplexer
479 Hierarchy division unit
480 Separator generation unit
481 Multiplexer
511 Demultiplexer
512 Separator analysis unit 513 Geometry decoding unit
514 Attribute decoding unit
515 Information synthesis unit
516 Demultiplexer
517 Separator analysis unit
518 Spatial region synthesis unit
519 Demultiplexer
520 Separator analysis unit
521 Hierarchy synthesis unit
541 Frame division unit
542 Frame encoding unit
543 Separator generation unit
544 Multiplexer
551 Demultiplexer
552 Separator analysis unit
553 Frame decoding unit
554 Frame synthesis unit
600 Encoding apparatus
611 Information division unit
612 Vertex data encoding unit
613 Connection data encoding unit
614 Texture data encoding unit
615 Separator generation unit
616 Multiplexer
650 Decoding apparatus
661 Demultiplexer
662 Separator analysis unit
663 Vertex data decoding unit
664 Connection data decoding unit
665 Texture data decoding unit
666 Information synthesis unit
900 Computer

The invention claimed is:

1. An information processing apparatus comprising:
circuitry configured to
divide octree data representing a three-dimensional structure into a first hierarchy and a second hierarchy to encode the first hierarchy and the second hierarchy into a first divided bitstream and a second divided bitstream, respectively, wherein a first resolution of the first hierarchy is different from a second resolution of the second hierarchy, the first hierarchy corresponds to a first level of the octree, and the second hierarchy corresponds to a second level of the octree, and
generate one bitstream comprising the first divided bitstream, a separator, and the second divided bitstream,
wherein the separator is between the first divided bitstream and the second divided bitstream, and the separator has a unique bit pattern for detecting the separator.

2. The information processing apparatus according to claim 1, wherein the circuitry is further configured to
arrange the separator at a joint between the first divided bitstream and the second divided bitstream.

3. The information processing apparatus according to claim 2, wherein the circuitry is further configured to
generate the separator, and arrange the separator at the joint between the first divided bitstream and the second divided bitstream.

4. The information processing apparatus according to claim 1, wherein the separator further comprises position information indicating a position of a part of the three-dimensional structure of the octree data corresponding to the divided bitstream.

5. The information processing apparatus according to claim 1, wherein the circuitry is further configured to
generate the first divided bitstream and the second divided bitstream by converting the octree data into 2D data representing a two-dimensional structure, and dividing and encoding the 2D data on a basis of the two-dimensional structure.

6. The information processing apparatus according to claim 1, wherein the circuitry is further configured to
generate the first divided bitstream and the second divided bitstream by dividing the octree data on a basis of the three-dimensional structure to convert each of the obtained plurality of pieces of divided octree data into divided 2D data representing a two-dimensional structure, and encoding each of the obtained plurality of pieces of the divided 2D data.

7. The information processing apparatus according to claim 1, wherein the circuitry is further configured to
divide the octree data into geometry data indicating a position of each point of a point cloud and attribute data indicating attribute information on each point of the point cloud to encode the divided data, and generate the first divided bitstream and the second divided bitstream.

8. The information processing apparatus according to claim 1, wherein the circuitry is further configured to:
generate a third divided bitstream by encoding first attribute data of the first hierarchy, and generate a fourth divided bitstream by encoding second attribute data of the second hierarchy;
include the third divided bitstream, a second separator, and the fourth divided bitstream in the one bitstream, wherein the second separator is between the third divided bitstream and the fourth divided bitstream.

9. An information processing method comprising:
dividing octree data representing a three-dimensional structure into a first hierarchy and a second hierarchy to encode the first hierarchy and the second hierarchy into a first divided bitstream and a second divided bitstream, respectively, wherein a first resolution of the first hierarchy is different from a second resolution of the second hierarchy, the first hierarchy corresponds to a first level of the octree, and the second hierarchy corresponds to a second level of the octree, and
generating one bitstream comprising the first divided bitstream, a separator, and the second divided bitstream,
wherein the separator is between the first divided bitstream and the second divided bitstream, and the separator has a unique bit pattern for detecting the separator.

10. An information processing apparatus comprising:
circuitry configured to
analyze a separator indicating a position of a joint between a first divided bitstream and a second divided bitstream obtained by dividing octree data representing a three-dimensional structure into a first hierarchy and a second hierarchy and encoding the first hierarchy and the second hierarchy into the first divided bitstream and the second divided bitstream, the separator being included in a bitstream comprising the first divided bitstream, the separator, and the second divided bitstream; and
divide the bitstream into the first divided bitstream and the second divided bitstream on a basis of information included in the separator analyzed by the analysis unit, to decode each of the plurality of divided bitstreams, wherein a first resolution of the first hierarchy is different from a second resolution of the second hierarchy, the first hierarchy corresponds to a first level of the octree, and the second hierarchy corresponds to a second level of the octree, and wherein the separator is between the first divided bitstream and the second divided bitstream, and the separator has a unique bit pattern for detecting the separator.

11. The information processing apparatus according to claim 10, wherein the circuitry is further configured to detect the separator by detecting the bit pattern, and divide the bitstream at a detected position of the separator.

12. The information processing apparatus according to claim 11, wherein the separator further includes information regarding a particular divided bitstream of t the first divided bitstream and the second divided bitstream corresponding to the separator, and the circuitry is configured to analyze the separator to obtain the information regarding the particular divided bitstream.

13. The information processing apparatus according to claim 12, wherein the circuitry is further configured to synthesize a plurality of pieces of divided data obtained by decoding each of the first divided bitstream and the second divided bitstream, on a basis of the information regarding the particular divided bitstream obtained by analyzing the separator.

14. The information processing apparatus according to claim 13, wherein the information regarding the particular divided bitstream includes position information indicating a position of a part of the three-dimensional structure of the octree data corresponding to the particular divided bitstream, and the circuitry is further configured to synthesize the plurality of pieces of divided data on a basis of the position information obtained by analyzing the separator.

15. The information processing apparatus according to claim 14, wherein the position information includes information indicating a position of a part of the three-dimensional structure of the octree data corresponding to the particular divided bitstream in a two-dimensional structure, and the circuitry is further configured to synthesize a plurality of pieces of divided 2D data representing a two-dimensional structure obtained by decoding each of the first divided bitstream and the second divided bitstream, on a basis of position information obtained by analyzing the separator.

16. The information processing apparatus according to claim 14, wherein the position information includes information indicating a position of a part of the three-dimensional structure of the 3D data corresponding to the particular divided bitstream in the three-dimensional structure, and the circuitry is further configured to synthesize a plurality of divided octree data obtained by decoding each of the first divided bitstream and the second divided bitstream, on a basis of the position information obtained by analyzing the separator.

17. The information processing apparatus according to claim 13, wherein the information regarding the particular divided bitstream includes information regarding an attribute of the particular divided bitstream, and the circuitry is further configured to synthesize geometry data indicating a position of each point of a point cloud, attribute data indicating attribute information on each point of the point cloud, obtained by decoding each of the first divided bitstream and the second divided bitstream, on a basis of the information regarding the attribute obtained by analyzing the separator.

18. The information processing apparatus according to claim 13, wherein the information regarding the particular divided bitstream includes information regarding a resolution corresponding to the particular divided bitstream, and the circuitry is further configured to synthesize a plurality of pieces of divided data obtained by decoding each of the first divided bitstream and the second divided bitstream, on a basis of the information regarding the resolution obtained by analyzing the separator.

19. An information processing method comprising:

analyzing a separator indicating a position of a joint between a first divided bitstream and a second divided bitstream obtained by dividing octree data representing a three-dimensional structure into a first hierarchy and a second hierarchy and encoding the first hierarchy and the second hierarchy into the first divided bitstream and the second divided bitstream, the separator being included in a bitstream comprising the first divided bitstream, the separator, and the second divided bitstream; and dividing the bitstream into the first divided bitstream and the second divided bitstream on a basis of information included in the analyzed separator to decode each of the plurality of divided bitstreams, wherein a first resolution of the first hierarchy is different from a second resolution of the second hierarchy, the first hierarchy corresponds to a first level of the octree, and the second hierarchy corresponds to a second level of the octree, and wherein the separator is between the first divided bitstream and the second divided bitstream, and the separator has a unique bit pattern for detecting the separator.

* * * * *